(12) United States Patent
Nakamura et al.

(10) Patent No.: US 11,746,239 B2
(45) Date of Patent: Sep. 5, 2023

(54) COLORING COMPOSITION, FILM, COLOR FILTER, SOLID-STATE IMAGING ELEMENT, AND IMAGE DISPLAY DEVICE

(71) Applicant: FUJIFILM Corporation, Tokyo (JP)

(72) Inventors: Shoichi Nakamura, Shizuoka (JP); Kazuya Ota, Shizuoka (JP); Haruki Inabe, Shizuoka (JP)

(73) Assignee: FUJIFILM Corporation, Tokyo (JP)

( * ) Notice: Subject to any disclaimer, the term of this patent is extended or adjusted under 35 U.S.C. 154(b) by 504 days.

(21) Appl. No.: 16/812,611

(22) Filed: Mar. 9, 2020

(65) Prior Publication Data

US 2020/0207990 A1  Jul. 2, 2020

Related U.S. Application Data

(63) Continuation of application No. PCT/JP2018/033764, filed on Sep. 12, 2018.

(30) Foreign Application Priority Data

Oct. 20, 2017  (JP) ................. 2017-203734

(51) Int. Cl.
 C09B 56/02 (2006.01)
 C09B 44/10 (2006.01)
 G02B 5/22 (2006.01)

(52) U.S. Cl.
 CPC ............ C09B 56/02 (2013.01); C09B 44/108 (2013.01); G02B 5/223 (2013.01)

(58) Field of Classification Search
 None
 See application file for complete search history.

(56) References Cited

U.S. PATENT DOCUMENTS

| | | |
|---|---|---|
| 2006/0000391 A1 | 1/2006 | Hamada |
| 2008/0057417 A1 | 3/2008 | Feldhues et al. |
| 2016/0217920 A1 | 7/2016 | Choi et al. |
| 2016/0280923 A1 | 9/2016 | Michaelis et al. |
| 2017/0275464 A1 | 9/2017 | Endert et al. |
| 2017/0275465 A1 | 9/2017 | Endert et al. |
| 2017/0275466 A1 | 9/2017 | Endert et al. |
| 2017/0275467 A1 | 9/2017 | Linke et al. |
| 2017/0275468 A1 | 9/2017 | Linke et al. |
| 2018/0306953 A1 | 10/2018 | Nakamura |

FOREIGN PATENT DOCUMENTS

| | | |
|---|---|---|
| CN | 105985662 A | 10/2016 |
| CN | 107227039 A | 10/2017 |
| CN | 107227040 A | 10/2017 |
| CN | 107227043 A | 10/2017 |
| CN | 107227045 A | 10/2017 |
| JP | 2006-016506 A | 1/2006 |
| JP | 2007-224176 A | 9/2007 |
| JP | 2008-144004 A | 6/2008 |
| JP | 2009-029952 A | 2/2009 |
| JP | 5213373 | 6/2013 |
| JP | 2013-205833 A | 10/2013 |
| JP | 2016-139789 A | 8/2016 |
| JP | 2016-180100 A | 10/2016 |
| JP | 2016-196614 A | 11/2016 |
| JP | 2017-016132 A | 1/2017 |
| JP | 2017-058612 A | 3/2017 |
| JP | 2017-171912 A | 9/2017 |
| JP | 2017-171913 A | 9/2017 |
| JP | 2017-171914 A | 9/2017 |
| JP | 2017-171915 A | 9/2017 |
| KR | 10-2017-0110544 A | 10/2017 |
| TW | 201736957 A | 10/2017 |

OTHER PUBLICATIONS

International Search Report dated Oct. 16, 2018, issued by the International Searching Authority in application No. PCT/JP2018/033764.

Written Opinion dated Oct. 16, 2018, issued by the International Searching Authority in application No. PCT/JP2018/033764.

International Preliminary Report on Patentability dated Apr. 21, 2020, issued by the International Bureau in application No. PCT/JP2018/033764.

Communication dated Dec. 14, 2020, from The China National Intellectual Property Administration in English Application No. CN 201880064367.6.

Notification of Reason for Refusal dated Apr. 21, 2021 from the Korean Intellectual Property Office in KR Application No. 10-2020-7007435.

Communication dated Jan. 5, 2022, issued by the Japanese Patent Office in application No. 2019-549152.

(Continued)

Primary Examiner — Joseph R Kosack
(74) Attorney, Agent, or Firm — Sughrue Mion, PLLC

(57) ABSTRACT

A coloring composition includes a metal azo pigment, a compound having an ethylenically unsaturated bonding group, and a solvent, the metal azo pigment includes at least one kind of an anion selected from an azo compound represented by Formula (I) or an azo compound having a tautomeric structure of the azo compound represented by Formula (I), two or more kinds of metal ions, and a melamine compound, and in Formula (I), $R^1$ and $R^2$ each independently represent OH or $NR^5R^6$, $R^3$ and $R^4$ each independently represent $=O$ or $=NR^7$, and $R^5$ to $R^7$ each independently represent a hydrogen atom or an alkyl group.

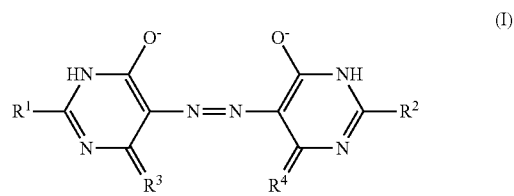

(I)

16 Claims, No Drawings

(56) References Cited

OTHER PUBLICATIONS

Office Action dated May 25, 2021 issued by the Japanese Patent Office in Japanese Application No. 2019-549152.
Office Action dated Sep. 8, 2022 issued by the Taiwanese Patent Office in Taiwanese Application No. 107133025.
Office Action dated Aug. 30, 2022 issued by the Japanese Patent Office in Japanese Application No. 2019-549152.

COLORING COMPOSITION, FILM, COLOR FILTER, SOLID-STATE IMAGING ELEMENT, AND IMAGE DISPLAY DEVICE

CROSS-REFERENCE TO RELATED APPLICATIONS

This application is a Continuation of PCT International Application No. PCT/JP2018/033764 filed on Sep. 12, 2018, which claims priority under 35 U.S.C § 119(a) to Japanese Patent Application No. 2017-203734 filed on Oct. 20, 2017. Each of the above application(s) is hereby expressly incorporated by reference, in its entirety, into the present application.

BACKGROUND OF THE INVENTION

1. Field of the Invention

The present invention relates to a coloring composition. More specifically, the present invention relates to a coloring composition including a metal azo pigment. The present invention further relates to a film using the coloring composition, a color filter, a solid-state imaging element, and an image display device.

2. Description of the Related Art

In recent years, as a digital camera, a mobile phone with a camera, and the like have been further spreading, there has been a greatly increasing demand for a solid-state imaging element such as a charge coupled device (CCD) image sensor. A color filter has been used as a key device in a display or an optical element. The color filter normally includes pixels (coloring patterns) of three primary colors of red, green, and blue, and acts to separate transmitted light into the three primary colors.

On the other hand, JP2017-171912A, JP2017-171913A, JP2017-171914A, and JP2017-171915A disclose inventions relating to a metal azo pigment including azobarbituric acid, two or more kinds of metal ions, and a melamine compound. The metal azo pigment disclosed in JP2017-171912A, JP2017-171913A, JP2017-171914A, and JP2017-171915A is said to have improved coloring performance comparing to a metal azo pigment which is based on a metal complex in the related art of nickel and azobarbituric acid.

SUMMARY OF THE INVENTION

A coloring composition may be used after being stored for a long time. In addition, the coloring composition may be stored under a low-temperature environment of 0° C. or lower.

The present inventors have intensively studied a metal azo pigment including azobarbituric acid, two or more kinds of metal ions, and a melamine compound, and found that a film easily occurs defects in a case where a coloring composition including the metal azo pigment is stored under a low-temperature environment.

On the other hand, JP2017-171912A, JP2017-171913A, JP2017-171914A, and JP2017-171915A do not disclose a study of defects in a case of using the coloring composition after storing for a long time.

Therefore, an object of the present invention is to provide a coloring composition capable of producing a film which is suppressed in an occurrence of defects even in a case where the coloring composition is stored for a long time under a low-temperature environment. Another object of the present invention is to provide a film using the coloring composition, a color filter, a solid-state imaging element, and an image display device.

According to the studies conducted by the present inventors, it was found that the above object can be achieved by using a coloring composition as described later, thereby leading to completion of the present invention. The present invention provides the following aspects.

<1> A coloring composition comprising:
a metal azo pigment which includes at least one kind of an anion selected from an azo compound represented by Formula (I) or an azo compound having a tautomeric structure of the azo compound represented by Formula (I), two or more kinds of metal ions, and a melamine compound;
a compound which has an ethylenically unsaturated bonding group; and
a solvent,

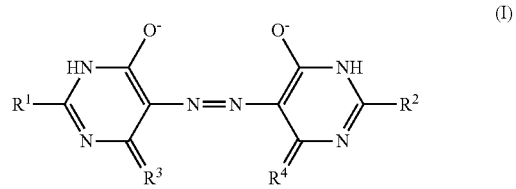

in the formula, $R^1$ and $R^2$ each independently represent OH or $NR^5R^6$, $R^3$ and $R^4$ each independently represent $=O$ or $=NR^7$, and $R^5$ to $R^7$ each independently represent a hydrogen atom or an alkyl group.

<2> The coloring composition according to <1>,
in which the metal azo pigment includes the anion, metal ions including at least $Zn^{2+}$ and $Cu^{2+}$, and the melamine compound.

<3> The coloring composition according to <2>,
in which $Zn^{2+}$ and $Cu^{2+}$ are contained in a total amount of 95% to 100% by mole based on 1 mol of all the metal ions in the metal azo pigment.

<4> The coloring composition according to <2> or <3>,
in which a molar ratio of $Zn^{2+}$ to $Cu^{2+}$ in the metal azo pigment is $Zn^{2+}:Cu^{2+}=199:1$ to $1:15$.

<5> The coloring composition according to any one of <1> to <4>,
in which the melamine compound in the metal azo pigment is a compound represented by Formula (II),

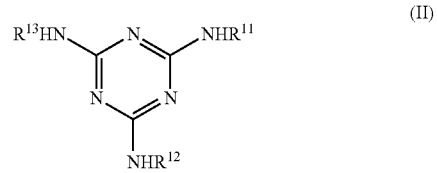

in the formula, $R^{11}$ to $R^{13}$ each independently represent a hydrogen atom or an alkyl group.

<6> The coloring composition according to any one of <1> to <5>, further comprising:
a photopolymerization initiator.

<7> The coloring composition according to <6>, in which the photopolymerization initiator is an oxime compound.

<8> The coloring composition according to any one of <1> to <7>, in which the compound which has an ethylenically unsaturated bonding group is contained 10 parts by mass or more with respect to 100 parts by mass of the metal azo pigment.

<9> The coloring composition according to any one of <1> to <8>, further comprising:
a polymerization inhibitor.

<10> The coloring composition according to any one of <1> to <9>, further comprising:
a pigment derivative.

<11> The coloring composition according to <10>,
in which the pigment derivative is a basic pigment derivative.

<12> The coloring composition according to any one of <1> to <11>,
in which the coloring composition is used for a solid-state imaging element.

<13> A film obtained from the coloring composition according to any one of <1> to <12>.

<14> A color filter comprising the film according to <13>.

<15> A solid-state imaging element comprising the film according to <13>.

<16> An image display device comprising the film according to <13>.

According to the present invention, it is possible to provide a coloring composition capable of producing a film which is suppressed in an occurrence of defects even in a case where the coloring composition is stored for a long time under a low-temperature environment. It is also possible to provide a film using the coloring composition, a color filter, a solid-state imaging element, and an image display device.

DESCRIPTION OF THE PREFERRED EMBODIMENTS

Hereinafter, the contents of the present invention will be described in detail.

In citations for a group (atomic group) in the present specification, in a case where the group is denoted without specifying whether it is substituted or unsubstituted, the group includes both a group having no substituent and a group having a substituent. For example, an "alkyl group" includes not only an alkyl group having no substituent (unsubstituted alkyl group), but also an alkyl group having a substituent (substituted alkyl group).

In the present specification, "exposure" includes, unless otherwise specified, not only exposure using light but also lithography using particle rays such as electron beams and ion beams. In addition, examples of light used for the exposure generally include actinic rays or radiation such as a bright line spectrum of a mercury lamp, far ultraviolet rays typified by an excimer laser, extreme ultraviolet rays (EUV light), X-rays, or electron beams.

In the present specification, a numerical range expressed using "to" means a range that includes the preceding and succeeding numerical values of "to" as the lower limit value and the upper limit value, respectively.

In the present specification, the total solid content refers to a total amount of the components other than a solvent from all the components of a composition.

In the present specification, "(meth)acrylate" represents either or both of acrylate and methacrylate, "(meth)acryl" represents either or both of acryl and methacryl, "(meth)allyl" represents either or both of allyl and methallyl, and "(meth)acryloyl" represents either or both of acryloyl and methacryloyl.

In the present specification, the term "step" not only means an independent step, but also includes a step which is not clearly distinguished from other steps in a case where an intended action of the step is obtained.

In the present specification, a weight-average molecular weight (Mw) and a number-average molecular weight (Mn) are each defined as a value in terms of polystyrene through measurement by means of gel permeation chromatography (GPC).

<Coloring Composition>

A coloring composition of the embodiment of the present invention including:
a metal azo pigment which includes at least one kind of an anion selected from an azo compound represented by Formula (I) or an azo compound having a tautomeric structure of the azo compound represented by Formula (I), two or more kinds of metal ions, and a melamine compound;
a compound which has an ethylenically unsaturated bonding group; and
a solvent.

According to the present invention, it is possible to produce a film which is suppressed in an occurrence of defects even in a case where the coloring composition is stored for a long time under a low-temperature environment (for example, under a low-temperature environment of 0° C. or lower, preferably −5° C. or lower, more preferably −10° C. or lower, still more preferably −15° C. or lower, and even still more preferably −20° C. or lower). The mechanism for obtaining such an effect is assumed as follows.

The above-mentioned metal azo pigment tends to have low hardness, and it is assumed that a part of the metal azo pigments is excessively refined in a case of, for example, preparing a dispersion liquid. As a result, it is assumed that the excessively refined metal azo pigments reaggregate at the time of storing the coloring composition. Moreover, in a case where the content of nickel ions ($Ni^{2+}$) in the metal azo pigment is low, or the metal azo pigment does not contain nickel ions, it is assumed that the metal azo pigment is in an unstable energy state and the metal azo pigments tend to reaggregate more easily. In addition, the metal azo pigments tend to easily reaggregate in a case where the temperature at the time of storing the coloring composition is low. In particular, reaggregation of the metal azo pigments tends to be easily promoted under a low-temperature environment of 0° C. or lower. The reason for this is assumed that the mobility of a component (for example, a dispersant, a surface treatment agent, and the like) contributing to pigment dispersion is reduced by a low temperature and the function of steric repulsion between the pigments is reduced, and as a result, the pigments are easily reaggregated. In a case where such aggregates are generated in the coloring composition, it is assumed that, at the time of storing the coloring composition, the aggregates serve as nuclei to promote aggregation of components included in the coloring composition, such as the metal azo pigment, and the size of the aggregates grows and becomes coarse. In a case where the coloring composition including the coarse aggregates and the like is used to produce a film, it is considered that, since a solvent is removed during drying, the aggregates promote crystallization of the metal azo pigment and the like and defects occur in the film. Since the coloring composition of the embodiment of the present invention further includes the compound having an ethylenically unsaturated bonding group in addition to the metal azo pigment, the compound having an ethylenically unsaturated bonding group is adsorbed to a surface of the metal azo pigment by interacting with a pigment active surface (particularly azo site) of the metal azo pigment, thereby the metal azo pigment can be stabilized in the coloring composition. As a result, it is assumed that reaggregation and the like of the metal azo pigment can be suppressed even in a case where the coloring composition is stored for a long time under a low-temperature environment. Therefore, it is assumed that, according to the coloring composition of the embodiment of the present invention, it is possible to produce a film which is suppressed in an occurrence of defects even in a case of storing for a long time under a low-temperature environment.

In addition, in a case where the coloring composition of the embodiment of the present invention includes an oxime compound as a photopolymerization initiator, the above-described occurrence of defects can be suppressed more effectively. Furthermore, even in a case where a film obtained from the coloring composition is exposed to a high-temperature and high-humidity environment, occurrence of foreign-matter defects can be effectively suppressed. The reason for obtaining such an effect is assumed as follows.

The metal azo pigment included in the coloring composition of the embodiment of the present invention includes two or more kinds of metal ions, and the conformation of the metal azo compound (metal complex) composed of the above-described anion and metal ions differs depending on the types of the metal ions. For example, in a case of $Cu^{2+}$, a metal complex of a planar conformation is formed, and in a case of $Zn^{2+}$, a metal complex of an octahedral conformation is formed. Therefore, it is assumed that the metal azo pigments in the coloring composition including a solvent and the like are in an unstable state, which is difficult to associate with each other, and the metal azo pigments tend to easily aggregate at the time of storing the coloring composition. However, it is assumed that, in a case of blending an oxime compound, the oxime compound coordinates with the metal azo pigment and acts as a chelating agent, and as a result, the metal azo pigment can be stabilized and aggregation and the like of the metal azo pigment can be suppressed more effectively. Therefore, it is assumed that it is possible to produce a film in which occurrence of defects is more suppressed even in a case where the coloring composition is stored for a long time under a low-temperature environment.

In addition, since the coloring composition of the embodiment of the present invention contains the compound having an ethylenically unsaturated bonding group, although reaggregation and the like of the metal azo pigment at the time of storage is suppressed and generation of relatively coarse aggregates can be suppressed as described above, very fine aggregates and the like may be generated. The very fine aggregates do not cause foreign-matter defects immediately after forming a film, but in a case where a film is formed using the coloring composition in which the very fine aggregates are generated, and the obtained film is exposed to a high-temperature and high-humidity environment, the above-described aggregates included in the film may serve as nuclei to cause foreign-matter defects. However, it is assumed that, in a case of further blending the oxime compound, the metal azo pigment can be stabilized as described above, and generation of fine aggregates which can cause a formation of foreign matter can be suppressed. Therefore, it is assumed that, even in a case where a film obtained from the coloring composition is exposed to a high-temperature and high-humidity environment, occurrence of foreign-matter defects can be effectively suppressed.

In addition, it is preferable that the coloring composition of the embodiment of the present invention includes a pigment derivative. According to this aspect, it is possible to form a film in which variation of spectral diffraction with respect to a temperature change is suppressed.

In addition, it is preferable that the coloring composition of the embodiment of the present invention contains a polymerization inhibitor. According to this aspect, it is possible to produce a film in which occurrence of defects is more suppressed even in a case where the coloring composition is stored for a long time under a low-temperature environment. The detailed reason for obtaining such an effect is not sure, but is assumed as follows. That is, since the metal azo pigment included in the coloring composition of the embodiment of the present invention includes two or more kinds of metal ions, it is assumed that, at the time of storing the coloring composition, metal exchange between the metal azo compounds composed of the above-described anion and metal ions occurs and precipitates are generated. However, it is assumed that, by containing a polymerization inhibitor, activation degree of the metal azo compound is reduced and metal exchange between the metal azo compounds is less likely to occur. As a result, it is assumed that generation of the precipitates is suppressed.

Hereinafter, the respective components used in the coloring composition of the embodiment of the present invention will be described.

<<Metal Azo Pigment>>

The coloring composition of the embodiment of the present invention includes a metal azo pigment which includes at least one kind of an anion selected from an azo compound represented by Formula (I) or an azo compound having a tautomeric structure of the azo compound represented by Formula (I), two or more kinds of metal ions, and a melamine compound.

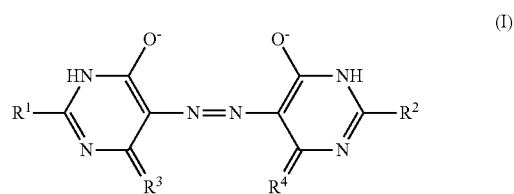

(I)

In the formula, $R^1$ and $R^2$ each independently represent OH or $NR^5R^6$, $R^3$ and $R^4$ each independently represent =O or =$NR^7$, and $R^5$ to $R^7$ each independently represent a hydrogen atom or an alkyl group. The alkyl group represented by $R^5$ to $R^7$ preferably has 1 to 10 carbon atoms, more preferably has 1 to 6 carbon atoms, and still more preferably has 1 to 4 carbon atoms. The alkyl group may be any of linear, branched, and cyclic forms, and is preferably linear or branched and more preferably linear. The alkyl group may have a substituent. Examples of the substituent include the substituent T described later, and a halogen atom, a hydroxy group, an alkoxy group, a cyano group, and an amino group are preferable.

In Formula (I), it is preferable that $R^1$ and $R^2$ are OH. In addition, it is preferable that $R^3$ and $R^4$ are =O.

It is preferable that the melamine compound in the metal azo pigment is a compound represented by Formula (II).

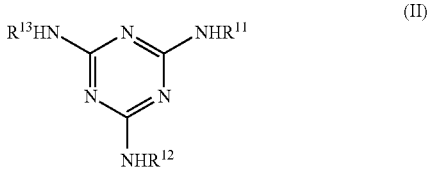

(II)

In the formula, $R^{11}$ to $R^{13}$ each independently represent a hydrogen atom or an alkyl group. The alkyl group preferably has 1 to 10 carbon atoms, more preferably has 1 to 6 carbon atoms, and still more preferably has 1 to 4 carbon atoms. The alkyl group may be any of linear, branched, and cyclic forms, and is preferably linear or branched and more preferably linear. The alkyl group may have a substituent. Examples of the substituent include the substituent T described later, and a hydroxy group is preferable. It is preferable that at least one of $R^{11}$ to $R^{13}$ is a hydrogen atom, and it is more preferable that all of $R^{11}$ to $R^{13}$ are hydrogen atoms.

The metal azo pigment used in the present invention contains the melamine compound (preferably the compound represented by Formula (II)) preferably in an amount of 0.05 to 4 mol, more preferably in an amount of 0.5 to 2.5 mol, and still more preferably in an amount of 1.0 to 2.0 mol per 1 mol of the at least one kind of an anion selected from an azo compound represented by Formula (I) or an azo compound having a tautomeric structure of the azo compound represented by Formula (I).

A specific surface area of the metal azo pigment used in the present invention is preferably 20 to 200 m²/g. The lower limit is preferably 60 m²/g or more and more preferably 90 m²/g or more. The upper limit is preferably 160 m²/g or less and more preferably 150 m²/g or less. The value of the specific surface area of the metal azo pigment in the present specification is a value measured by DIN 66131: determination of the specific surface area of solids by gas adsorption, according to Brunauer, Emmett and Teller (BET) method.

(Substituent T)

Examples of the substituent T include the following groups: an alkyl group (preferably an alkyl group having 1 to 30 carbon atoms), an alkenyl group (preferably an alkenyl group having 2 to 30 carbon atoms), an alkynyl group (preferably an alkynyl group having 2 to 30 carbon atoms), an aryl group (preferably an aryl group having 6 to 30 carbon atoms), an amino group (preferably an amino group having 0 to 30 carbon atoms), an alkoxy group (preferably an alkoxy group having 1 to 30 carbon atoms), an aryloxy group (preferably an aryloxy group having 6 to 30 carbon atoms), a heteroaryloxy group, an acyl group (preferably an acyl group having 1 to 30 carbon atoms), an alkoxycarbonyl group (preferably an alkoxycarbonyl group having 2 to 30 carbon atoms), an aryloxycarbonyl group (preferably an aryloxycarbonyl group having 7 to 30 carbon atoms), a heteroaryloxycarbonyl group, an acyloxy group (preferably an acyloxy group having 2 to 30 carbon atoms), an acylamino group (preferably an acylamino group having 2 to 30 carbon atoms), an alkoxycarbonylamino group (preferably an alkoxycarbonylamino group having 2 to 30 carbon atoms), an aryloxycarbonylamino group (preferably an aryloxycarbonylamino group having 7 to 30 carbon atoms), a sulfamoyl group (preferably a sulfamoyl group having 0 to 30 carbon atoms), a carbamoyl group (preferably a carbamoyl group having 1 to 30 carbon atoms), an alkylthio group (preferably an alkylthio group having 1 to 30 carbon atoms), an arylthio group (preferably an arylthio group having 6 to 30 carbon atoms), a heteroarylthio group (preferably having 1 to 30 carbon atoms), an alkylsulfonyl group (preferably having 1 to 30 carbon atoms), an arylsulfonyl group (preferably having 6 to 30 carbon atoms), a heteroarylsulfonyl group (preferably having 1 to 30 carbon atoms), an alkylsulfinyl group (preferably having 1 to 30 carbon atoms), an arylsulfinyl group (preferably having 6 to 30 carbon atoms), a heteroarylsulfinyl group (preferably having 1 to 30 carbon atoms), a ureido group (preferably having 1 to 30 carbon atoms), a hydroxy group, a carboxyl group, a sulfo group, a phosphoric acid group, a carboxylic acid amide group, a sulfonic acid amide group, an imide acid group, a mercapto group, a halogen atom, a cyano group, an alkylsulfino group, an arylsulfino group, a hydrazino group, an imino group, and a heteroaryl group (preferably having 1 to 30 carbon atoms). In a case where these groups can be further substituted, these groups may further have a substituent. Examples of the further substituent include the groups described in the substituent T.

In the metal azo pigment, it is preferable that the at least one kind of an anion selected from an azo compound represented by Formula (I) or an azo compound having a tautomeric structure of the azo compound represented by Formula (I), and the metal ion form a metal complex. For example, in a case of a divalent metal ion Me, the anion and the metal ion can form a metal complex having a structure represented by Formula (Ia). In addition, the metal ion Me may be bonded through a nitrogen atom in the tautomer citation of Formula (Ia).

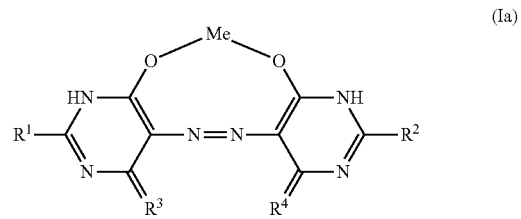

(Ia)

Examples of a preferable aspect of the metal azo pigment used in the present invention include metal azo pigments according to the following aspects (1) to (4). Since the effects of the present invention can be more remarkably obtained, the hardness is low, refining in a dispersion step is possible, and for example, color unevenness performance required for a refined color filter can be improved, a metal azo pigment according to the aspect (1) is preferable.

(1) A metal azo pigment according to an aspect including the at least one kind of an anion selected from an azo compound represented by Formula (I) or an azo compound having a tautomeric structure of the azo compound represented by Formula (I), metal ions including at least $Zn^{2+}$ and $Cu^{2+}$, and a melamine compound. In this aspect, $Zn^{2+}$ and $Cu^{2+}$ are contained preferably in the total amount of 95% to 100% by mole, more preferably 98% to 100% by mole, still more preferably 99.9% to 100% by mole, and particularly preferably 100% by mole based on 1 mol of all the metal ions of the metal azo pigment. In addition, a molar ratio of $Zn^{2+}$ to $Cu^{2+}$ in the metal azo pigment is preferably $Zn^{2+}$:$Cu^{2+}$=199:1 to 1:15, more preferably 19:1 to 1:1, and still more preferably 9:1 to 2:1. In addition, in this aspect, the metal azo pigment may further include a divalent or trivalent metal ion (hereinafter, also referred to as a metal ion Me1) in addition to $Zn^{2+}$ and $Cu^{2+}$. Examples of the metal ion Me1 include $Ni^{2+}$, $Al^{3+}$, $Fe^{2+}$, $Fe^{3+}$, $Co^{2+}$, $Co^{3+}$, $La^{3+}$, $Ce^{3+}$, $Pr^{3+}$, $Nd^{2+}$, $Nd^{3+}$, $Sm^{2+}$, $Sm^{3+}$, $Eu^{2+}$, $Eu^{3+}$, $Gd^{3+}$, $Tb^{3+}$, $Dy^{3+}$, $Ho^{3+}$, $Yb^{2+}$, $Yb^{3+}$, $Er^{3+}$, $Tm^{3+}$, $Mg^{2+}$, $Ca^{2+}$, $Sr^{2+}$, $Mn^{2+}$, $Y^{3+}$, $Sc^{3+}$, $Ti^{2+}$, $Ti^{3+}$, $Nb^{3+}$, $Mo^{2+}$, $Mo^{3+}$, $V^{2+}$, $V^{3+}$, $Zr^{2+}$, $Zr^{3+}$, $Cd^{2+}$, $Cr^{3+}$, $Pb^{2+}$, and $Ba^{2+}$. Among these, at least one selected from $Al^{3+}$, $Fe^{2+}$, $Fe^{3+}$, $Co^{2+}$, $Co^{3+}$, $La^{3+}$, $Ce^{3+}$, $Pr^{3+}$, $Nd^{3+}$, $Sm^{3+}$, $Eu^{3+}$, $Gd^{3+}$, $Tb^{3+}$, $Dy^{3+}$, $Ho^{3+}$, $Yb^{3+}$, $Er^{3+}$, $Tm^{3+}$, $Mg^{2+}$, $Ca^{2+}$, $Sr^{2+}$, $Mn^{2+}$, or $Y^{3+}$ is preferable, at least one selected from $Al^{3+}$, $Fe^{2+}$, $Fe^{3+}$, $Co^{2+}$, $Co^{3+}$, $La^{3+}$, $Ce^{3+}$, $Pr^{3+}$, $Nd^{3+}$, $Sm^{3+}$, $Tb^{3+}$, $Ho^{3+}$, or $Sr^{2+}$ is still more preferable, and at least one selected from $Al^{3+}$, $Fe^{2+}$, $Fe^{3+}$, $Co^{2+}$, or $Co^{3+}$ is particularly preferable. The content of the metal ion Me1 is preferably 5% by mole or less, more preferably 2% by mole or less, and still more preferably 0.1% by mole or less based on 1 mol of all the metal ions of the metal azo pigment.

(2) A metal azo pigment according to an aspect including the at least one kind of an anion selected from an azo compound represented by Formula (I) or an azo compound having a tautomeric structure of the azo compound represented by Formula (I), metal ions, and a melamine compound, in which the metal ions further includes $Ni^{2+}$, $Zn^{2+}$, and at least one metal ion Me2, and the metal ion Me2 is at least one selected from $La^{3+}$, $Ce^{3+}$, $Pr^{3+}$, $Nd^{2+}$, $Nd^{3+}$, $Sm^{2+}$, $Sm^{3+}$, $Eu^{2+}$, $Eu^{3+}$, $Gd^{3+}$, $Tb^{3+}$, $Dy^{3+}$, $Ho^{3+}$, $Er^{3+}$, $Tm^{3+}$, $Yb^{2+}$, $Yb^{3+}$, $Mg^{2+}$, $Ca^{2+}$, $Sr^{2+}$, $Ba^{2+}$, $Sc^{3+}$, $Y^{3+}$, $Ti^{2+}$, $Ti^{3+}$, $Zr^{2+}$, $Zr^{3+}$, $V^{2+}$, $V^{3+}$, $Nb^{3+}$, $Cr^{3+}$, $Mo^{2+}$, $Mo^{3+}$, $Mn^{2+}$, $Cd^{2+}$, or $Pb^{2+}$. As the metal ion Me2, at least one selected from $La^{3+}$, $Ce^{3+}$, $Pr^{3+}$, $Nd^{3+}$, $Sm^{3+}$, $Eu^{3+}$, $Gd^{3+}$, $Tb^{3+}$, $Dy^{3+}$, $Ho^{3+}$, $Er^{3+}$, $Tm^{3+}$, $Yb^{3+}$, $Mg^{2+}$, $Ca^{2+}$, $Sr^{2+}$, $Y^{3+}$, or $Mn^{2+}$ is preferable, and at least one selected from $La^{3+}$, $Ce^{3+}$, $Pr^{3+}$, $Nd^{3+}$, $Sm^{3+}$, $Tb^{3+}$, $Ho^{3+}$, or $Sr^{2+}$ is more preferable. In this aspect, it is preferable that $Zn^{2+}$ and $Ni^{2+}$ are contained in the total amount of 75% to 99.5% by mole and the metal ion Me2 is contained 0.5% to 25% by mole based on 1 mol of all the metal ions of the metal azo pigment, it is more preferable that $Zn^{2+}$ and $Ni^{2+}$ are contained in the total amount of 78% to 95% by mole and the metal ion Me2 is contained 5% to 22% by mole based on 1 mol of all the metal ions of the metal azo pigment, and it is still preferable that $Zn^{2+}$ and $Ni^{2+}$ are contained in the total amount of 82% to 90% by mole and the metal ion Me2 is contained 10% to 18% by mole based on 1 mol of all the metal ions of the metal azo pigment. In addition, a molar ratio of $Zn^{2+}$ to $Ni^{2+}$ in the metal azo pigment is preferably $Zn^{2+}:Ni^{2+}$=90:3 to 3:90, more preferably 80:5 to 5:80, and still more preferably 60:33 to 33:60.

(3) A metal azo pigment according to an aspect including the at least one kind of an anion selected from an azo compound represented by Formula (I) or an azo compound having a tautomeric structure of the azo compound represented by Formula (I), metal ions, and a melamine compound, in which the metal ions further includes $Ni^{2+}$, $Cu^{2+}$, and at least one metal ion Me3, and the metal ion Me3 is at least one selected from $La^{3+}$, $Ce^{3+}$, $Pr^{3+}$, $Nd^{2+}$, $Nd^{3+}$, $Sm^{2+}$, $Sm^{3+}$, $Eu^{2+}$, $Eu^{3+}$, $Gd^{3+}$, $Tb^{3+}$, $Dy^{3+}$, $Ho^{3+}$, $Yb^{2+}$, $Yb^{3+}$, $Er^{3+}$, $Tm^{3+}$, $Mg^{2+}$, $Ca^{2+}$, $Sr^{2+}$, $Mn^{2+}$, $Y^{3+}$, $Sc^{3+}$, $Ti^{2+}$, $Ti^{3+}$, $Nb^{3+}$, $Mo^{2+}$, $Mo^{3+}$, $V^{2+}$, $V^{3+}$, $Zr^{2+}$, $Zr^{3+}$, $Cd^{2+}$, $Cr^{3+}$, $Pb^{2+}$, or $Ba^{2+}$. As the metal ion Me3, at least one selected from $La^{3+}$ $Ce^{3+}$, $Pr^{3+}$, $Nd^{3+}$, $Sm^{3+}$, $Eu^{3+}$, $Gd^{3+}$, $Tb^{3+}$, $Dy^{3+}$, $Ho^{3+}$, $Yb^{3+}$, $Er^{3+}$, $Tm^{3+}$, $Mg^{2+}$, $Ca^{2+}$, $Sr^{2+}$, $Mn^{2+}$, or $Y^{3+}$ is preferable, and at least one selected from $La^{3+}$, $Ce^{3+}$, $Pr^{3+}$, $Nd^{3+}$, $Sm^{3+}$, $Tb^{3+}$, $Ho^{3+}$, or $Sr^{2+}$ is more preferable. In this aspect, it is preferable that $Cu^{2+}$ and $Ni^{2+}$ are contained in the total amount of 70% to 99.5% by mole and the metal ion Me3 is contained 0.5% to 30% by mole based on 1 mol of all the metal ions of the metal azo pigment, it is more preferable that $Cu^{2+}$ and $Ni^{2+}$ are contained in the total amount of 75% to 95% by mole and the metal ion Me3 is contained 5% to 25% by mole based on 1 mol of all the metal ions of the metal azo pigment, and it is still preferable that $Cu^{2+}$ and $Ni^{2+}$ are contained in the total amount of 80% to 90% by mole and the metal ion Me3 is contained 10% to 20% by mole based on 1 mol of all the metal ions of the metal azo pigment. In addition, a molar ratio of $Cu^{2+}$ to $Ni^{2+}$ in the metal azo pigment is preferably $Cu^{2+}:Ni^{2+}$=42:1 to 1:42, more preferably 10:1 to 1:10, and still more preferably 3:1 to 1:3.

(4) A metal azo pigment according to an aspect including the at least one kind of an anion selected from an azo compound represented by Formula (I) or an azo compound having a tautomeric structure of the azo compound represented by Formula (I), metal ions, and a melamine compound, in which the metal ions include $Ni^{2+}$ and a metal ion Me4a, and the metal ion Me4a is at least one selected from $La^{3+}$, $Ce^{3+}$, $Pr^{3+}$, $Nd^{2+}$, $Nd^{3+}$, $Sm^{2+}$, $Sm^{3+}$, $Eu^{2+}$, $Eu^{3+}$, $Gd^{3+}$, $Tb^{3+}$, $Dy^{3+}$, $Ho^{3+}$, $Er^{3+}$, $Tm^{3+}$, $Yb^{2+}$, or $Yb^{3+}$. As the metal ion Me4a, at least one selected from $La^{3+}$, $Ce^{3+}$, $Pr^{3+}$, $Nd^{3+}$, $Sm^{3+}$, $Eu^{3+}$, $Gd^{3+}$, $Tb^{3+}$, $Dy^{3+}$, $Ho^{3+}$, $Er^{3+}$, $Tm^{3+}$, or $Yb^{3+}$ is preferable, and at least one selected from $La^{3+}$, $Ce^{3+}$, $Pr^{3+}$, $Nd^{3+}$, $Sm^{3+}$, $Tb^{3+}$, or $Ho^{3+}$ is more preferable. In this aspect, $Ni^{2+}$ and the metal ion Me4a are contained preferably in the total amount of 95% to 100% by mole, more preferably 98% to 100% by mole, still more preferably 99.9% to 100% by mole, and particularly preferably 100% by mole based on 1 mol of all the metal ions of the metal azo pigment. In addition, a molar ratio of $Ni^{2+}$ to the metal ion Me4a in the metal azo pigment is preferably $Ni^{2+}$:metal ion Me4a=1:1 to 19:1, more preferably 2:1 to 4:1, and still more preferably 2.3:1 to 3:1. In addition, in this aspect, the metal azo pigment may further include a metal ion (hereinafter, also referred to as a metal ion Me4b) in addition to $Ni^{2+}$ and the metal ion Me4a. Examples of the metal ion Me4b include $Mg^{2+}$, $Ca^{2+}$, $Sr^{2+}$, $Ba^{2+}$, $Sc^{3+}$, $Y^{3+}$, $Ti^{2+}$, $Ti^{3+}$, $Zr^{2+}$, $Zr^{3+}$, $V^{2+}$, $V^{3+}$, $N^{3+}$, $Cr^{3+}$, $Mo^{2+}$, $Mo^{3+}$, $Mn^{2+}$ $Fe^{2+}$, $Fe^{3+}$, $Co^{2+}$, $Co^{3+}$, $Cu^{2+}$, $Zn^{2+}$, $Cd^{2+}$, $Al^{3+}$, and $Pb^{2+}$. Among these, at least one selected from $Mg^{2+}$, $Ca^{2+}$, $Sr^{2+}$, $Y^{3+}$, $Mn^{2+}$, $Fe^{2+}$, $Fe^{3+}$, $Co^{2+}$, $Co^{3+}$, $Cu^{2+}$, $Zn^{2+}$, or $Al^{3+}$ is preferable, and at least one selected from $Sr^{2+}$, $Fe^{2+}$, $Fe^{3+}$, $Co^{2+}$, $Co^{3+}$, $Cu^{2+}$, $Zn^{2+}$, or $Al^{3+}$ is more preferable. The content of the metal ion Me4b is preferably 5% by mole or less, more preferably 2% by mole or less, and still more preferably 0.1% by mole or less based on 1 mol of all the metal ions of the metal azo pigment.

In the metal azo pigment used in the present invention, it is preferable that the metal azo compound composed of the at least one kind of an anion selected from an azo compound represented by Formula (I) or an azo compound having a tautomeric structure of the azo compound represented by Formula (I) and the metal ion, and the melamine compound (preferably the compound represented by Formula (II)) form an adduct. It is understood that the adduct means a molecular assembly. A bond between the molecules may be formed, for example, by an intermolecular interaction, by a Lewis acid-base interaction, or by a coordinate bond or a chain bond. In addition, the adduct may have a structure such as an inclusion compound (clathrate) in which a guest molecule is incorporated into a lattice of host molecules. In addition, the adduct may have a structure such as composite intercalation crystals (including an interstitial compound). The composite intercalation crystals refer to a chemically non-stoichiometric crystalline compound composed of at least two elements. In addition, the adduct may be mixed substitution crystals in which two materials form a co-crystal and atoms of a second component are positioned at positions of a regular lattice of a first component.

The metal azo pigment used in the present invention may be a physical mixture or a chemically composite compound. A physical mixture is preferable.

Preferred examples of the physical mixture in a case of the metal azo pigment according to the aspect (1) include (1-1) and (1-2) described below. In addition, in a case where the metal azo pigment according to the aspect (1) is a chemically composite compound, it is preferable that $Zn^{2+}$, $Cu^{2+}$, and any additional metal ion Me1 are incorporated into a common crystal lattice.

(1-1) A physical mixture including an adduct 1a of a metal azo compound composed of the anion and $Zn^{2+}$ and a melamine compound, and an adduct 1b of a metal azo compound composed of the anion and $Cu^{2+}$ and a melamine compound.

(1-2) A physical mixture in which the physical mixture (1-1) further includes an adduct 1c of a metal azo compound composed of the anion and the metal ion Me1 and a melamine compound.

Preferred examples of the physical mixture in a case of the metal azo pigment according to the aspect (2) include (2-1) described below. In addition, in a case where the metal azo pigment according to the aspect (2) is a chemically composite compound, it is preferable that $Ni^{2+}$, $Zn^{2+}$, and the metal ion Me2 are incorporated into a common crystal lattice.

(2-1) A physical mixture including an adduct 2a of a metal azo compound composed of the anion and $Ni^{2+}$ and a melamine compound, an adduct 2b of a metal azo compound composed of the anion and $Zn^{2+}$ and a melamine compound, and an adduct 2c of a metal azo compound composed of the anion and the metal ion Me2 and a melamine compound.

Preferred examples of the physical mixture in a case of the metal azo pigment according to the aspect (3) include (3-1) described below. In addition, in a case where the metal azo pigment according to the aspect (3) is a chemically composite compound, it is preferable that $Ni^{2+}$, $Cu^{2+}$, and the metal ion Me3 are incorporated into a common crystal lattice.

(3-1) A physical mixture including an adduct 3a of a metal azo compound composed of the anion and $Ni^{2+}$ and a melamine compound, an adduct 3b of a metal azo compound composed of the anion and $Cu^{2+}$ and a melamine compound, and an adduct 3c of a metal azo compound composed of the anion and the metal ion Me3 and a melamine compound.

Preferred examples of the physical mixture in a case of the metal azo pigment according to the aspect (4) include (4-1) and (4-2) described below. In addition, in a case where the metal azo pigment according to the aspect (4) is a chemically composite compound, it is preferable that $Ni^{2+}$, the metal ion Me4a, and any additional metal ion Me4b are incorporated into a common crystal lattice.

(4-1) A physical mixture including an adduct 4a of a metal azo compound composed of the anion and $Ni^{2+}$ and a melamine compound and an adduct 4b of a metal azo compound composed of the anion and the metal ion Me4a and a melamine compound.

(4-2) A physical mixture in which the physical mixture (4-1) further includes an adduct 4c of a metal azo compound composed of the anion and the metal ion Me4b and a melamine compound.

The metal azo pigment according to the aspect (1) can be produced by reacting a compound represented by Formula (III) or a tautomer thereof with a zinc salt, a copper salt, and optionally a salt of the metal ion Me1 in the presence of a melamine compound (preferably the compound represented by Formula (II)).

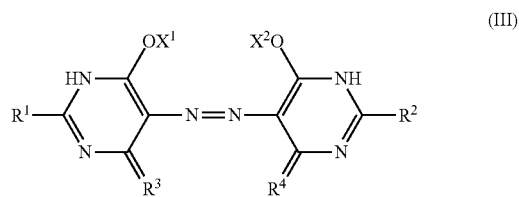

In the formula, $X^1$ and $X^2$ each independently represent a hydrogen atom or an alkali metal ion, and at least one of $X^1$ or $X^2$ represents an alkali metal ion. $R^1$ and $R^2$ each independently represent OH or $NR^5R^6$. $R^3$ and $R^4$ each independently represent =O or =$NR^7$, and $R^5$ to $R^7$ each independently represent a hydrogen atom or an alkyl group. $R^1$ to $R^7$ have the same meanings as $R^1$ to $R^7$ in Formula (I), and preferred ranges thereof are also the same. As the alkali metal ion represented by $X^1$ and $X^2$, $Na^+$ and $K^+$ are preferable.

The amount of the zinc salt to be used is preferably 0.05 to 0.995 mol, more preferably 0.05 to 0.5 mol, and still more preferably 0.1 to 0.3 mol with respect to 1 mol of the compound represented by Formula (III) or the tautomer thereof. In addition, the amount of the copper salt to be used is preferably 0.005 to 0.95 mol, more preferably 0.49 to 0.95 mol, and still more preferably 0.7 to 0.9 mol with respect to 1 mol of the compound represented by Formula (III) or the tautomer thereof. In addition, the amount of the salt of the metal ion Me1 to be used is preferably 0.05 mol or less and more preferably 0.01 mol or less with respect to 1 mol of the compound represented by Formula (III) or the tautomer thereof. In addition, it is preferable that the total amount of the zinc salt, the copper salt, and the salt of the metal ion Me1 is 1 mol with respect to 1 mol of the compound represented by Formula (III). In addition, the amount of the melamine compound to be used is preferably 0.05 to 4 mol, more preferably 0.5 to 2.5 mol, and still more preferably 1.0 to 2.0 mol with respect to 1 mol of the compound represented by Formula (III) or the tautomer thereof.

In addition, the metal azo pigment according to the aspect (1) can also be produced by mixing the adduct 1a, the adduct 1b, and the adduct 1c.

The metal azo pigment according to the aspect (2), the metal azo pigment according to the aspect (3), and the metal azo pigment according to the aspect (4) can be produced using the same method as the above-described method.

The details of the metal azo pigment can be found in paragraph Nos. 0011 to 0062 and 0137 to 0276 of JP2017-171912A, paragraph Nos. 0010 to 0062 and 0138 to 0295 of JP2017-171913A, paragraph Nos. 0011 to 0062 and 0139 to 0190 of JP2017-171914A, and paragraph Nos. 0010 to 0065 and 0142 to 0222 of JP2017-171915A, the contents of which are incorporated herein by reference.

In the coloring composition of the embodiment of the present invention, the content of the metal azo pigment is preferably 1% to 80% by mass with respect to the total solid content of the coloring composition. The lower limit is preferably 3% by mass or more and more preferably 5% by mass or more. The upper limit is preferably 77% by mass or less and more preferably 75% by mass or less.

<<Other Colorants>>

The coloring composition of the embodiment of the present invention can contain a colorant (hereinafter, also referred to as other colorants) other than the above-described metal azo pigment. Examples of the other colorants include a chromatic colorant and a black colorant.

(Chromatic Colorant)

Examples of the chromatic colorant include red colorants, green colorants, blue colorants, yellow colorants, violet colorants, and orange colorants. The chromatic colorant may be either a pigment or a dye. It is preferable that the chromatic colorant includes a pigment. In a case where the coloring composition of the embodiment of the present invention further includes a different kind of pigment in addition to the metal azo pigment, growth of a foreign matter of the metal azo pigment under a high-temperature and high-humidity environment can be suppressed.

Examples of the pigment include an organic pigment and an inorganic pigment, and an organic pigment is preferable. Examples of the organic pigment include the following pigments:

Color Index (C. I.) Pigment Yellow 1, 2, 3, 4, 5, 6, 10, 11, 12, 13, 14, 15, 16, 17, 18, 20, 24, 31, 32, 34, 35, 35:1, 36, 36:1, 37, 37:1, 40, 42, 43, 53, 55, 60, 61, 62, 63, 65, 73, 74, 77, 81, 83, 86, 93, 94, 95, 97, 98, 100, 101, 104, 106, 108, 109, 110, 113, 114, 115, 116, 117, 118, 119, 120, 123, 125, 126, 127, 128, 129, 137, 138, 139, 147, 148, 150, 151, 152, 153, 154, 155, 156, 161, 162, 164, 166, 167, 168, 169, 170, 171, 172, 173, 174, 175, 176, 177, 179, 180, 181, 182, 185, 187, 188, 193, 194, 199, 213, and 214 (all of which are yellow pigments);

C. I. Pigment Orange 2, 5, 13, 16, 17:1, 31, 34, 36, 38, 43, 46, 48, 49, 51, 52, 55, 59, 60, 61, 62, 64, 71, and 73 (all of which are orange pigments);

C. I. Pigment Red 1, 2, 3, 4, 5, 6, 7, 9, 10, 14, 17, 22, 23, 31, 38, 41, 48:1, 48:2, 48:3, 48:4, 49, 49:1, 49:2, 52:1, 52:2, 53:1, 57:1, 60:1, 63:1, 66, 67, 81:1, 81:2, 81:3, 83, 88, 90, 105, 112, 119, 122, 123, 144, 146, 149, 150, 155, 166, 168, 169, 170, 171, 172, 175, 176, 177, 178, 179, 184, 185, 187, 188, 190, 200, 202, 206, 207, 208, 209, 210, 216, 220, 224, 226, 242, 246, 254, 255, 264, 270, 272, and 279 (all of which are red pigments);

C. I. Pigment Green 7, 10, 36, 37, 58, and 59 (all of which are green pigments);

C. I. Pigment Violet 1, 19, 23, 27, 32, 37, and 42 (all of which are violet pigments); and C. I. Pigment Blue 1, 2, 15, 15:1, 15:2, 15:3, 15:4, 15:6, 16, 22, 60, 64, 66, 79, and 80 (all of which are blue pigments).

Among these organic pigments, one kind thereof may be used alone, or two or more kinds thereof may be used in combination.

The dye is not particularly limited and a known dye can be used. For example, a pyrazoleazo-based dye, an anilinoazo-based dye, a triarylmethane-based dye, an anthraquinone-based dye, an anthrapyridone-based dye, a benzylidene-based dye, an oxonol-based dye, a pyrazolotriazoleazo-based dye, a pyridoneazo-based dye, a cyanine-based dye, a phenothiazine-based dye, a pyrrolopyrazoleazomethine-based dye, a xanthene-based dye, a phthalocyanine-based dye, a benzopyran-based dye, an indigo-based dye, a pyrromethane-based dye, or the like can be used. Moreover, a multimer of the dyes may be used. In addition, dyes described in JP2015-028144A and JP2015-034966A can also be used.

In addition, a halogenated zinc phthalocyanine pigment having an average number of halogen atoms in one molecule of 10 to 14, an average number of bromine atoms in one molecule of 8 to 12, and an average number of chlorine atoms in one molecule of 2 to 5 can also be used as the green pigment. Specific examples thereof include the compounds described in WO2015/118720A.

In addition, an aluminum phthalocyanine compound having a phosphorus atom can also be used as the blue pigment. Specific examples thereof include the compounds described in paragraphs 0022 to 0030 of JP2012-247591A and paragraph 0047 of JP2011-157478A.

In addition, as the red pigment, a compound having a structure that an aromatic ring group in which a group bonded with an oxygen atom, a sulfur atom, or a nitrogen atom is introduced to an aromatic ring is bonded to a diketopyrrolopyrrole skeleton can be used. As the compound, a compound represented by Formula (DPP1) is preferable, and a compound represented by Formula (DPP2) is more preferable.

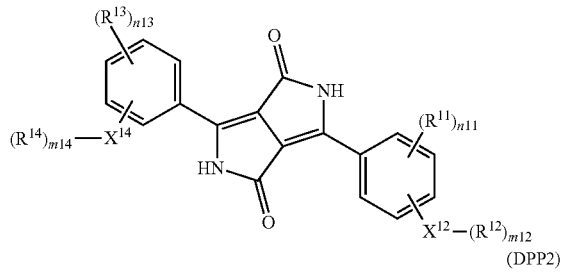
(DPP1)

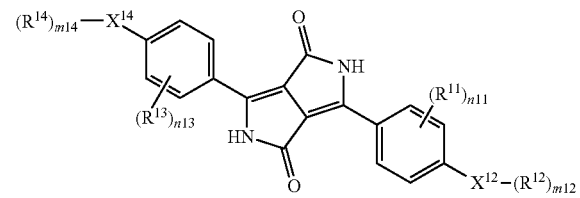
(DPP2)

In the formulae, $R^{11}$ and $R^{13}$ each independently represent a substituent, $R^{12}$ and $R^{14}$ each independently represent a hydrogen atom, an alkyl group, an aryl group, or a heteroaryl group, n11 and n13 each independently represent an integer of 0 to 4, $X^{12}$ and $X^{14}$ each independently represent an oxygen atom, a sulfur atom, or a nitrogen atom, in a case where $X^{12}$ is an oxygen atom or a sulfur atom, m12 represents 1, in a case where $X^{12}$ is a nitrogen atom, m12 represents 2, in a case where $X^{14}$ is an oxygen atom or a sulfur atom, m14 represents 1, and in a case where $X^{14}$ is a nitrogen atom, m14 represents 2. Examples of the substituent represented by $R^{11}$ and $R^{13}$ include the groups in the above-described substituent T, and preferred specific examples thereof include an alkyl group, an aryl group, a halogen atom, an acyl group, an alkoxycarbonyl group, an aryloxycarbonyl group, a heteroaryloxycarbonyl group, an amide group, a cyano group, a nitro group, a trifluoromethyl group, a sulfoxide group, and a sulfo group.

The dye is not particularly limited and a known dye can be used. As chemical structures thereof, a pyrazoleazo-based dye, an anilinoazo-based dye, a triarylmethane-based dye, an anthraquinone-based dye, an anthrapyridone-based dye, a benzylidene-based dye, an oxonol-based dye, a pyrazolotriazoleazo-based dye, a pyridoneazo-based dye, a cyanine-based dye, a phenothiazine-based dye, a pyrrolopyrazoleazomethine-based dye, a xanthene-based dye, a phthalocyanine-based dye, a benzopyran-based dye, an indigo-based dye, a pyrromethane-based dye, or the like can be used. Further, the thiazole compound described in JP2012-158649A, the azo compound described in JP2011-184493A, or the azo compound described in JP2011-145540A can also be preferably used. In addition, as yellow dyes, the quinophthalone compounds described in paragraph Nos. 0011 to 0034 of JP2013-054339A, the quinophthalone compounds described in paragraph Nos. 0013 to 0058 of JP2014-026228A, or the like can be used.

In addition, a coloring agent multimer can be used as the other colorants. The coloring agent multimer is preferably a dye that is used after being dissolved in a solvent, but the coloring agent multimer may form a particle. In a case where the coloring agent multimer is the particle, it is usually used in a state of being dispersed in a solvent. The coloring agent multimer in the particle state can be obtained by, for example, emulsion polymerization, and specific examples thereof include the compounds and production methods described in JP2015-214682A. The coloring agent multimer has two or more coloring agent structures in one molecule, and preferably has three or more coloring agent structures in one molecule. The upper limit is particularly not limited, but may be 100 or less. A plurality of coloring agent structures contained in one molecule may be the same coloring agent structures or different coloring agent structures. The weight-average molecular weight (Mw) of the coloring agent multimer is preferably 2,000 to 50,000. The lower limit is more preferably 3,000 or more and still more preferably 6,000 or more. The upper limit is more preferably 30,000 or less and still more preferably 20,000 or less. In addition, as the coloring agent multimer, the compounds described in JP2011-213925A, JP2013-041097A, JP2015-028144A, JP2015-030742A, or the like can also be used.

(Black Colorant)

Examples of the black colorant include inorganic black colorants such as carbon black, a metal oxynitride (titanium black and the like), and a metal nitride (titanium nitride and the like), and organic black colorants such as a bisbenzofuranone compound, an azomethine compound, a perylene compound, and an azo compound. As the organic black colorant, a bisbenzofuranone compound and a perylene compound are preferable. Examples of the bisbenzofuranone compound include the compounds described in JP2010-534726A, JP2012-515233A, JP2012-515234A, and the like, and the bisbenzofuranone compound is available, for example, as "Irgaphor Black" manufactured by BASF. Examples of the perylene compound include C. I. Pigment Black 31 and 32. Examples of the azomethine compound include the compounds described in JP1989-170601A (JP-H01-170601A) and JP1990-034664A (JP-H02-034664A), and the azomethine compound is available, for example, "CHROMOFINE BLACK A1103" manufactured by Dainichiseika Color & Chemicals Mfg. Co., Ltd. It is preferable that the bisbenzofuranone compound is compounds represented by the following formulae or a mixture thereof.

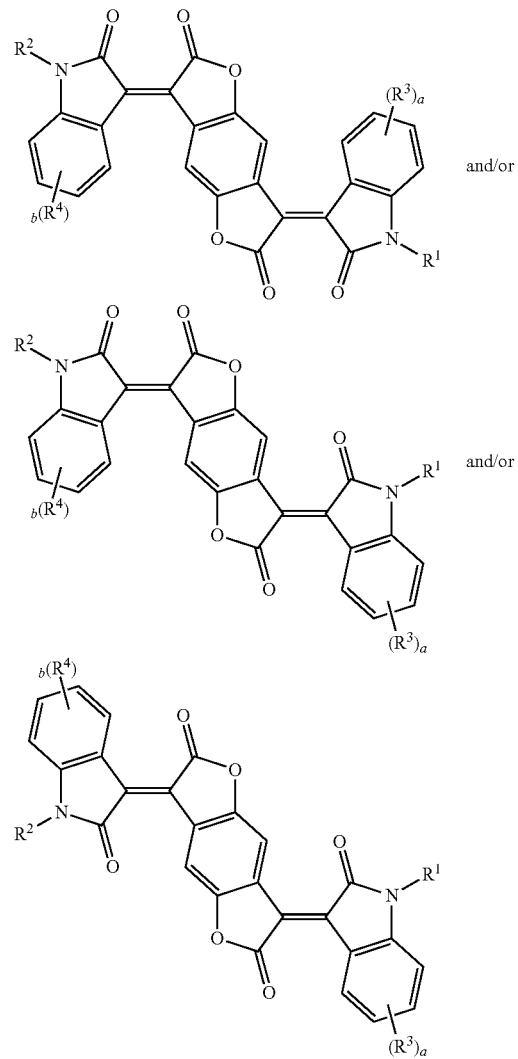

In the formulae, $R^1$ and $R^2$ each independently represent a hydrogen atom or a substituent, $R^3$ and $R^4$ each independently represent a substituent, a and b each independently represent an integer of 0 to 4, in a case where a is 2 or more, a plurality of $R^3$'s may be the same as or different from each other and may be bonded to each other to form a ring, and in a case where b is 2 or more, a plurality of $R^4$'s may be the same as or different from each other and may be bonded to each other to form a ring.

The substituent represented by $R^1$ to $R^4$ is a halogen atom, a cyano group, a nitro group, an alkyl group, an alkenyl group, an alkynyl group, an aralkyl group, an aryl group, a heteroaryl group, —$OR^{301}$, —$COR^{302}$, —$COOR^{303}$, —$OCOR^{304}$—$NR^{305}R^{306}$, —$NHCOR^{307}$, —$CONR^{308}R^{309}$, —$NHCONR^{310}R^{311}$, —$NHCOOR^{312}$, —$SR^{313}$, —$SO_2R^{314}$, —$SO_2R^{315}$, —$NHSO_2R^{316}$ or —$S_2NR^{317}R^{318}$, $R^{301}$ to $R^{318}$ each independently represent a hydrogen atom, an alkyl group, an alkenyl group, an alkynyl group, an aryl group, or a heteroaryl group.

The details of the bisbenzofuranone compound can be found in paragraph Nos. 0014 to 0037 of JP2010-534726A, the content of which is incorporated herein by reference.

In a case where the coloring composition of the embodiment of the present invention includes the other colorants, black may be formed by a combination of the metal azo pigment and the other colorants.

In a case where the coloring composition of the embodiment of the present invention contains the other colorants, the content of the other colorants is preferably 5% to 75% by mass with respect to the total solid content of the coloring composition. The lower limit is preferably 8% by mass or more and more preferably 10% by mass or more. The upper limit is preferably 72% by mass or less and more preferably 70% by mass or less. In addition, the content of the other colorants is preferably 5 to 2,000 parts by mass with respect to 100 parts by mass of the metal azo pigment. The lower limit is preferably 8 parts by mass or more and more preferably 10 parts by mass or more. The upper limit is preferably 1,700 parts by mass or less and more preferably 1,500 parts by mass or less. In addition, the total content of the metal azo pigment and the other colorants is preferably 10% to 80% by mass with respect to the total solid content of the coloring composition. The lower limit is preferably 15% by mass or more and more preferably 20% by mass or more. The upper limit is preferably 77% by mass or less and more preferably 75% by mass or less.

In a case where a colorant including a yellow colorant is used as the other colorants, the content of the yellow colorant as the other colorants is preferably 5 to 95 parts by mass with respect to 100 parts by mass of the metal azo pigment. The lower limit is preferably 8 parts by mass or more and more preferably 10 parts by mass or more. The upper limit is preferably 92 parts by mass or less and more preferably 90 parts by mass or less. According to this aspect, the coloring composition of the embodiment of the present invention can be preferably used as a coloring composition for yellow pixels. Furthermore, by further including a different kind of pigment, it is possible to suppress growth of a foreign matter of the metal azo pigment under a high-temperature and high-humidity environment. As the yellow colorant, for example, C. I. Pigment Yellow 62, 83, 74, 100, 129, 138, 139, 150, 168, 169, 183, 185, 213, and the like are preferably used.

In a case where a colorant including a green colorant is used as the other colorants, the content of the green colorant as the other colorants is preferably 5 to 95 parts by mass with respect to 100 parts by mass of the metal azo pigment. The lower limit is preferably 8 parts by mass or more and more preferably 10 parts by mass or more. The upper limit is preferably 92 parts by mass or less and more preferably 90 parts by mass or less. According to this aspect, the coloring composition of the embodiment of the present invention can be preferably used as a coloring composition for green pixels. Furthermore, by further including a different kind of pigment, it is possible to suppress growth of a foreign matter of the metal azo pigment under a high-temperature and high-humidity environment. As the green colorant, for example, C. I. Pigment Green 7, 36, 58, 59, and the like are preferably used.

In a case where a colorant including a red colorant is used as the other colorants, the content of the red colorant as the other colorants is preferably 5 to 95 parts by mass with respect to 100 parts by mass of the metal azo pigment. The lower limit is preferably 8 parts by mass or more and more preferably 10 parts by mass or more. The upper limit is preferably 92 parts by mass or less and more preferably 90 parts by mass or less. According to this aspect, the coloring composition of the embodiment of the present invention can be preferably used as a coloring composition for red pixels. Furthermore, by further including a different kind of pigment, it is possible to suppress growth of a foreign matter of the metal azo pigment under a high-temperature and high-humidity environment. As the red colorant, for example, C. I. Pigment Red 122, 177, 202, 209, 254, 264, 269, and the like are preferably used.

In a case where a colorant including an orange colorant is used as the other colorants, the content of the orange colorant as the other colorants is preferably 5 to 95 parts by mass with respect to 100 parts by mass of the metal azo pigment. The lower limit is preferably 8 parts by mass or more and more preferably 10 parts by mass or more. The upper limit is preferably 92 parts by mass or less and more preferably 90 parts by mass or less. According to this aspect, the coloring composition of the embodiment of the present invention can be preferably used as a coloring composition for red pixels. Furthermore, by further including a different kind of pigment, it is possible to suppress growth of a foreign matter of the metal azo pigment under a high-temperature and high-humidity environment. As the orange colorant, for example, C. I. Pigment Orange 38, 71, and the like are preferably used.

<<Compound Having Ethylenically Unsaturated Bonding Group>>

The coloring composition of the embodiment of the present invention contains a compound having an ethylenically unsaturated bonding group. Examples of the ethylenically unsaturated bonding group include a vinyl group, a (meth)allyl group, and a (meth)acryloyl group. The compound having an ethylenically unsaturated bonding group may be either a monomer or a resin such as a polymer. Hereinafter, a monomer having an ethylenically unsaturated bonding group is referred to as a polymerizable monomer. In addition, a polymer having an ethylenically unsaturated bonding group is referred to as a polymerizable polymer.

The molecular weight of the polymerizable monomer is preferably less than 3,000. The upper limit is more preferably 2,000 or less and still more preferably 1,500 or less. The lower limit is preferably 100 or more, more preferably 150 or more, and still more preferably 250 or more. The polymerizable monomer is preferably a compound including three or more ethylenically unsaturated bonding groups, more preferably a compound including 3 to 15 ethylenically unsaturated bonding groups, and still more preferably a compound having 3 to 6 ethylenically unsaturated bonding groups. In addition, the polymerizable monomer is preferably a trifunctional to pentadecafunctional (meth)acrylate compound and more preferably a trifunctional to hexafunctional (meth)acrylate compound. Specific examples of the polymerizable monomer include the compounds described in paragraph Nos. 0095 to 0108 of JP2009-288705A, paragraph No. 0227 of JP2013-029760A, and paragraph Nos. 0254 to 0257 of JP2008-292970A, and the contents of which are incorporated herein by reference.

A C═C equivalent (the molecular weight [g/mol] of the polymerizable monomer/the number of the ethylenically unsaturated bonding groups included in the polymerizable monomer) of the polymerizable monomer is preferably 50 to 1,000. The lower limit is preferably 60 or more and more preferably 70 or more. The upper limit is preferably 700 or less, more preferably 500 or less, still more preferably 200 or less, even still more preferably 150 or less, and particularly preferably 140 or less. In a case where the C═C equivalent of the polymerizable monomer is within the above-described range, the polymerizable monomer can be effectively adsorbed to the pigment active surface and aggregation of the metal azo pigment can be more remarkably suppressed.

Examples of the polymerizable monomer include compounds such as dipentaerythritol triacrylate (as a commercially available product, KAYARAD D-330 manufactured by Nippon Kayaku Co., Ltd.), dipentaerythritol tetraacrylate (as a commercially available product, KAYARAD D-320 manufactured by Nippon Kayaku Co., Ltd.), dipentaerythritol penta(meth)acrylate (as a commercially available product, KAYARAD D-310 manufactured by Nippon Kayaku Co., Ltd.), dipentaerythritol hexa(meth)acrylate (as a commercially available product, KAYARAD DPHA manufactured by Nippon Kayaku Co., Ltd., and NK ESTER A-DPH-12E manufactured by Shin-Nakamura Chemical Co., Ltd.), and a compound having a structure in which the (meth)acryloyl group is bonded through an ethylene glycol and/or a propylene glycol residue (for example, SR454 and SR499 which are commercially available products from Sartomer), NK ESTER A-TMMT (manufactured by Shin-Nakamura Chemical Co., Ltd.), and KAYARAD RP-1040 and DPCA-20 (manufactured by Nippon Kayaku Co., Ltd.). In addition, as the polymerizable monomer, it is preferable to use a trifunctional (meth)acrylate compound such as trimethylolpropane tri(meth)acrylate, trimethylolpropane propyleneoxide-modified tri(meth)acrylate, trimethylolpropane ethyleneoxide-modified tri(meth)acrylate, isocyanuric acid ethyleneoxide-modified tri(meth)acrylate, and pentaerythritol tri(meth)acrylate. Examples of a commercially available product of the trifunctional (meth)acrylate compound include ARONIX M-309, M-310, M-321, M-350, M-360, M-313, M-315, M-306, M-305, M-303, M-452, and M-450 (manufactured by TOAGOSEI CO., LTD.), NK ESTER A9300, A-GLY-9E, A-GLY-20E, A-TMM-3, A-TMM-3L, A-TMM-3LM-N, A-TMPT, and TMPT (manufactured by Shin-Nakamura Chemical Co., Ltd.), and KAYARAD GPO-303, TMPTA, THE-330, TPA-330, and PET-30 (manufactured by Nippon Kayaku Co., Ltd.).

It is also preferable to use a polymerizable monomer having an acid group as the polymerizable monomer. By using a polymerizable monomer having an acid group, a coloring composition layer in unexposed areas is easily removed in development and the generation of the development residue can be effectively suppressed. Examples of the acid group include a carboxyl group, a sulfo group, and a phosphoric acid group, and a carboxyl group is preferable. Examples of a commercially available product of the polymerizable monomer having an acid group include ARONIX M-510, M-520, ARONIX TO-2349 (manufactured by TOAGOSEI CO., LTD). An acid value of the polymerizable monomer having an acid group is preferably 0.1 to 40 mgKOH/g and more preferably 5 to 30 mgKOH/g.

In a case where an acid value of the polymerizable monomer is 0.1 mgKOH/g or more, solubility in a developer is good, and more excellent developability is obtained. In a case where an acid value of the polymerizable monomer is 40 mgKOH/g or less, it is advantageous in production and handling.

It is also preferable to use compounds represented by Formulae (MO-1) to (MO-6) as the polymerizable monomer. In the formulae, in a case where T is an oxyalkylene group, the terminal on the carbon atom side is bonded to R.

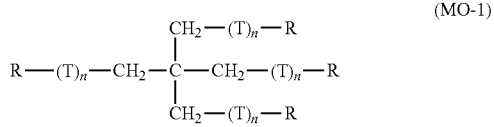
(MO-1)

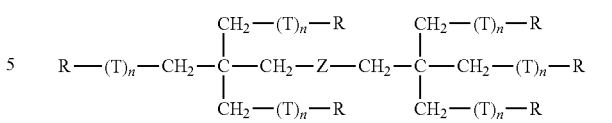
(MO-2)

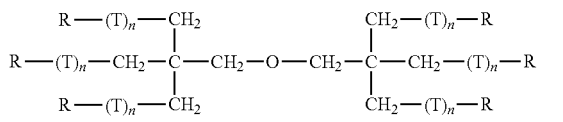
(MO-3)

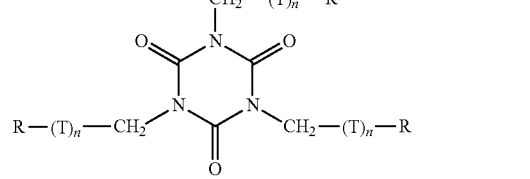
(MO-4)

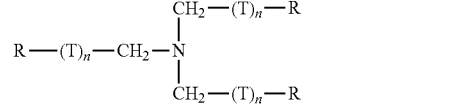
(MO-5)

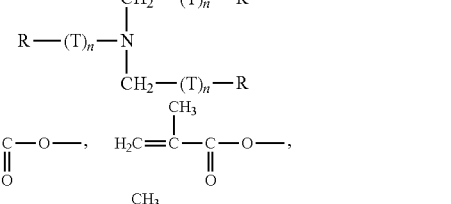
(MO-6)

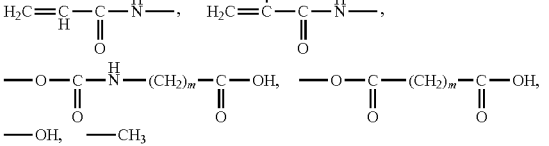

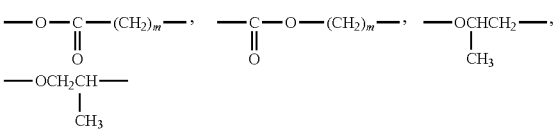

In the formulae, n is 0 to 14 and m is 1 to 8. A plurality of R's and T's present in one molecule may be the same as or different from each other.

In each of the compounds represented by Formulae (MO-1) to (MO-6), at least one of the plurality of R's represents —OC(=O)CH=$CH_2$, —OC(=O)C($CH_3$)=$CH_2$, —NHC(=O)CH=$CH_2$, or —NHC(=O)C($CH_3$)=$CH_2$. Specific examples of the compounds represented by Formulae (MO-1) to (MO-6) include the compounds described in paragraphs 0248 to 0251 of JP2007-269779A.

In addition, it is preferable to use a compound having a caprolactone structure as the polymerizable monomer. The compound having a caprolactone structure is not particularly limited as long as the compound has a caprolactone structure in the molecule, and examples thereof include a ε-caprolactone-modified polyfunctional (meth)acrylate obtained by esterifying (meth)acrylic acid and ε-caprolactone with a polyhydric alcohol such as trimethylolethane, ditrimethylolethane, trimethylolpropane, ditrimethylolpropane, pentaerythritol, dipentaerythritol, tripentaerythritol, glycerin, diglycerol, and trimethylolmelamine. As the compound having a caprolactone structure, a compound represented by Formula (Z-1) is preferable.

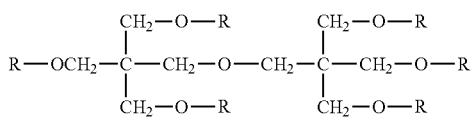

(Z-1)

In Formula (Z-1), all of the six R's are groups represented by Formula (Z-2), or 1 to 5 of the six R's are groups represented by Formula (Z-2) and the remainder is a group represented by Formula (Z-3), an acid group, or a hydroxy group.

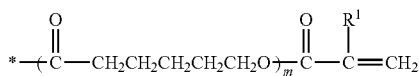

(Z-2)

In Formula (Z-2), $R^1$ represents a hydrogen atom or a methyl group, m represents an integer of 1 or 2, and "*" represents a bonding hand.

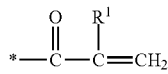

(Z-3)

In Formula (Z-3), $R^1$ represents a hydrogen atom or a methyl group and "*" represents a bonding hand.

A compound represented by Formula (Z-4) or Formula (Z-5) can also be used as the polymerizable monomer.

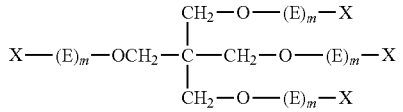

(Z-4)

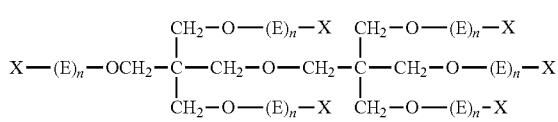

(Z-5)

In Formulae (Z-4) and (Z-5), E each independently represents —$((CH_2)_yCH_2O)$— or —$((CH_2)_yCH(CH_3)O)$—, y each independently represents an integer of 0 to 10, and X each independently represents a (meth)acryloyl group, a hydrogen atom, or a carboxyl group. In Formula (Z-4), the total number of the (meth)acryloyl groups is 3 or 4, m each independently represents an integer of 0 to 10, and the total of each m is an integer of 0 to 40. In Formula (Z-5), the total number of the (meth)acryloyl groups is 5 or 6, n each independently represents an integer of 0 to 10, and the total of each n is an integer of 0 to 60.

In Formula (Z-4), m is preferably an integer of 0 to 6 and more preferably an integer of 0 to 4. In addition, the total of each m is preferably an integer of 2 to 40, more preferably an integer of 2 to 16, and particularly preferably an integer of 4 to 8.

In Formula (Z-5), n is preferably an integer of 0 to 6 and more preferably an integer of 0 to 4. In addition, the total of each n is preferably an integer of 3 to 60, more preferably an integer of 3 to 24, and particularly preferably an integer of 6 to 12.

In addition, in —$((CH_2)_yCH_2O)$— or —$((CH_2)_yCH(CH_3)O)$— in Formula (Z-4) or Formula (Z-5), it is preferable that the terminal on the oxygen atom side is bonded to X.

A compound having an alkyleneoxy group can also be used as the polymerizable monomer. The polymerizable monomer having an alkyleneoxy group is preferably a compound having an ethyleneoxy group and/or a propyleneoxy group, more preferably a compound having an ethyleneoxy group, and still more preferably a trifunctional to hexafunctional (meth)acrylate compound having 4 to 20 ethyleneoxy groups. Examples of a commercially available product of the polymerizable monomer having an alkyleneoxy group include SR-494 manufactured by Sartomer, which is a tetrafunctional (meth)acrylate having four ethyleneoxy groups, and KAYARAD TPA-330 manufactured by Nippon Kayaku Co., Ltd, which is a trifunctional (meth)acrylate having three isobutyleneoxy groups.

The urethane acrylates described in JP1973-041708B (JP-S48-041708B), JP1976-037193A (JP-S51-037193A), JP1990-032293B (JP-H02-032293B), or JP1990-016765B (JP-H02-016765B), or the urethane compounds having an ethylene oxide skeleton described in JP1983-049860B (JP-S58-049860B), JP1981-017654B (JP-S56-017654B), JP1987-039417B (JP-S62-039417B), or JP1987-039418B (JP-S62-039418B) are also suitable as the polymerizable monomer. In addition, the compounds having an amino structure or a sulfide structure in the molecule described in JP1988-277653A (JP-S63-277653A), JP1988-260909A (JP-S63-260909A), or JP1989-105238A (JP-H01-105238A) are also preferably used. Examples of a commercially available product include UA-7200 (manufactured by Shin-Nakamura Chemical Co., Ltd.), DPHA-40H (manufactured by Nippon Kayaku Co., Ltd.), and UA-306H, UA-306T, UA-306I, AH-600, T-600 and AI-600 (manufactured by Kyoeisha Chemical Co., Ltd.).

In addition, as the polymerizable monomer, 8UH-1006 or 8UH-1012 (both manufactured by Taisei Fine Chemical Co., Ltd.), Light Acrylate POB-A0 (manufactured by Kyoeisha Chemical Co., Ltd.), or the like is also preferably used.

In addition, as the polymerizable monomer, the compounds described in JP2017-048367A, JP6057891B, or JP6031807B can also be used.

The weight-average molecular weight of the polymerizable polymer is preferably 3,000 or more, more preferably 5,000 or more, still more preferably 7,000 or more, and particularly preferably 10,000 or more. In addition, the weight-average molecular weight of the polymerizable polymer is preferably 50,000 or less, more preferably 40,000 or less, and still more preferably 30,000 or less.

A C=C equivalent (the molecular weight of the polymerizable polymer/the number of the ethylenically unsaturated bonding groups included in the polymerizable polymer) of the polymerizable polymer is preferably 100 to 5,000. The lower limit is preferably 150 or more and more preferably 200 or more. The upper limit is preferably 4,500 or less and more preferably 4,000 or less. In a case where the C=C equivalent of the polymerizable polymer is within the above-described range, the polymerizable monomer can be effectively adsorbed to a pigment active surface and aggregation of the metal azo pigment can be more remarkably suppressed.

The polymerizable polymer preferably includes a repeating unit having an ethylenically unsaturated bonding group in the side chain, more preferably includes a repeating unit represented by Formula (A-1-1). In the polymerizable polymer, the repeating unit having an ethylenically unsaturated bonding group is contained in an amount of preferably 10% by mole or more, more preferably 10% to 80% by mole, and still more preferably 20% to 70% by mole in all the repeating units of the polymerizable polymer.

(A-1-1)

In Formula (A-1-1), $X^1$ represents the main chain of the repeating unit, $L^1$ represents a single bond or a divalent linking group, and $Y^1$ represents an ethylenically unsaturated bonding group.

In Formula (A-1-1), the main chain of the repeating unit represented by $X^1$ is not particularly limited. It is not particularly limited as long as it is a linking group formed from a known polymerizable monomer. Examples thereof include a poly(meth)acrylic linking group, a polyalkyleneimine-based linking group, a polyester-based linking group, a polyurethane-based linking group, a polyuria-based linking group, a polyamide-based linking group, a polyether-based linking group, and a polystyrene-based linking group. A poly(meth)acrylic linking group and a polyalkyleneimine-based linking group are preferable, and a poly(meth)acrylic linking group is more preferable from the viewpoint of availability of raw materials and production suitability.

In Formula (A-1-1), examples of the divalent linking group represented by $L^1$ include an alkylene group (preferably an alkylene group having 1 to 12 carbon atoms), an alkyleneoxy group (preferably an alkyleneoxy group having 1 to 12 carbon atoms), an oxyalkylenecarbonyl group (preferably an oxyalkylenecarbonyl group having 1 to 12 carbon atoms), an arylene group (preferably an arylene group having 6 to 20 carbon atoms), —NH—, —SO—, —SO$_2$—, —CO—, —O—, —COO—, —OCO—, —S—, and a group formed by combination of two or more of these groups.

In Formula (A-1-1), examples of the ethylenically unsaturated bonding group represented by $Y^1$ include a vinyl group, a (meth)allyl group, and a (meth)acryloyl group, and a (meth)acryloyl group is preferable and an acryloyl group is more preferable.

Further, the polymerizable polymer preferably includes a repeating unit having a graft chain. In a case where the polymerizable polymer includes a repeating unit having a graft chain, aggregation and the like of the metal azo pigment and the like can be more effectively suppressed due to steric hindrance by the graft chain. In the polymerizable polymer, the repeating unit having a graft chain is contained in an amount of preferably 1.0% to 60% by mole and more preferably 1.5% to 50% by mole with respect to all the repeating units of the polymerizable polymer. The polymerizable polymer including the repeating unit having a graft chain is preferably used as a dispersant.

In the present invention, the graft chain means a polymer chain branched from the main chain of the repeating unit. The length of the graft chain is not particularly limited, and in a case where the graft chain becomes longer, a steric repulsion effect is enhanced, and thus, dispersibility of the metal azo pigment and the like can be increased. As the graft chain, the number of atoms excluding the hydrogen atoms is preferably 40 to 10,000, the number of atoms excluding the hydrogen atoms is more preferably 50 to 2,000, and the number of atoms excluding the hydrogen atoms is still more preferably 60 to 500.

The graft chain included in the polymerizable polymer preferably includes at least one structure selected from a polyester structure, a polyether structure, a poly(meth)acryl structure, a polyurethane structure, a polyurea structure, or a polyamide structure, more preferably includes at least one structure selected from a polyester structure, a polyether structure, or a poly(meth)acryl structure, and still more preferably includes a polyester structure. Examples of the polyester structure include a structure represented by Formula (G-1), Formula (G-4), or Formula (G-5). Examples of the polyether structure include a structure represented by Formula (G-2). Examples of the poly(meth)acryl structure include a structure represented by Formula (G-3).

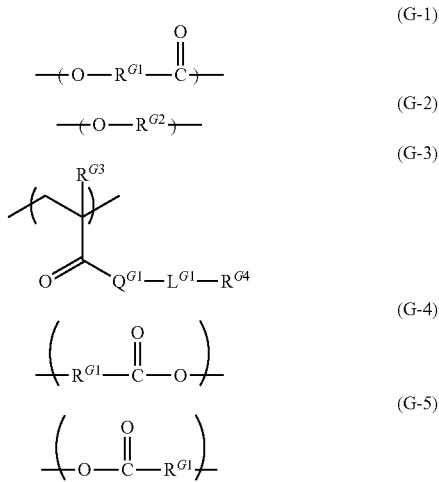

In the formulae, $R^{G1}$ and $R^{G2}$ each represent an alkylene group. The alkylene group represented by $R^{G1}$ and $R^{G2}$ is not particularly limited, but is preferably a linear or branched alkylene group having 1 to 20 carbon atoms, more preferably a linear or branched alkylene group having 2 to 16 carbon atoms, and still more preferably a linear or branched alkylene group having 3 to 12 carbon atoms.

In the formulae, $R^{G3}$ represents a hydrogen atom or a methyl group.

In the formulae, $Q^{G1}$ represents —O— or —NH—, and $L^{G1}$ represents a single bond or a divalent linking group. Examples of the divalent linking group include an alkylene group (preferably an alkylene group having 1 to 12 carbon atoms), an alkyleneoxy group (preferably an alkyleneoxy group having 1 to 12 carbon atoms), an oxyalkylenecarbonyl group (preferably oxyalkylenecarbonyl group having 1 to 12 carbon atoms), an arylene group (preferably an arylene group having 6 to 20 carbon atoms), —NH—, —SO—, —SO$_2$—, —CO—, —O—, —COO—, —OCO—, —S—, and a group formed by combination of two or more of these groups.

$R^{G4}$ represents a hydrogen atom or a substituent. Examples of the substituent include an alkyl group, an aryl group, a heteroaryl group, an alkoxy group, an aryloxy group, a heteroaryloxy group, an alkylthioether group, an arylthioether group, and a heteroarylthioether group.

For example, in a case where the graft chain includes a polyester structure, only one kind of polyester structure may be included, or two or more kinds of polyester structures having different $R^{G1}$'s may be included. In a case where the graft chain includes a polyether structure, only one kind of polyether structure may be included, or two or more kinds of polyether structures having different $R^{G2}$'s may be included. In a case where the graft chain includes a poly(meth)acryl structure, only one kind of poly(meth)acryl structure may be included, or two or more kinds of poly(meth)acryl structures different in at least one selected from $R^{G3}$, $Q^{G1}$, $L^{G1}$, or $R^{G4}$ may be included.

A terminal structure of the graft chain is not particularly limited. The terminal structure of the graft chain may be a hydrogen atom or a substituent. Examples of the substituent include an alkyl group, an aryl group, a heteroaryl group, an alkoxy group, an aryloxy group, a heteroaryloxy group, an alkylthioether group, an arylthioether group, and a heteroarylthioether group. Among these, from the viewpoint of improvement of the dispersibility of the coloring material or the like, a group having a steric repulsion effect is preferable, and an alkyl group or alkoxy group having 5 to 24 carbon atoms is preferable. The alkyl group and the alkoxy group may be any of linear, branched, and cyclic forms, and are preferably linear or branched.

In the present invention, the graft chain is preferably a structure represented by Formula (G-1a), Formula (G-2a), Formula (G-3a), Formula (G-4a), or Formula (G-5a).

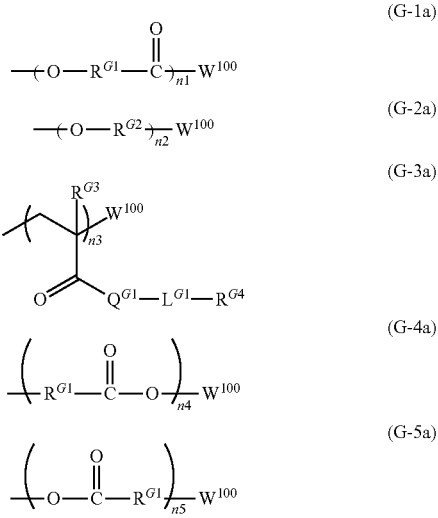

In the formulae, $R^{G1}$ and $R^{G2}$ each independently represent an alkylene group, $R^{G3}$ represents a hydrogen atom or a methyl group, $Q^{G1}$ represents —O— or —NH—, $L^{G1}$ represents a single bond or a divalent linking group, $R^{G4}$ represents a hydrogen atom or a substituent, and $W^{100}$ represents a hydrogen atom or a substituent. n1 to n5 each independently represent an integer of 2 or more. $R^{G1}$ to $R^{G4}$, $Q^{G1}$, and $L^{G1}$ have the same meanings as $R^{G1}$ to $R^{G4}$, $Q^{G1}$ and $L^{G1}$ described in Formulae (G-1) to (G-5), and preferred ranges thereof are also the same.

In Formulae (G-1a) to (G-5a), it is preferable that $W^{100}$ represents a substituent. Examples of the substituent include an alkyl group, an aryl group, a heteroaryl group, an alkoxy group, an aryloxy group, a heteroaryloxy group, an alkylthioether group, an arylthioether group, and a heteroarylthioether group. Among these, from the viewpoint of improvement of the dispersibility of the coloring material or the like, a group having a steric repulsion effect is preferable, and an alkyl group or alkoxy group having 5 to 24 carbon atoms is preferable. The alkyl group and the alkoxy group may be any of linear, branched, and cyclic forms, and are preferably linear or branched.

In Formulae (G-1a) to (G-5a), n1 to n5 each independently represent an integer of 2 or more, and is preferably 3 or more and more preferably 5 or more. The upper limit is, for example, preferably 100 or less, more preferably 80 or less, and still more preferably 60 or less.

In Formula (G-1a), $R^{G1}$'s in each repeating unit may be the same as or different from each other. In a case where $R^{G1}$ includes two or more kinds of repeating units different from each other, the arrangement of the repeating units is not particularly limited, and may be performed in any of a random manner, an alternative manner, and a blocked manner. The same applies to Formulae (G-2a) to (G-5a).

Examples of the repeating unit having a graft chain include a repeating unit represented by Formula (A-1-2).

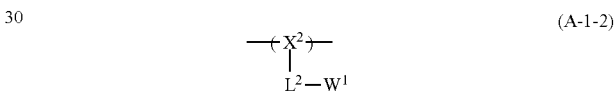

In Formula (A-1-2), $X^2$ represents the main chain of the repeating unit, $L^2$ represents a single bond or a divalent linking group, and $W^1$ represents a graft chain.

Examples of the main chain of the repeating unit represented by $X^2$ in Formula (A-1-2) include the structures described in the description of $X^1$ of Formula (A-1-1), and preferred ranges thereof are also the same. Examples of the divalent linking group represented by $L^2$ in Formula (A-1-2) include an alkylene group (preferably an alkylene group having 1 to 12 carbon atoms), an arylene group (preferably an arylene group having 6 to 20 carbon atoms), —NH—, —SO—, —SO$_2$—, —CO—, —O—, —COO—, —OCO—, —S—, and a group formed by combination of two or more of these groups. Examples of the graft chain represented by $W^1$ in Formula (A-1-2) include the graft chains described above.

In a case where the polymerizable polymer includes a repeating unit having a graft chain, the weight-average molecular weight (Mw) of the repeating unit having a graft chain is preferably 1,000 or more, more preferably 1,000 to 10,000, and still more preferably 1,000 to 7,500. In the present invention, the weight-average molecular weight of the repeating unit having a graft chain is a value calculated from the weight-average molecular weight of the raw material monomer used for the polymerization of the repeating unit. For example, the repeating unit having a graft chain can be formed by polymerizing a macromonomer. Here, the macromonomer means a polymer compound in which a polymerizable group is introduced into a polymer terminal. In a case where the repeating unit having a graft chain is formed using a macromonomer, the weight-average molecular weight of the macromonomer corresponds to the repeating unit having a graft chain.

Further, the polymerizable polymer preferably includes a repeating unit having an acid group. In a case where the polymerizable polymer further includes a repeating unit having an acid group, dispersibility of the metal azo pigment and the like can be further improved. Furthermore, developability can also be improved. Examples of the acid group include a carboxyl group, a sulfo group, and a phosphoric acid group.

The repeating unit having an acid group include a repeating unit represented by Formula (A-1-3).

(A-1-3)

In Formula (A-1-3), $X^3$ represents the main chain of the repeating unit, $L^3$ represents a single bond or a divalent linking group, and $A^1$ represents an acid group.

Examples of the main chain of the repeating unit represented by $X^3$ in Formula (A-1-3) include the structures described in the description of $X^1$ of Formula (A-1-1), and preferred ranges thereof are also the same.

Examples of the divalent linking group represented by $L^3$ in Formula (A-1-3) include an alkylene group (preferably an alkylene group having 1 to 12 carbon atoms), an alkenylene group (preferably an alkenylene group having 2 to 12 carbon atoms), an alkyleneoxy group (preferably an alkyleneoxy group having 1 to 12 carbon atoms), an oxyalkylenecarbonyl group (preferably an oxyalkylenecarbonyl group having 1 to 12 carbon atoms), an arylene group (preferably an arylene group having 6 to 20 carbon atoms), —NH—, —SO—, —SO$_2$—, —CO—, —O—, —COO—, —OCO—, —S—, and a group formed by combination of two or more of these groups. The alkylene group, the alkylene group in the alkyleneoxy group, and the alkylene group in the oxyalkylenecarbonyl group may be any of linear, branched, and cyclic forms, and are preferably linear or branched. The alkylene group, the alkylene group in the alkyleneoxy group, and the alkylene group in the oxyalkylenecarbonyl group may have a substituent or may be unsubstituted. Examples of the substituent include a hydroxy group.

Examples of the acid group represented by $A^1$ in Formula (A-1-3) include a carboxyl group, a sulfo group, and a phosphoric acid group.

An acid value of the polymerizable polymer is preferably 20 to 150 mgKOH/g. The upper limit is more preferably 100 mgKOH/g or less. The lower limit is preferably 30 mgKOH/g or more and more preferably 35 mgKOH/g or more. In a case where the acid value of the polymerizable polymer is within the above-described range, particularly excellent dispersibility is easily obtained. Furthermore, excellent developability is also easily obtained.

As other repeating units, the polymerizable polymer may further include a repeating unit derived from a monomer component including a compound represented by Formula (ED1) and/or a compound represented by Formula (ED2) (hereinafter, these compounds may be referred to as an "ether dimer").

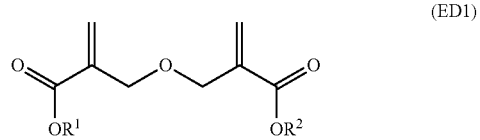

(ED1)

In Formula (ED1), $R^1$ and $R^2$ each independently represent a hydrogen atom or a hydrocarbon group having 1 to 25 carbon atoms, which may have a substituent.

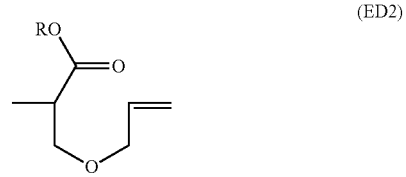

(ED2)

In Formula (ED2), R represents a hydrogen atom or an organic group having 1 to 30 carbon atoms. With regard to the specific examples of Formula (ED2), reference can be made to JP2010-168539A.

With regard to the specific examples of the ether dimer, reference can be made to paragraph No. 0317 of JP2013-029760A, and the contents of which are incorporated herein by reference. The ether dimers may be used singly or in combination of two or more kinds thereof.

Specific examples of the polymerizable polymer include the following compounds.

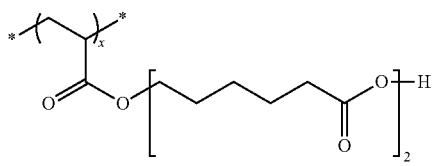

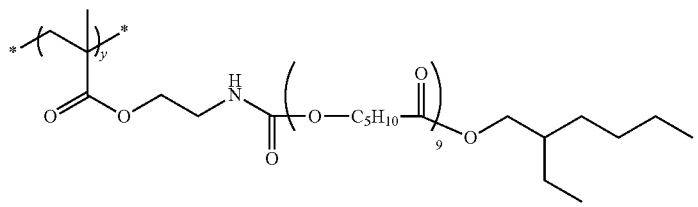

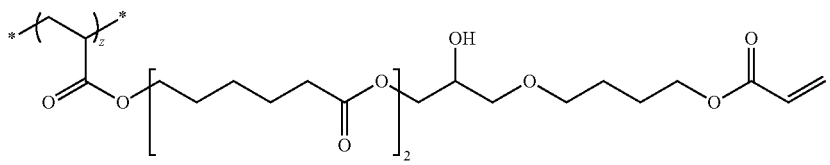

-continued

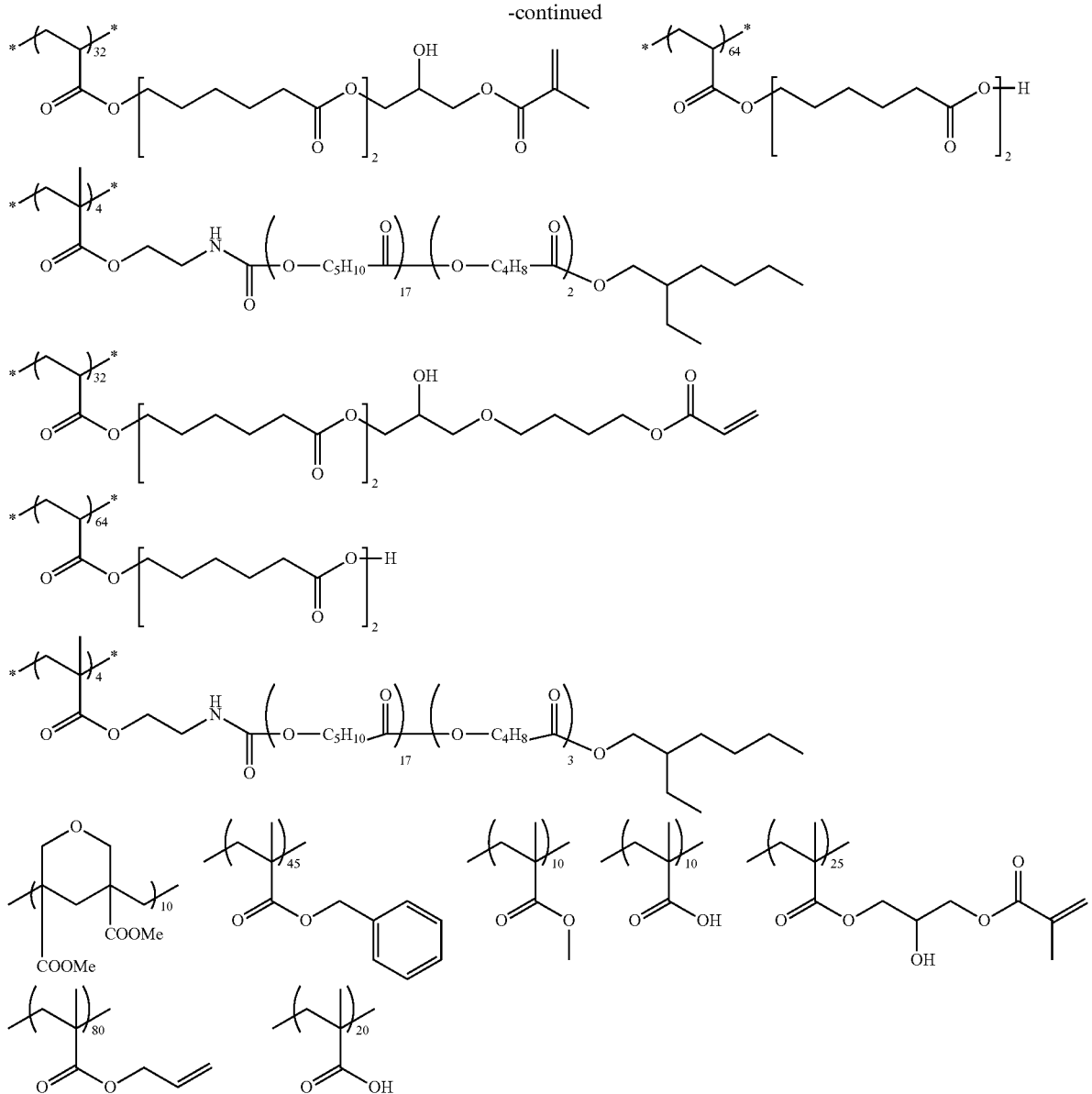

In the coloring composition of the embodiment of the present invention, the content of the compound having an ethylenically unsaturated bonding group is preferably 5% to 50% by mass with respect to the total solid content of the coloring composition. The lower limit is preferably 8% by mass or more and more preferably 10% by mass or more. The upper limit is preferably 45% by mass or less and more preferably 40% by mass or less.

In addition, the content of the compound having an ethylenically unsaturated bonding group is preferably 10 parts by mass or more, more preferably 12 parts by mass or more, still more preferably 15 parts by mass or more, and particularly preferably 20 parts by mass or more with respect to 100 parts by mass of the metal azo pigment. The upper limit is preferably 500 parts by mass or less, more preferably 400 parts by mass or less, still more preferably 200 parts by mass or less, and particularly preferably 100 parts by mass or less. In a case where the proportion of the metal azo pigment and the compound having an ethylenically unsatu-rated bonding group is within the above-described range, the effects of the present invention are more remarkably obtained.

In addition, from the viewpoint of pattern formability by a photolithography method, the compound having an ethylenically unsaturated bonding group included in the coloring composition of the embodiment of the present invention more preferably includes at least the above-described polymerizable monomer, and still more preferably includes the above-described polymerizable monomer and polymerizable polymer. In addition, in a case where the polymerizable monomer and the polymerizable polymer are used in combination, the content of the polymerizable polymer is preferably 5 to 500 parts by mass with respect to 100 parts by mass of the polymerizable monomer. The lower limit is preferably 8 parts by mass or more and more preferably 10 parts by mass or more. The upper limit is preferably 450 parts by mass or less and more preferably 400 parts by mass or less.

<<Compound Having Cyclic Ether Group>>

The coloring composition of the embodiment of the present invention can contain a compound having a cyclic ether group. As the compound having a cyclic ether group, a compound having two or more cyclic ether groups in one molecule is preferably used. The number of the cyclic ether groups included in the compound having a cyclic ether group is preferably 100 or less, more preferably 10 or less, and still more preferably 5 or less. Examples of the cyclic ether group include an epoxy group and an oxetanyl group, and an epoxy group is preferable. That is, it is preferable that the compound having a cyclic ether group is a compound (hereinafter, also referred to as an epoxy compound) having an epoxy group.

The epoxy equivalent (=the molecular weight of the compound having an epoxy group/the number of the epoxy groups) of the epoxy compound is preferably 500 or less, more preferably 100 to 400, and still more preferably 100 to 300.

The epoxy compound may be either a low-molecular-weight compound (for example, a molecular weight of less than 1,000) or a high-molecular-weight compound (macromolecule) (for example, a molecular weight of 1,000 or more, and in a case of a polymer, a weight-average molecular weight of 1,000 or more). The molecular weight (in a case of the polymer, the weight-average molecular weight) of the epoxy compound is preferably 200 to 100,000 and more preferably 500 to 50,000. The upper limit of the molecular weight (in a case of the polymer, the weight-average molecular weight) is preferably 3,000 or less, more preferably 2,000 or less, and still more preferably 1,500 or less.

As the epoxy compound, the compounds described in paragraph Nos. 0034 to 0036 of JP2013-011869A, paragraph Nos. 0147 to 0156 of JP2014-043556A, and paragraph Nos. 0085 to 0092 of JP2014-089408A can also be used. The contents of the publications are incorporated herein by reference. With regard to a commercially available product of the epoxy compound, examples of a bisphenol A type epoxy resin include jER825, jER827, jER828, jER834, jER1001, jER1002, jER1003, jER1055, jER1007, jER1009, and jER1010 (all manufactured by Mitsubishi Chemical Corporation), and EPICLON 860, EPICLON 1050, EPICLON 1051, and EPICLON 1055 (all manufactured by DIC Corporation). Examples of a bisphenol F type epoxy resin include jER806, jER807, jER4004, jER4005, jER4007, and jER4010 (all manufactured by Mitsubishi Chemical Corporation), EPICLON 830 and EPICLON 835 (both manufactured by DIC Corporation), and LCE-21 and RE-602S (both manufactured by Nippon Kayaku Co., Ltd.). Examples of a phenol novolac type epoxy resin include jER152, jER154, jER157S70, and jER157S65 (all manufactured by Mitsubishi Chemical Corporation), and EPICLON N-740, EPICLON N-770, and EPICLON N-775 (all manufactured by DIC Corporation). Examples of a cresol novolac type epoxy resin include EPICLON N-660, EPICLON N-665, EPICLON N-670, EPICLON N-673, EPICLON N-680, EPICLON N-690, and EPICLON N-695 (all manufactured by DIC Corporation), and EOCN-1020 (manufactured by Nippon Kayaku Co., Ltd.). Examples of an aliphatic epoxy resin include ADEKA RESIN EP-4080S, ADEKA RESIN EP-4085S, and ADEKA RESIN EP-4088S (all manufactured by ADEKA Corporation), CELLOXIDE 2021P, CELLOXIDE 2081, CELLOXIDE 2083, CELLOXIDE 2085, EHPE 3150, EPOLEAD PB 3600, and EPOLEAD PB 4700 (all manufactured by Daicel Corporation), and DENACOL EX-212L, DENACOL EX-214L, DENACOL EX-216L, DENACOL EX-321L, and DENACOL EX-850L (all manufactured by Nagase ChemteX Corporation). Other examples of the commercially available product include ADEKA RESIN EP-4000S, ADEKA RESIN EP-4003S, ADEKA RESIN EP-4010S, and ADEKA RESIN EP-4011S (all manufactured by ADEKA Corporation), NC-2000, NC-3000, NC-7300, XD-1000, EPPN-501, and EPPN-502 (all manufactured by ADEKA Corporation), jER1031 S (manufactured by Mitsubishi Chemical Corporation), and Marproof G-0150M, G-0105SA, G-0130SP, G-0250SP, G-1005S, G-1005SA, G-1010S, G-2050M, G-01100, and G-01758 (all manufactured by NOF CORPORATION., epoxy group-containing polymer).

In a case where the coloring composition of the embodiment of the present invention contains a compound having a cyclic ether group, the content of the compound having a cyclic ether group is preferably 0.5% to 30% by mass with respect to the total solid content of the coloring composition. The lower limit is preferably 0.8% by mass or more and more preferably 1% by mass or more. The upper limit is preferably 25% by mass or less and more preferably 20% by mass or less.

<<Other Resins>>

The coloring composition of the embodiment of the present invention can further contain a resin (hereinafter, also referred to as other resins) not including an ethylenically unsaturated bonding group. The other resins are blended in, for example, an application for dispersing particles such as a pigment in a composition or an application as a binder. Mainly, a resin which is used for dispersing particles such as a pigment is also referred to as a dispersant. However, such applications of the resin are only exemplary, and the resin can also be used for other purposes in addition to such applications.

The weight-average molecular weight (Mw) of the other resins is preferably 2,000 to 2,000,000. The upper limit is preferably 1,000,000 or less and more preferably 500,000 or less. The lower limit is preferably 3,000 or more and more preferably 5,000 or more.

Examples of the other resins include a (meth)acrylic resin, an ene-thiol resin, a polycarbonate resin, a polyether resin, a polyarylate resin, a polysulfone resin, a polyethersulfone resin, a polyphenylene resin, a polyarylene ether phosphine oxide resin, a polyimide resin, a polyamideimide resin, a polyolefin resin, a cyclic olefin resin, a polyester resin, and a styrene resin. These resins may be used singly or as a mixture of two or more kinds thereof.

The other resins may have an acid group. Examples of the acid group include a carboxyl group, a phosphoric acid group, a sulfo group, and a phenolic hydroxy group, and a carboxyl group is preferable. These acid groups may be used singly or in combination of two or more kinds thereof. The resin having an acid group can also be used as an alkali-soluble resin.

The resin having an acid group is preferably a polymer having a carboxyl group in the side chain. Specific examples thereof include methacrylic acid copolymers, acrylic acid copolymers, itaconic acid copolymers, crotonic acid copolymers, maleic acid copolymers, partially esterified maleic acid copolymers, alkali-soluble phenol resins such as novolak resin, acidic cellulose derivatives having a carboxyl group in the side chain, and resins in which an acid anhydride is added to a polymer having a hydroxy group. In particular, a copolymer of a (meth)acrylic acid and another monomer copolymerizable therewith is suitable as the alkali-soluble resin. Examples of another monomer copolymerizable with the (meth)acrylic acid include alkyl (meth)

acrylate, aryl (meth)acrylate, and a vinyl compound. Examples of the alkyl (meth)acrylate and the aryl (meth) acrylate include methyl (meth)acrylate, ethyl (meth)acrylate, propyl (meth)acrylate, butyl (meth)acrylate, isobutyl (meth)acrylate, pentyl (meth)acrylate, hexyl (meth)acrylate, octyl (meth)acrylate, phenyl (meth)acrylate, benzyl (meth) acrylate, tolyl (meth)acrylate, naphthyl (meth)acrylate, cyclohexyl (meth)acrylate, and glycidyl (meth)acrylate. Examples of the vinyl compound include styrene, α-methylstyrene, vinyltoluene, acrylonitrile, vinyl acetate, N-vinylpyrrolidone, a polystyrene macromonomer, and a polymethyl methacrylate macromonomer. In addition, as another monomer, a maleimide monomer such as N-phenylmaleimide and N-cyclohexylmaleimide can be used. Such other monomers copolymerizable with (meth)acrylic acids may be of one kind or of two or more kinds thereof.

As the resin having an acid group, a benzyl (meth) acrylate/(meth)acrylic acid copolymer, a benzyl (meth)acrylate/(meth)acrylic acid/2-hydroxyethyl (meth)acrylate copolymer, or a multicomponent copolymer including benzyl (meth)acrylate/(meth)acrylic acid/other monomers can be preferably used. Further, a compound obtained by copolymerizing 2-hydroxyethyl (meth)acrylate, the 2-hydroxypropyl (meth)acrylate/polystyrene macromonomer/benzyl methacrylate/methacrylic acid copolymer described in JP1995-140654A (JP-H07-140654A), a 2-hydroxy-3-phenoxypropylacrylate/polymethyl methacrylate macromonomer/benzyl methacrylate/methacrylic acid copolymer, a 2-hydroxyethyl methacrylate/polystyrene macromonomer/methyl methacrylate/methacrylic acid copolymer, a 2-hydroxyethyl methacrylate/polystyrene macromonomer/benzyl methacrylate/methacrylic acid copolymer, and the like can also be preferably used.

The resin having an acid group is also preferably a polymer including a repeating unit derived from a monomer component having the ether dimer.

The resin having an acid group may include a repeating unit derived from a compound represented by Formula (X).

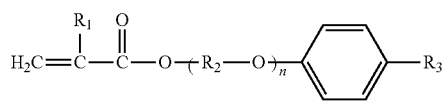

In Formula (X), $R_1$ represents a hydrogen atom or a methyl group, $R_2$ represents an alkylene group having 2 to 10 carbon atoms, and $R_3$ represents a hydrogen atom or an alkyl group having 1 to 20 carbon atoms, which may include a benzene ring. n represents an integer of 1 to 15.

With regard to the resin having an acid group, reference can be made to the description in paragraph Nos. 0558 to 0571 of JP2012-208494A (paragraph Nos. 0685 to 0700 of the corresponding US2012/0235099A) and the description in paragraph Nos. 0076 to 0099 of JP2012-198408A, and the contents of which are incorporated herein by reference. A commercially available product can also be used as the resin having an acid group.

An acid value of the resin having an acid group is preferably 30 to 200 mgKOH/g. The lower limit is preferably 50 mgKOH/g or more and more preferably 70 mgKOH/g or more. The upper limit is preferably 150 mgKOH/g or less and more preferably 120 mgKOH/g or less.

Examples of the resin having an acid group include a resin having the following structure.

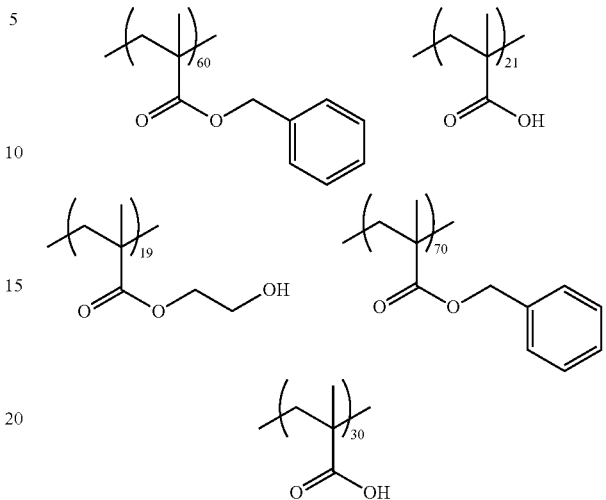

The coloring composition of the embodiment of the present invention can also include a resin as a dispersant. Examples of the dispersant include an acidic dispersant (acidic resin) and a basic dispersant (basic resin). Here, the acidic dispersant (acidic resin) represents a resin in which the amount of the acid group is larger than the amount of the basic group. The acidic dispersant (acidic resin) is preferably a resin in which the amount of the acid group occupies 70% by mole or more in a case where the total amount of the acid group and the basic group is 100% by mole, and more preferably a resin consisting substantially of only an acid group. The acid group contained in the acidic dispersant (acidic resin) is preferably a carboxyl group. An acid value of the acidic dispersant (acidic resin) is preferably 40 to 105 mgKOH/g, more preferably 50 to 105 mgKOH/g, and still more preferably 60 to 105 mgKOH/g. In addition, the basic dispersant (basic resin) represents a resin in which the amount of the basic group is larger than the amount of the acid group. The basic dispersant (basic resin) is preferably a resin in which the amount of the basic group is more than 50% by mole in a case where the total amount of the acid group and the basic group is 100% by mole. The basic group contained in the basic dispersant is preferably an amino group.

The resin used as a dispersant preferably includes a repeating unit having an acid group. In a case where the resin used as a dispersant includes the repeating unit having an acid group, the residue generated in a base of pixels can be further reduced in the formation of a pattern by a photolithography method.

It is preferable that the resin used as a dispersant is a resin (hereinafter, also referred to as a graft resin) including a repeating unit having a graft chain in the side chain. According to this aspect, dispersibility of the metal azo pigment and the like can be further improved. Here, the graft chain means a polymer chain branched from the main chain of the repeating unit. The length of the graft chain is not particularly limited, and in a case where the graft chain gets longer, a steric repulsion effect is enhanced, and thus, the dispersibility of a pigment or the like can be increased. In the graft chain, the number of atoms excluding the hydrogen atoms is preferably 40 to 10,000, the number of atoms excluding the hydrogen atoms is more preferably 50 to 2,000, and the number of atoms excluding the hydrogen atoms is still more preferably 60 to 500.

The graft chain preferably includes at least one structure selected from a polyester chain, a polyether chain, a poly (meth)acryl chain, a polyurethane chain, a polyurea chain, or a polyamide chain, more preferably includes at least one structure selected from a polyester chain, a polyether chain, or a poly(meth)acryl chain, and still more preferably includes a polyester chain.

A terminal structure of the graft chain is not particularly limited. The terminal structure of the graft chain may be a hydrogen atom or a substituent. Examples of the substituent include an alkyl group, an aryl group, a heteroaryl group, an alkoxy group, an aryloxy group, a heteroaryloxy group, an alkylthioether group, an arylthioether group, and a heteroarylthioether group. Among these, from the viewpoint of improvement of dispersibility of the metal azo pigment and the like, a group having a steric repulsion effect is preferable, and an alkyl group or alkoxy group having 5 to 24 carbon atoms is preferable. The alkyl group and the alkoxy group may be any of linear, branched, and cyclic forms, and are preferably linear or branched.

Examples of the graft resin include a resin having the following structure. In addition, with regard to details of the graft resin, reference can be made to the description in paragraph Nos. 0025 to 0094 of JP2012-255128A, and the contents thereof are incorporated herein by reference.

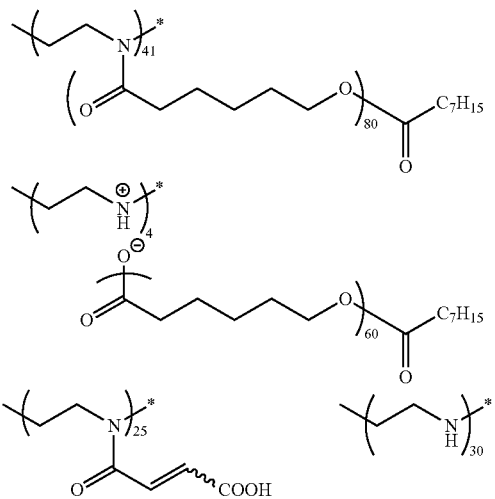

A commercially available product is also available as the dispersant, and specific examples thereof include Disperbyk series (for example, Disperbyk-111) manufactured by BYK Chemie, and Solsperse series (for example, Solsperse 76500) manufactured by Lubrizol Corporation. The dispersing agent described in paragraph Nos. 0041 to 0130 of JP2014-130338A can also be used, and the contents of which are incorporated herein by reference. The resin having an acid group, the polymerizable polymer, and the like can also be used as a dispersant. The resin described as the dispersant can be used for an application other than the dispersant. For example, the resin can be used as a binder.

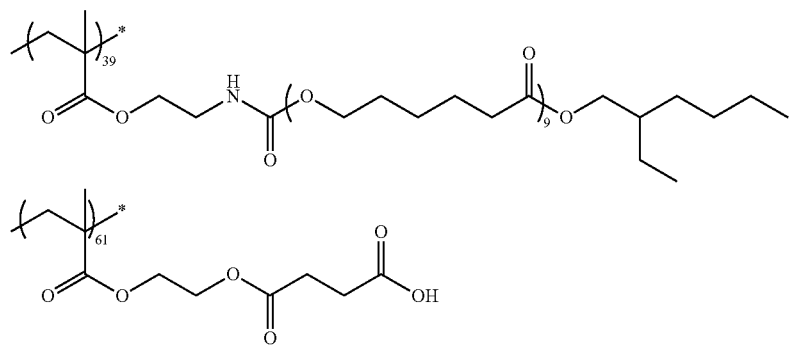

It is preferable that the resin used as a dispersant is an oligoimine-based resin including a nitrogen atom in at least one of the main chain or the side chain. As the oligoimine-based resin, a resin having a structural unit having a partial structure X having a functional group of pKa14 or less, and a side chain including a side chain Y having 40 to 10,000 atoms, in which at least one of the main chain or the side chain has a basic nitrogen atom is preferable. The basic nitrogen atom is not particularly limited as long as it is a nitrogen atom exhibiting basicity. With regard to the oligo-imine-based resin, reference can be made to the description in paragraph Nos. 0102 to 0166 of JP2012-255128A, and the contents of which are incorporated herein by reference. Specific examples of the oligoimine-based resin include the following resins. In addition, the resins described in paragraph Nos. 0168 to 0174 of JP2012-255128A can be used.

In a case where the coloring composition of the embodiment of the present invention includes the other resins, the content of the other resins is preferably 1% to 50% by mass with respect to the total solid content of the coloring composition of the embodiment of the present invention. The upper limit is preferably 45% by mass or less and more preferably 40% by mass or less. The lower limit is preferably 3% by mass or more and more preferably 5% by mass or more.

In addition, the coloring composition of the embodiment of the present invention may substantially include no other resins. The case where the coloring composition of the embodiment of the present invention substantially includes no other resins means that the content of the other resins in the total solid content of the coloring composition of the embodiment of the present invention is preferably 0.1% by mass or less, more preferably 0.05% by mass or less, and particularly preferably 0% by mass.

The total content of the compound having an ethylenically unsaturated bonding group and the other resins is preferably 5% to 50% by mass with respect to the total solid content of the coloring composition of the embodiment of the present invention. The lower limit is preferably 8% by mass or more and more preferably 10% by mass or more. The upper limit is preferably 45% by mass or less and more preferably 40% by mass or less.

<<Solvent>>

The coloring composition of the embodiment of the present invention contains a solvent. The solvent is preferably an organic solvent. The solvent is not particularly limited as long as it satisfies solubility of the respective components or coatability of the coloring composition.

Examples of the organic solvent include the following organic solvents. Examples of esters include ethyl acetate, n-butyl acetate, isobutyl acetate, cyclohexyl acetate, amyl formate, isoamyl acetate, butyl propionate, isopropyl butyrate, ethyl butyrate, butyl butyrate, methyl lactate, ethyl lactate, alkyl alkyloxyacetate esters (for example, methyl alkyloxyacetate, ethyl alkyloxyacetate, and butyl alkyloxyacetate (for example, methyl methoxyacetate, ethyl methoxyacetate, butyl methoxyacetate, methyl ethoxyacetate, and ethyl ethoxyacetate)), alkyl 3-alkyloxypropionate esters (for example, methyl 3-alkyloxypropionate and ethyl 3-alkyloxypropionate (for example, methyl 3-methoxypropionate, ethyl 3-methoxypropionate, methyl 3-ethoxypropionate, and ethyl 3-ethoxypropionate)), alkyl 2-alkyloxypropionate esters (for example, methyl 2-alkyloxypropionate, ethyl 2-alkyloxypropionate, and propyl 2-alkyloxypropionate (for example, methyl 2-methoxypropionate, ethyl 2-methoxypropionate, propyl 2-methoxypropionate, methyl 2-ethoxypropionate, and ethyl 2-ethoxypropionate)), methyl 2-alkyloxy-2-methyl propionate and ethyl 2-alkyloxy-2-methyl propionate (for example, methyl 2-methoxy-2-methyl propionate and ethyl 2-ethoxy-2-methyl propionate), methyl pyruvate, ethyl pyruvate, propyl pyruvate, methyl acetoacetate, ethyl acetoacetate, methyl 2-oxobutanoate, and ethyl 2-oxobutanoate. Examples of ethers include diethylene glycol dimethyl ether, tetrahydrofuran, ethylene glycol monomethyl ether, ethylene glycol monoethyl ether, methyl cellosolve acetate, ethyl cellosolve acetate, diethylene glycol monomethyl ether, diethylene glycol monoethyl ether, diethylene glycol monobutyl ether, propylene glycol monomethyl ether, propylene glycol monomethyl ether acetate, propylene glycol monoethyl ether acetate, and propylene glycol monopropyl ether acetate. Examples of ketones include methyl ethyl ketone, cyclohexanone, cyclopentanone, 2-heptanone, and 3-heptanone. Suitable examples of aromatic hydrocarbons include toluene and xylene. In addition, 3-methoxy-N,N-dimethylpropanamide or 3-butoxy-N, N-dimethylpropanamide is also preferable from the viewpoint of improving the solubility. The organic solvents may be used singly or in combination of two or more kinds thereof.

In the present invention, a solvent having a low metal content is preferably used as the solvent. For example, the metal content in the solvent is preferably 10 ppb (parts per billion) by mass or less. A solvent in which the metal content is at a level of ppt (parts per trillion) by mass may be used as desired, and such a high-purity solvent is provided by, for example, Toyo Kasei Kogyo Co., Ltd. (The Chemical Daily, Nov. 13, 2015). Examples of a method of removing impurities such as a metal from the solvent include distillation (for example, molecular distillation and thin-film distillation) and filtration using a filter. The filter pore size of a filter used for the filtration is preferably 10 µm or less, more preferably 5 µm or less, and still more preferably 3 µm or less. As a material of the filter, polytetrafluoroethylene, polyethylene, or nylon is preferable.

The solvent may include isomers (compounds having the same number of atoms and different structures). In addition, only one kind of isomers or a plurality of isomers may be included.

In the organic solvent used in the present invention, the content of a peroxide is preferably 0.8 mmol/L or less, and it is more preferable that the organic solvent does not substantially contain the peroxide.

The content of the solvent is preferably an amount such that the total solid content of the coloring composition is 5% to 40% by mass. The upper limit is preferably 35% by mass or less and more preferably 30% by mass or less. The lower limit is preferably 8% by mass or more and more preferably 10% by mass or more.

In addition, it is preferable that the coloring composition of the embodiment of the present invention includes toluene and a solvent other than toluene, and the content of toluene is 0.1 to 10 ppm by mass. The upper limit of the content of toluene is preferably 9 ppm by mass or less, more preferably 8 ppm by mass or less, and still more preferably 7 ppm by mass or less. The lower limit is preferably 0.2 ppm by mass or more, more preferably 0.3 ppm by mass or more, and still more preferably 0.4 ppm by mass or more. As the solvent other than toluene, at least one selected from methyl 3-ethoxypropionate, ethyl 3-ethoxypropionate, ethyl cellosolve acetate, ethyl lactate, diethylene glycol dimethyl ether, butyl acetate, methyl 3-methoxypropionate, 2-heptanone, cyclohexanone, cyclopentanone, ethyl carbitol acetate, butyl carbitol acetate, propylene glycol methyl ether, propylene glycol methyl ether acetate, 3-methoxy-N,N-dimethylpropanamide, or 3-butoxy-N,N-dimethylpropanamide is preferable.

In a case where the coloring composition of the embodiment of the present invention includes toluene and a solvent other than toluene as the solvent, and the content of toluene in the coloring composition is 0.1 to 10 ppm by mass, occurrence of foreign-matter defects can be effectively suppressed even in a case where a film obtained from the coloring composition is exposed to a high-temperature and high-humidity environment. The reason for obtaining such an effect is assumed as follows. The metal azo pigment used in the coloring composition of the embodiment of the present invention tends to easily aggregate in the coloring composition. In particular, in a case where the content of nickel ions ($Ni^{2+}$) in the metal azo pigment is low, or the metal azo pigment does not contain nickel ions, it is assumed that the metal azo pigment is in an unstable energy state, and the metal azo pigment tends to reaggregate more easily. Since the compound having an ethylenically unsaturated bonding group is blended in the coloring composition of the embodiment of the present invention, although reaggregation of the metal azo pigment at the time of storage is suppressed and generation of relatively coarse aggregates can be suppressed, very fine aggregates and the like may be generated. The very fine aggregates do not cause foreign-matter defects immediately after forming a film, but in a case where a film is formed using the coloring composition in which the very fine aggregates are generated, and the obtained film is exposed to a high-temperature and high-humidity environment, the above-described aggregates included in the film may serve as nuclei to cause foreign-matter defects. It is assumed that toluene has a high affinity of the metal azo pigment in an unstable energy state, and in a case where a predetermined amount of toluene is present in the coloring composition, aggregation of the metal azo pigment is moderately loosened (deaggregation), thereby generation of aggregates which can cause a formation of foreign matter in the film can be suppressed. In addition, in a case where the content of toluene is 0.1 ppm by mass or more, the above-described effect of deaggregation is sufficiently obtained. In addition, it is assumed that, in a case where the metal azo pigment is excessively deaggregated, a large amount of unstable refined particles are present in the coloring composition, thereby the refined particles cause aggregation due to a film formation or the like and a large amount of aggregates are generated. However, in a case where the content of toluene is 10 ppm by mass or less, it is assumed that the above-described effect of deaggregation is appropriately exhibited and aggregation of the metal azo pigment can be moderately loosened. Therefore, for a film obtained from the coloring composition which includes toluene and a solvent other than toluene as the solvent, and in which the content of toluene is 0.1 to 10 ppm by mass, it is assumed that occurrence of foreign-matter defects can be effectively suppressed even in a case where the film is exposed to a high-temperature and high-humidity environment.

<<Photopolymerization Initiator>>

It is preferable that the coloring composition of the embodiment of the present invention preferably further includes a photopolymerization initiator. The photopolymerization initiator is not particularly limited, and it is possible to appropriately select from known photopolymerization initiators. For example, a compound having photosensitivity to light in a range from the ultraviolet range to the visible range is preferable. It is preferable that the photopolymerization initiator is a photoradical polymerization initiator.

Examples of the photopolymerization initiator include halogenated hydrocarbon derivatives (for example, a compound having a triazine skeleton and a compound having an oxadiazole skeleton), an acylphosphine compound, hexaaryl biimidazole, an oxime compound, an organic peroxide, a thio compound, a ketone compound, an aromatic onium salt, an α-hydroxyketone compound, and an α-aminoketone compound. From the viewpoint of the exposure sensitivity, as the photopolymerization initiator, a trihalomethyl triazine compound, a benzyl dimethyl ketal compound, an α-hydroxyketone compound, an α-aminoketone compound, an acylphosphine compound, a phosphine oxide compound, a metallocene compound, an oxime compound, a triarylimidazole dimer, an onium compound, a benzothiazole compound, a benzophenone compound, an acetophenone compound, a cyclopentadiene-benzene-iron complex, a halomethyl oxadiazole compound, and a 3-aryl-substituted coumarin compound are preferable, a compound selected from the oxime compound, the α-hydroxyketone compound, the α-aminoketone compound, and the acylphosphine compound is more preferable, and the oxime compound is still more preferable. By using an oxime compound as the photopolymerization initiator, excellent curability can be obtained. In addition, it is possible to produce a film in which occurrence of defects is more suppressed even in a case where the coloring composition is stored for a long time under a low-temperature environment. Furthermore, even in a case where a film obtained from the coloring composition is exposed to a high-temperature and high-humidity environment, occurrence of foreign-matter defects can be effectively suppressed. With regard to the photopolymerization initiator, reference can be made to the description in paragraph Nos. 0065 to 0111 of JP2014-130173A and paragraph Nos. 0274 to 0306 of JP2013-029760A, and the contents of which are incorporated herein by reference.

Examples of a commercially available product of the α-hydroxyketone compound include IRGACURE-184, DAROCUR-1173, IRGACURE-500, IRGACURE-2959, and IRGACURE-127 (all manufactured by BASF). Examples of a commercially available product of the α-aminoketone compound include IRGACURE-907, IRGACURE-369, IRGACURE-379, and IRGACURE-379EG (all manufactured by BASF). Examples of a commercially available product of the acylphosphine compound include IRGACURE-819 and DAROCUR-TPO (both manufactured by BASF).

Examples of the oxime compound include the compounds described in JP2001-233842A, the compounds described in JP2000-080068A, the compounds described in JP2006-342166A, the compounds described in J. C. S. Perkin II (1979, pp. 1653-1660), the compounds described in J. C. S. Perkin II (1979, pp. 156-162), the compounds described in Journal of Photopolymer Science and Technology (1995, pp. 202-232), the compounds described in JP2000-066385A, the compounds described in JP2004-534797A, the compounds described in JP2006-342166A, the compounds described in JP2017-019766A, the compounds described in JP6065596B, the compounds described in WO2015/152153A, and the compounds described in WO2017/051680A. Specific examples of the oxime compound include 3-benzoyloxyiminobutan-2-one, 3-acetoxyiminobutan-2-one, 3-propionyloxyiminobutan-2-one, 2-acetoxyiminopentan-3-one, 2-acetoxyimino-1-phenylpropan-1-one, 2-benzoyloxyimino-1-phenylpropan-1-one, 3-(4-toluenesulfonyloxy)iminobutan-2-one, and 2-ethoxycarbonyloxyimino-1-phenylpropan-1-one. As a commercially available product of the oxime compound, IRGACURE-OXE01, IRGACURE-OXE02, IRGACURE-OXE03, and IRGACURE-OXE04 (all manufactured by BASF) are also suitably used. In addition, examples of the commercially available product include TRONLY TR-PBG-304, TRONLY TR-PBG-309, and TRONLY TR-PBG-305 (manufactured by CHANGZHOU TRONLY NEW ELECTRONIC MATERIALS CO., LTD.), ADEKA ARKLS NCI-930 and ADEKA OPTOMER N-1919 (both manufactured by Adeka Corporation, a photopolymerization initiator 2 described in JP2012-014052A).

In addition, as oxime compounds other than the above-described oxime compounds, the compounds described in JP2009-519904A in which oxime is linked to N of a carbazole ring, the compounds described in U.S. Pat. No. 7,626,957B in which a hetero-substituent is introduced into a benzophenone site, the compounds described in JP2010-015025A in which a nitro group is introduced into a coloring agent site, the compounds described in US2009-0292039A, the ketoxime compounds described in WO2009/131189A, the compounds described in U.S. Pat. No. 7,556,910B, which contains a triazine skeleton and an oxime skeleton in the same molecule, the compound described in JP2009-221114A, which has a maximum absorption at 405 nm and has good sensitivity to a light source of g-rays, and the like may be used.

In the present invention, an oxime compound having a fluorene ring can also be used as the photopolymerization initiator. Specific examples of the oxime compound having a fluorene ring include the compounds described in JP2014-137466A. The contents of the publications are incorporated herein by reference.

In the present invention, an oxime compound having a benzofuran skeleton can also be used as the photopolymerization initiator. Specific examples thereof include the compounds OE-01 to OE-75 described in WO2015/036910A.

In the present invention, an oxime compound having a skeleton in which at least one benzene ring of a carbazole ring is a naphthalene ring can also be used as the photopolymerization initiator. Specific examples of such an oxime compound include the compounds described in WO2013/083505A.

In the present invention, an oxime compound having a fluorine atom can also be used as the photopolymerization initiator. Specific examples of the oxime compound having a fluorine atom include the compounds described in JP2010-262028A, the compounds 24, and 36 to 40 described in JP2014-500852A, and the compound (C-3) described in JP2013-164471A. The contents of the publications are incorporated herein by reference.

In the present invention, an oxime compound having a nitro group can also be used as the photopolymerization initiator. The oxime compound having a nitro group is also preferably used in the form of a dimer. Specific examples of the oxime compound having a nitro group include the compounds described in paragraph Nos. 0031 to 0047 of JP2013-114249A and paragraph Nos. 0008 to 0012 and 0070 to 0079 of JP2014-137466A, the compounds described in paragraph Nos. 0007 to 0025 of JP4223071B, and ADEKA ARKLS NCI-831 (manufactured by ADEKA Corporation).

Specific examples of the oxime compound preferably used in the present invention are shown below, but the present invention is not limited thereto.

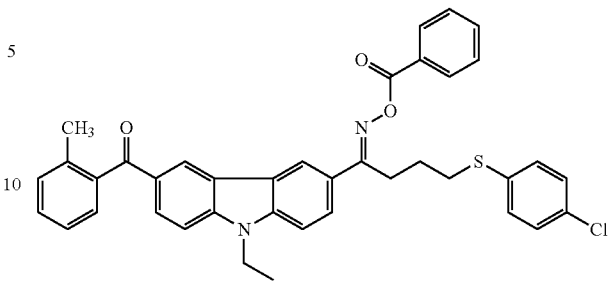

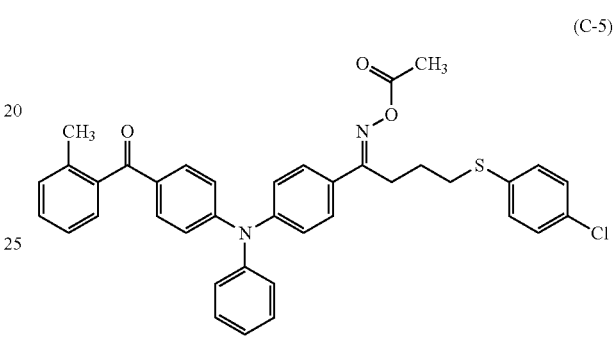

-continued (C-9) 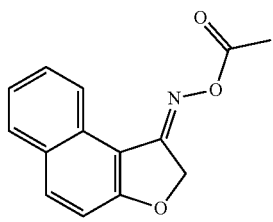

(C-10) 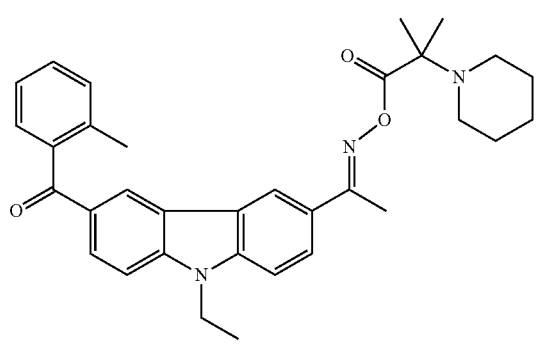

(C-11)

(C-12)

(C-13) 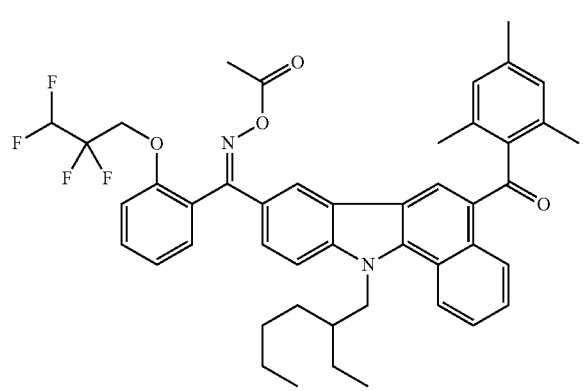

-continued (C-14)

(C-15)

(C-16)

As the oxime compound, a compound having a maximum absorption wavelength in a range of 350 to 500 nm is preferable, and a compound having a maximum absorption wavelength in a range of 360 nm to 480 nm is more preferable. The oxime compound is preferably a compound having a high absorbance at 365 nm and 405 nm.

From the viewpoint of sensitivity, the molar absorption coefficient at 365 nm or 405 nm of the oxime compound is preferably 1,000 to 300,000, more preferably 2,000 to 300,000, and particularly preferably 5,000 to 200,000. The molar absorption coefficient of a compound can be measured using a known method. For example, the molar absorption coefficient is preferably measured by means of an ultraviolet and visible light spectrophotometer (Cary-5 spectrophotometer, manufactured by Varian) at a concentration of 0.01 g/L using ethyl acetate solvent.

In the present invention, a bifunctional, or trifunctional or higher photopolymerization initiator may be used as the photopolymerization initiator. Specific examples of such a photopolymerization initiator include the dimers of the oxime compounds described in JP2010-527339A, JP2011-524436A, WO2015/004565A, paragraph Nos. 0412 to 0417 of JP2016-532675A, and paragraph Nos. 0039 to 0055 of WO2017/033680A, the compound (E) and the compound (G) described in JP2013-522445A, and Cmpd 1 to 7 described in WO2016/034963A.

In a case where the coloring composition of the embodiment of the present invention contains a photopolymerization initiator, the content of the photopolymerization initiator is preferably 0.1% to 30% by mass with respect to the total solid content of the coloring composition. The lower limit is, for example, more preferably 0.5% by mass or more, and still more preferably 1% by mass or more. The upper limit is, for example, more preferably 20% by mass or less, and still more preferably 10% by mass or less.

In addition, the content of the photopolymerization initiator is preferably 1 to 200 parts by mass with respect to 100 parts by mass of the metal azo pigment. The lower limit is preferably 3 parts by mass or more and still more preferably 5 parts by mass or more. The upper limit is preferably 100 parts by mass or less and more preferably 80 parts by mass or less.

In addition, in a case of using an oxime compound as the photopolymerization initiator, the content of the oxime compound is preferably 1 to 200 parts by mass with respect to 100 parts by mass of the metal azo pigment. The lower limit is preferably 3 parts by mass or more and still more preferably 5 parts by mass or more. The upper limit is preferably 100 parts by mass or less and more preferably 80 parts by mass or less. According to this aspect, the effects of the present invention tend to be more remarkably obtained.

The coloring composition of the embodiment of the present invention may include only one kind or two or more kinds of the photopolymerization initiators. In a case of including two or more kinds of the photopolymerization initiators, the total amount thereof is preferably within the above-described range.

<<Pigment Derivative>>

It is preferable that the coloring composition of the embodiment of the present invention further contains a pigment derivative. According to this aspect, it is possible to form a film in which variation of spectral diffraction with respect to a temperature change is suppressed. Examples of the pigment derivative include a compound having a structure in which a part of a pigment is substituted with an acid group, a basic group, a phthalimide group, or the like. Examples of the pigment derivative include an acidic pigment derivative, a basic pigment derivative, and a neutral pigment derivative, and a basic pigment derivative is preferable.

In the present invention, the pigment derivative is preferably a compound represented by Formula (syn1).

(syn1)

In Formula (syn1), P represents a coloring agent structure, L represents a single bond or a linking group, X represents an acid group, a basic group, or a phthalimide group, m represents an integer of 1 or more, n represents an integer of 1 or more, in a case where m is 2 or more, a plurality of L's and X's may be different from each other, and in a case where n is 2 or more, a plurality of X's may be different from each other.

Examples of the coloring agent structure represented by P in Formula (syn1) include a quinoline-based coloring agent structure, a benzimidazolone-based coloring agent structure, an isoindoline-based coloring agent structure, a diketopyrrolopyrrole-based coloring agent structure, an azo-based coloring agent structure, a phthalocyanine-based coloring agent structure, an anthraquinone-based coloring agent structure, a quinacridone-based coloring agent structure, a dioxazine-based coloring agent structure, a perylene-based coloring agent structure, a perinone-based coloring agent structure, a thiazin indigo-based coloring agent structure, an isoindolinone-based coloring agent structure, and a quinophthalone-based coloring agent structure, and an azo-based coloring agent structure and a quinoline-based coloring agent structure are preferable.

In Formula (syn1), L represents a single bond or a linking group, and preferably represents a linking group. Examples of the divalent linking group include an alkylene group, an arylene group, a nitrogen-containing heterocyclic group, —O—, —S—, —NR'—, —CO—, —COO—, —OCO—, —SO$_2$—, or a group formed by a combination of these groups, and it is preferable that the divalent linking group is an alkylene group or a group having an alkylene group. R' represents a hydrogen atom, an alkyl group, or an aryl group. In a case where L is a tri- or more valent linking group, a group in which one or more hydrogen atom is removed from the above-described divalent linking group is exemplified.

The alkylene group preferably has 1 to 30 carbon atoms, more preferably has 1 to 15 carbon atoms, and still more preferably has 1 to 10 carbon atoms. The alkylene group may have a substituent. The alkylene group may be any of linear, branched, and cyclic forms. In addition, the cyclic alkylene group may be monocyclic or polycyclic.

The arylene group preferably has 6 to 18 carbon atoms, more preferably has 6 to 14 carbon atoms, and still more preferably has 6 to 10 carbon atoms.

The nitrogen-containing heterocyclic group is preferably a 5-membered ring or a 6-membered ring. In addition, the nitrogen-containing heterocyclic group is preferably a single ring or a fused ring, more preferably a single ring or a fused ring having 2 to 8 fused numbers, and still more preferably a single ring or a fused ring having 2 to 4 fused numbers. The number of nitrogen atoms included in the nitrogen-containing heterocyclic group is preferably 1 to 3 and more preferably 1 or 2. The nitrogen-containing heterocyclic group may include a heteroatom other than a nitrogen atom. Examples of the heteroatom other than a nitrogen atom include an oxygen atom and a sulfur atom. The number of the heteroatoms other than a nitrogen atom is preferably 0 to 3 and more preferably 0 or 1. Examples of the nitrogen-containing heterocyclic group include a piperazine ring group, a pyrrolidine ring group, a pyrrole ring group, a piperidine ring group, a pyridine ring group, an imidazole ring group, a pyrazole ring group, an oxazole ring group, a thiazole ring group, a pyrazine ring group, a morpholine ring group, a thiazine ring group, an indole ring group, an isoindole ring group, a benzimidazole ring group, a purine ring group, a quinoline ring group, an isoquinoline ring group, a quinoxaline ring group, a cinnoline ring group, a carbazole ring group, and groups represented by Formulae (L-1) to (L-7).

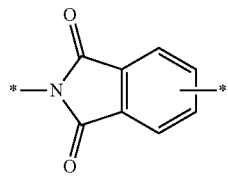
(L-1)

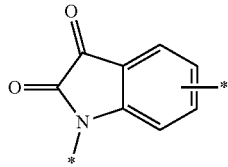
(L-2)

-continued

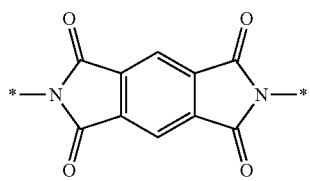 (L-3)

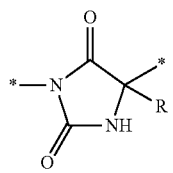 (L-4)

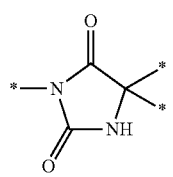 (L-5)

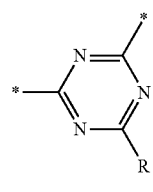 (L-6)

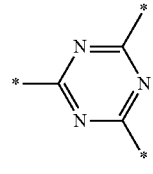 (L-7)

\* in the formula represents a linking hand. R represents a hydrogen atom or a substituent. Examples of the substituent include the substituent T described above.

In Formula (syn1), X represents an acid group, a basic group, or a phthalimide group. Examples of the acid group include a carboxyl group and a sulfo group. Examples of the basic group include groups represented by Formulae (X-3) to (X-9). The phthalimide group may be unsubstituted or may have a substituent. Examples of the substituent include the above-described acid group and basic group. In addition, the substituent may be the substituent T described above. The substituent T may be further substituted with another substituent.

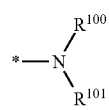 (X-3)

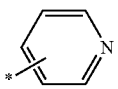 (X-4)

-continued

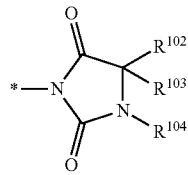 (X-5)

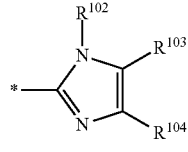 (X-6)

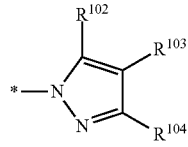 (X-7)

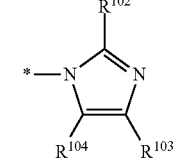 (X-8)

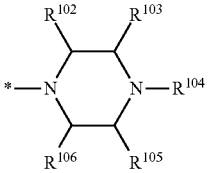 (X-9)

In Formulae (X-3) to (X-9), * represents a linking hand, $R^{100}$ to $R^{106}$ each independently represent a hydrogen atom, an alkyl group, an alkenyl group, or an aryl group, and $R^{100}$ and $R^{101}$ may be linked to each other to form a ring.

The alkyl group represented by $R^{100}$ to $R^{106}$ may be any of linear, branched, and cyclic forms. The linear alkyl group preferably has 1 to 20 carbon atoms, more preferably has 1 to 12 carbon atoms, and still more preferably has 1 to 8 carbon atoms. The branched alkyl group preferably has 3 to 20 carbon atoms, more preferably has 3 to 12 carbon atoms, and still more preferably has 3 to 8 carbon atoms. The cyclic alkyl group may be a monocyclic or polycyclic. The cyclic alkyl group preferably has 3 to 20 carbon atoms, more preferably has 4 to 10 carbon atoms, and still more preferably has 6 to 10 carbon atoms.

The alkenyl group represented by $R^{100}$ to $R^{106}$ preferably has 2 to 10 carbon atoms, more preferably has 2 to 8 carbon atoms, and still more preferably has 2 to 4 carbon atoms.

The aryl group represented by $R^{100}$ to $R^{106}$ preferably has 6 to 18 carbon atoms, more preferably has 6 to 14 carbon atoms, and still more preferably has 6 to 10 carbon atoms.

$R^{100}$ and $R^{101}$ may be linked to each other to form a ring. The ring may be an alicyclic ring or an aromatic ring. The ring may be a single ring or a fused ring. Examples of a linking group in a case where $R^{100}$ and $R^{101}$ are bonded to each other to form a ring include —CO—, —O—, —NH—, a divalent aliphatic group, and a divalent linking group selected from the group consisting of a combination thereof. It is preferable that $R^{100}$ and $R^{101}$ do not form a ring.

It is preferable that $R^{100}$ and $R^{101}$ each independently represent an alkyl group or an aryl group, and it is more preferable that $R^{100}$ and $R^{101}$ represent an alkyl group. The alkyl group is preferably a linear or branched alkyl group and more preferably a linear alkyl group.

In Formula (syn1), m is preferably 1 to 10, more preferably 1 to 5, and still more preferably 1 or 2.

In Formula (syn1), n is preferably 1 to 4, more preferably 1 to 3, and still more preferably 1 or 2.

The pigment derivative is preferably a compound represented by Formula (syn2).

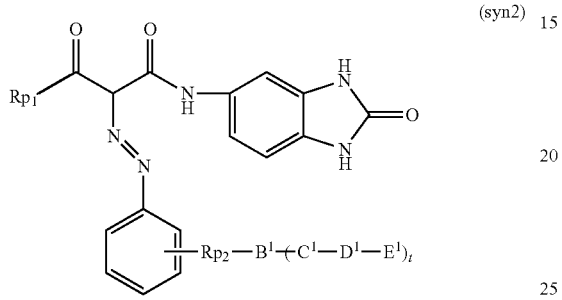

(syn2)

In the formula, $Rp_1$ represents an alkyl group or an aryl group, $Rp_2$ represents a single bond, —NR—, —CO—, —CO$_2$—, —SO$_2$—, —O—, —S—, or a group formed by a combination of these groups, R represents a hydrogen atom, an alkyl group, or an aryl group, $B^1$ represents a single bond or a (t+1)-valent linking group, $C^1$ represents a single bond, —NR—, —CO—, —CO$_2$—, —SO$_2$—, —O—, —S—, or a group formed by a combination of these groups, R represents a hydrogen atom, an alkyl group, or an aryl group, $D^1$ represents a single bond, an alkylene group, or an arylene group, and $E^1$ represents an acid group, a basic group, or a phthalimide group.

t represents an integer of 1 to 5.

$Rp_1$ is preferably a methyl group or a phenyl group and most preferably a methyl group.

$Rp_2$ represents a single bond, —NR—, —CO—, —CO$_2$—, —SO$_2$—, —O—, —S—, or a group formed by a combination of these groups, R represents a hydrogen atom, an alkyl group, or an aryl group. Examples of the alkyl group represented by R include linear, branched, and cyclic forms, and a linear or branched form is preferable. The alkyl group preferably has 1 to 10 carbon atoms and more preferably has 1 to 5 carbon atoms. The aryl group represented by R preferably has 6 to 30 carbon atoms, more preferably has 6 to 20 carbon atoms, and still more preferably has 6 to 12 carbon atoms. R is preferably a hydrogen atom. $Rp_2$ is preferably —NRCO—, —CONR—, —SO$_2$NR—, —NRSO$_2$—, and more preferably —NRCO— or —CONR—.

Examples of the (t+1)-valent linking group represented by $B^1$ include the linking groups described in L of Formula (syn1), and linking groups represented by Formulae (PA-4) to (PA-9) are preferable. * represents a linking site of $Rp_2$ and $C^1$.

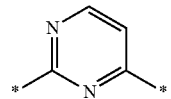
(PA-4)

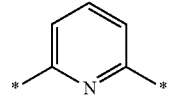
(PA-5)

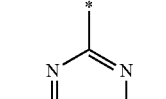
(PA-6)

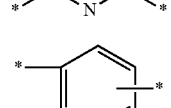
(PA-7)

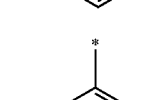
(PA-8)

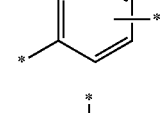
(PA-9)

$C^1$ is preferably —NR—, —NRCO—, —CONR—, —SO$_2$NR—, or —NRSO$_2$—, and more preferably —NR—, —NRCO—, or —CONR—. R represents a hydrogen atom, an alkyl group, or an aryl group. Preferred ranges of the alkyl group and the aryl group represented by R are the same as those described above. R is preferably a hydrogen atom.

$D^1$ represents a single bond, an alkylene group, or an arylene group, and is preferably an alkylene group. The alkylene group preferably has 1 to 30 carbon atoms, more preferably has 1 to 15 carbon atoms, and still more preferably has 1 to 10 carbon atoms. The alkylene group may have a substituent. The alkylene group may be any of linear, branched, and cyclic forms, and is preferably linear or branched and more preferably linear.

$E^1$ represents an acid group, a basic group, or a phthalimide group. Examples of the acid group and the basic group include the acid group and the basic group described in X of Formula (syn1). $E^1$ is preferably a basic group and more preferably the group represented by Formula (X-3).

t is preferably 1 or 2 and more preferably 2.

Specific examples of the pigment derivative include the following compounds. In addition, compounds described in JP1981-118462A (JP-S56-118462A), JP1988-264674A (JP-S63-264674A), JP1989-217077A (JP-H01-217077A), JP1991-009961A (JP-H03-009961A), JP-1991-026767A (JP-H03-026767A), JP-1991-153780A (JP-H03-153780A), JP1991-045662A (JP-H03-045662A), JP-1992-285669A (JP-H04-285669A), JP-1994-145546A (JP-H06-145546A), JP-1994-212088A (JP-H06-212088A), JP-1994-240158A (JP-H06-240158A), JP-1998-030063A (JP-H-10-030063A), JP-1998-195326A (JP-H10-195326A), paragraph Nos. 0086 to 0098 of WO2011/024896A, paragraph Nos. 0063 to 0094 of WO2012/102399A, and paragraph No. 0053 of WO2016/035695A, compounds described in paragraph Nos. 0027 to 0031 of JP2011-038061A, compounds described in paragraph No. 0036 of JP2010-181812A, compounds described in paragraph Nos. 0027 to 0035 of JP2004-258134A, compounds described in paragraph Nos. 0134 to 0138, and 0160 of WO2015/019936A, compounds described in paragraph Nos. 0045 to 0056, and 0078 of WO2015/019819A, and compounds described in paragraph Nos. 0123 to 0145 of WO2015/045790A can be used, the contents of which are incorporated herein by reference.

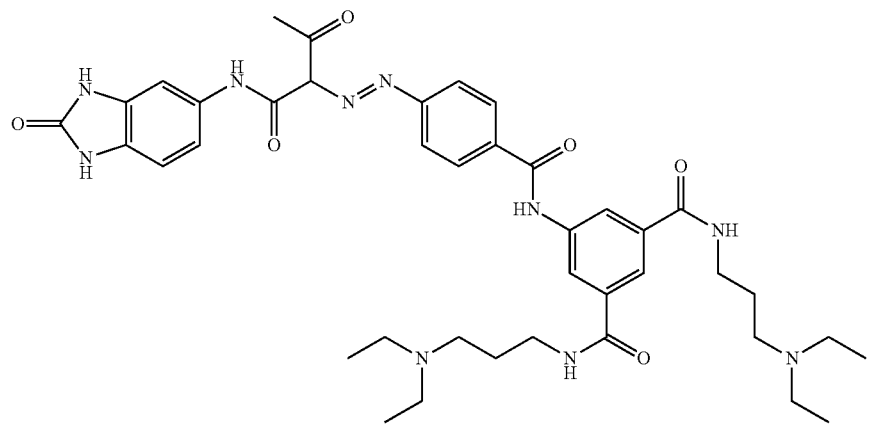

In a case where the coloring composition of the embodiment of the present invention contains a pigment derivative, the content of the pigment derivative is preferably 1 to 30 parts by mass and more preferably 3 to 20 parts by mass with respect to 100 parts by mass of the pigment included in the coloring composition. The pigment derivative may be used singly or in combination of two or more kinds thereof.

In addition, the content of the pigment derivative is preferably 1 to 30 parts by mass and more preferably 3 to 20 parts by mass with respect to 100 parts by mass of the metal azo pigment. The pigment derivative may be used singly or in combination of two or more kinds thereof.

<<Curing Accelerator>>

The coloring composition of the embodiment of the present invention may include a curing accelerator for the purpose of improving the hardness of a pattern or lowering a curing temperature. Examples of the curing accelerator include a thiol compound.

Examples of the thiol compound include a polyfunctional thiol compound having two or more mercapto groups in a molecule thereof. The polyfunctional thiol compound may also be added for the purpose of alleviating problems in stability, odor, resolution, developability, adhesiveness, or the like. The polyfunctional thiol compound is preferably secondary alkanethiols and more preferably a compound having a structure represented by Formula (Ti).

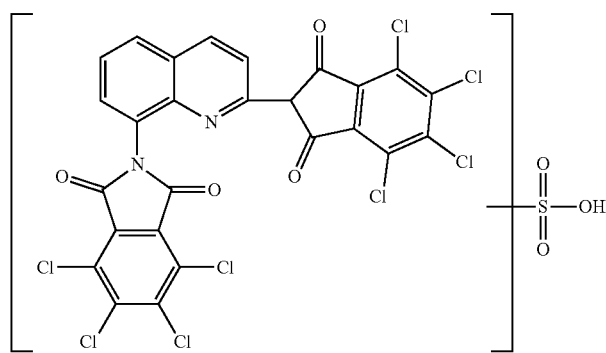

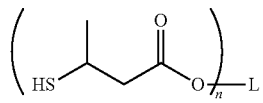

Formula (T1)

In Formula (Ti), n represents an integer of 2 to 4, and L represents a divalent to tetravalent linking group.

In Formula (Ti), it is preferable that L is an aliphatic group having 2 to 12 carbon atoms. In Formula (Ti), it is more preferable that n is 2 and L is an alkylene group having 2 to 12 carbon atoms. Specific examples of the polyfunctional thiol compounds include compounds represented by Formulae (T2) to (T4), and the compound represented by Formula (T2) is preferable. These thiol compounds may be used singly or in combination of two or more kinds thereof.

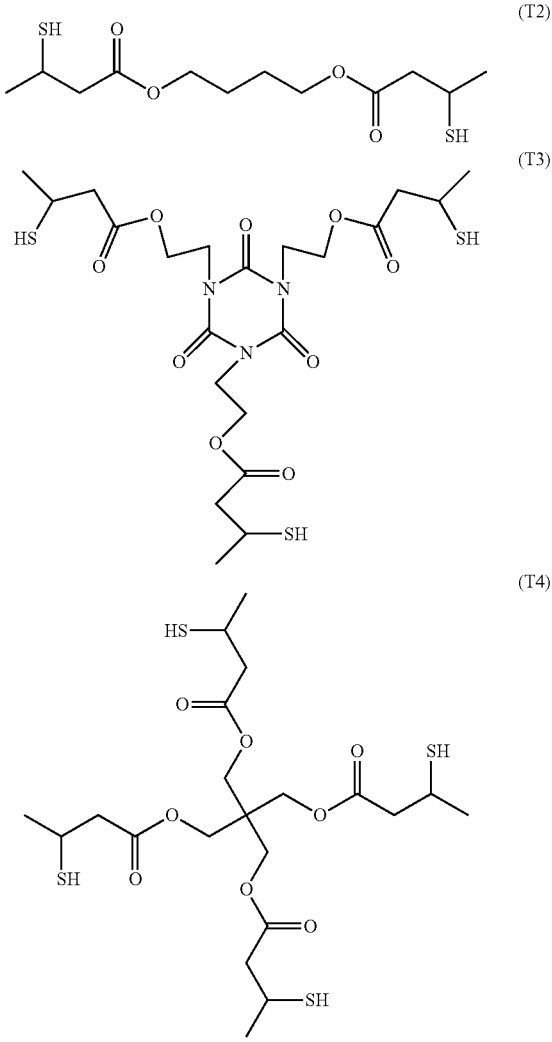

Moreover, as the curing accelerator, a methylol-based compound (for example, the compounds exemplified as a crosslinking agent in paragraph No. 0246 of JP2015-034963A), amines, phosphonium salts, amidine salts, and amide compounds (each of which are the curing agents described in, for example, paragraph No. 0186 of JP2013-041165A), base generators (for example, the ionic compounds described in JP2014-055114A), isocyanate compounds (for example, the compounds described in paragraph No. 0071 of JP2012-150180A), alkoxysilane compounds (for example, the alkoxysilane compounds having an epoxy group, described in JP2011-253054A), onium salt compounds (for example, the compounds exemplified as an acid generator in paragraph No. 0216 of JP2015-034963A, and the compounds described in JP2009-180949A), or the like can be used.

In a case where the coloring composition of the embodiment of the present invention contains a curing accelerator, the content of the curing accelerator is preferably 0.3% to 8.9% by mass and more preferably 0.8% to 6.4% by mass with respect to the total solid content of the coloring composition.

<<Surfactant>>

The coloring composition of the embodiment of the present invention preferably contains a surfactant. As the surfactant, various surfactants such as a fluorine-based surfactant, a nonionic surfactant, a cationic surfactant, an anionic surfactant, and a silicone-based surfactant can be used, and the fluorine-based surfactant is preferable for a reason that coatability can be further improved.

By incorporating the fluorine-based surfactant into the coloring composition of the embodiment of the present invention, liquid characteristics at the time of preparation of a coating liquid are further improved, and thus, evenness of a coating thickness can be further improved. That is, in a case where a film is formed using the coating liquid to which a coloring composition containing the fluorine-based surfactant has been applied, the interface tension between a surface of a coating film and the coating liquid is reduced to improve evenness of the drying with respect to the film. Therefore, formation of a film which exhibits little coating unevenness can be more suitably performed.

The fluorine content in the fluorine-based surfactant is preferably 3% to 40% by mass, more preferably 5% to 30% by mass, and particularly preferably 7% to 25% by mass. The fluorine-based surfactant in which the fluorine content is within the above-described range is effective in terms of the evenness of the thickness of the coating film or liquid saving properties and the solubility of the surfactant in the coloring composition is also good.

Examples of the fluorine-based surfactant include MEGAFACE F171, F172, F173, F176, F177, F141, F142, F143, F144, R30, F437, F475, F479, F482, F554, and F780 (all manufactured by DIC Corporation), FLUORAD FC430, FC431, and FC171 (all manufactured by Sumitomo 3M), SURFLON S-382, SC-101, SC-103, SC-104, SC-105, SC-1068, SC-381, SC-383, and S-393, and KH-40 (all manufactured by Asahi Glass Co., Ltd.), and PF636, PF656, PF6320, PF6520, and PF7002 (all manufactured by OMNOVA). Further, as the fluorine-based surfactant, the compounds described in paragraph Nos. 0015 to 0158 of JP2015-117327A, and the compounds described in paragraph Nos. 0117 to 0132 of JP2011-132503A can be used.

As the fluorine-based surfactant, an acrylic compound, which has a molecular structure having a functional group containing a fluorine atom and in which, by applying heat to the molecular structure, the functional group containing a fluorine atom is broken to volatilize a fluorine atom, can also be suitably used. Examples of the fluorine-based surfactant include MEGAFACE DS series manufactured by DIC Corporation (The Chemical Daily, Feb. 22, 2016; Nikkei Business Daily, Feb. 23, 2016) such as MEGAFACE DS-21.

It is also preferable that a polymer of a fluorine atom-containing vinyl ether compound having a fluorinated alkyl group or a fluorinated alkylene ether group and a hydrophilic vinyl ether compound is used as the fluorine-based surfactant. With regard to such a fluorine-based surfactant, reference can be made to the description in JP2016-216602A, the contents of which are incorporated herein by reference.

A block polymer can also be used as the fluorine-based surfactant. Examples thereof include the compounds described in JP2011-089090A. As the fluorine-based surfactant, a fluorine-containing polymer compound including a repeating unit derived from a (meth)acrylate compound having a fluorine atom and a repeating unit derived from a (meth)acrylate compound having 2 or more (preferably 5 or more) alkyleneoxy groups (preferably ethyleneoxy groups or propyleneoxy groups) can also be preferably used. The following compounds are also exemplified as a fluorine-based surfactant for use in the present invention. In the following formula, % representing the proportion of the repeating unit is % by mole.

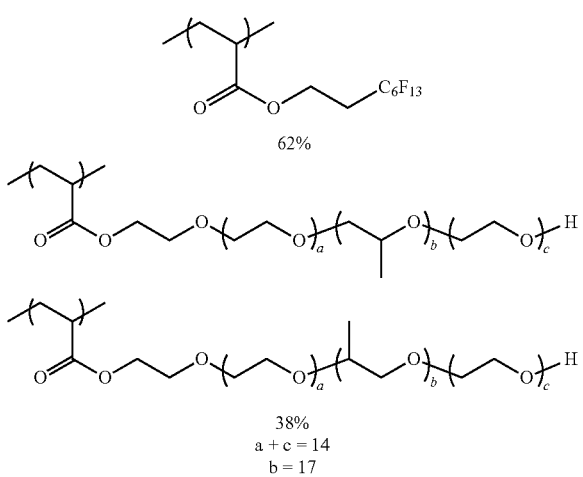

The weight-average molecular weight of the compounds is preferably 3,000 to 50,000, and is, for example, 14,000.

A fluorine-containing polymer having an ethylenically unsaturated group in the side chain can also be used as the fluorine-based surfactant. Specific examples thereof include the compounds described in paragraph Nos. 0050 to 0090 and paragraph Nos. 0289 to 0295 of JP2010-164965A. Examples of a commercially available product thereof include MEGAFACE RS-101, RS-102, RS-718-K, and RS-72-K, all manufactured by DIC Corporation.

Examples of the nonionic surfactant include glycerol, trimethylolpropane, trimethylolethane, and ethoxylate and propoxylate thereof (for example, glycerol propoxylate and glycerol ethoxylate), polyoxyethylene lauryl ether, polyoxyethylene stearyl ether, polyoxyethylene oleyl ether, polyoxyethylene octyl phenyl ether, polyoxyethylene nonyl phenyl ether, polyethylene glycol dilaurate, polyethylene glycol distearate, sorbitan fatty acid esters, PLURONIC L10, L31, L61, L62, 10R5, 17R2, and 25R2 (manufactured by BASF), TETRONIC 304, 701, 704, 901, 904, and 150R1 (manufactured by BASF), SOLSPERSE 20000 (manufactured by Lubrizol Japan Ltd.), NCW-101, NCW-1001, and NCW-1002 (manufactured by Wako Pure Chemical Industries, Ltd.), PIONIN D-6112, D-6112-W, and D-6315 (manufactured by Takemoto Oil & Fat Co., Ltd.), and OLFINE E1010, and SURFYNOL 104, 400, and 440 (manufactured by Nissin Chemical Industry Co., Ltd.).

Specific examples of the cationic surfactant include KP-341 (manufactured by Shin-Etsu Chemical Co., Ltd.), POLYFLOW No. 75, No. 90, and No. 95 (manufactured by KYOEISHA CHEMICAL CO., LTD.), and WOO 1 (manufactured by Yusho Co., Ltd.).

Examples of the anionic surfactant include W004, W005, and W017 (manufactured by Yusho Co., Ltd.), and SANDET BL (manufactured by Sanyo Chemical Industries, Ltd.).

Examples of the silicone-based surfactant include TORAY SILICONE DC3PA, TORAY SILICONE SH7PA, TORAY SILICONE DC11PA, TORAY SILICONE SH21PA, TORAY SILICONE SH28PA, TORAY SILICONE SH29PA, TORAY SILICONE SH30PA, and TORAY SILICONE SH8400 (all manufactured by Dow Corning Toray Co., Ltd.), TSF-4440, TSF-4300, TSF-4445, TSF-4460, and TSF-4452 (all manufactured by Momentive Performance Materials Co., Ltd.), KP-341, KF6001, and KF6002 (all manufactured by Shin-Etsu Chemical Co., Ltd.), and BYK307, BYK323, and BYK330 (all manufactured by BYK Chemie).

The content of the surfactant is preferably 0.001% to 5% by mass with respect to the total solid content of the coloring composition. The upper limit is preferably 3% by mass or less and more preferably 1% by mass or less. The lower limit is preferably 0.05% by mass or more and more preferably 0.01% by mass or more. The surfactant may be used singly or in combination of two or more kinds thereof. In a case where two or more kinds of surfactants are included, the total amount thereof is preferably within the range.

<<Ultraviolet Absorber>>

The coloring composition of the embodiment of the present invention can contain an ultraviolet absorber. As the ultraviolet absorber, a conjugated diene compound, an aminobutadiene compound, a methyldibenzoyl compound, a coumarin compound, a salicylate compound, a benzophenone compound, a benzotriazole compound, an acrylonitrile compound, a hydroxyphenyltriazine compound, or the like can be used. With regard to details thereof, reference can be made to the description in paragraph Nos. 0052 to 0072 of JP2012-208374A and paragraph Nos. 0317 to 0334 of JP2013-068814A, and the contents of which are incorporated herein by reference. Specific examples of the ultraviolet absorber include a compound having the following structure. Examples of a commercially available product of the ultraviolet absorber include UV-503 (manufactured by Daito Chemical Co., Ltd). In addition, as the benzotriazole compound, MYUA series manufactured by Miyoshi Oil & Fat Co., Ltd. (The Chemical Daily, Feb. 1, 2016) may be used.

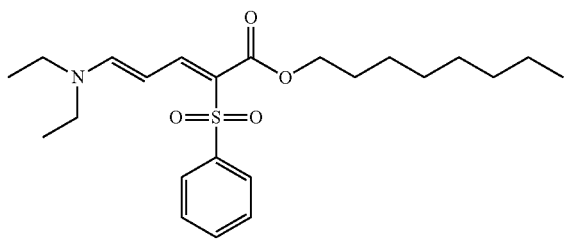 [SMILES: CCCCCCCCOC(=O)/C(=C/C=C/N(CC)CC)S(=O)(=O)c1ccccc1]

In a case where the coloring composition of the embodiment of the present invention contains an ultraviolet absorber, the content of the ultraviolet absorber is preferably 0.1% to 10% by mass, more preferably 0.1% to 5% by mass, and particularly preferably 0.1% to 3% by mass with respect to the total solid content of the coloring composition. Further, the ultraviolet absorber may be used singly or in combination of two or more kinds thereof. In a case where two or more kinds of the ultraviolet absorbers are included, the total amount thereof is preferably within the range.

<<Silane Coupling Agent>>

The coloring composition of the embodiment of the present invention can contain a silane coupling agent. In the present invention, the silane coupling agent means a silane compound having a hydrolyzable group and another functional group. Further, the hydrolyzable group refers to a substituent that can be directly bonded to a silicon atom to generate a siloxane bond by a hydrolysis reaction and/or a condensation reaction. Examples of the hydrolyzable group include a halogen atom, an alkoxy group, and an acyloxy group. The silane coupling agent is preferably a silane compound having at least one selected from a vinyl group, an epoxy group, a styrene group, a methacryl group, an amino group, an isocyanurate group, a ureido group, a mercapto group, a sulfide group, or an isocyanate group, and an alkoxy group. Specific examples of the silane coupling agent include N-β-aminoethyl-γ-aminopropyl methyldimethoxysilane (KBM-602, manufactured by Shin-Etsu Chemical Co., Ltd.), N-β-aminoethyl-γ-aminopropyl trimethoxysilane (KBM-603, manufactured by Shin-Etsu Chemical Co., Ltd.), N-β-aminoethyl-γ-aminopropyl triethoxysilane (KBE-602, manufactured by Shin-Etsu Chemical Co., Ltd.), γ-aminopropyl trimethoxysilane (KBM-903, manufactured by Shin-Etsu Chemical Co., Ltd.), γ-aminopropyl triethoxysilane (KBE-903, manufactured by Shin-Etsu Chemical Co., Ltd.), 3-methacryloxypropyl trimethoxysilane (KBM-503, manufactured by Shin-Etsu Chemical Co., Ltd.), and 3-glycidoxypropyl trimethoxysilane (KBM-403, manufactured by Shin-Etsu Chemical Co., Ltd.). With regard to details of the silane coupling agent, reference can be made to the description in paragraph Nos. 0155 to 0158 of JP2013-254047A, and the contents of which are incorporated herein by reference.

In a case where the coloring composition of the embodiment of the present invention contains a silane coupling agent, the content of the silane coupling agent is preferably 0.001% to 20% by mass, more preferably 0.01% to 10% by mass, and particularly preferably 0.1% to 5% by mass with respect to the total solid content of the coloring composition. The coloring composition of the embodiment of the present invention may include one kind or two or more kinds of the silane coupling agents. In a case where the coloring composition includes two or more kinds of the silane coupling agents, the total amount thereof is preferably within the range.

<<Polymerization Inhibitor>>

It is preferable that the coloring composition of the embodiment of the present invention contains a polymerization inhibitor. In a case where the coloring composition of the embodiment of the present invention contains a polymerization inhibitor, it is possible to produce a film in which occurrence of defects is more suppressed even in a case where the coloring composition is stored for a long time under a low-temperature environment.

Examples of the polymerization inhibitor include hydroquinone, p-methoxyphenol, di-t-butyl-p-cresol, pyrogallol, t-butyl catechol, benzoquinone, 4,4'-thiobis(3-methyl-6-t-butylphenol), 2,2'-methylenebis(4-methyl-6-t-butylphenol), an N-nitrosophenylhydroxyamine salt (an ammonium salt, a cerous salt, or the like), and 2,2,6,6-tetramethylpiperidine 1-oxyl.

In a case where the coloring composition of the embodiment of the present invention contains a polymerization inhibitor, the content of the polymerization inhibitor is preferably 0.0001% to 1% by mass with respect to the coloring composition. The lower limit is preferably 0.0005% by mass or more and more preferably 0.001% by mass or more. The upper limit is preferably 0.5% by mass or less and more preferably 0.1% by mass or less. The coloring composition of the embodiment of the present invention may include one kind or two or more kinds of the polymerization inhibitors. In a case of including two or more kinds of the polymerization inhibitors, the total amount thereof is preferably within the above-described range.

<<Other Additives>>

Various additives such as a filler, an adhesion promoter, an antioxidant, a potential antioxidant, and a thermal polymerization initiator can be blended into the coloring composition of the embodiment of the present invention, as desired.

Examples of these additives include the additives described in paragraph Nos. 0155 and 0156 of JP2004-295116A, and the contents of which are incorporated herein by reference. Further, as the antioxidant, for example, a phenol compound, a phosphorus-based compound (for example, the compounds described in paragraph No. 0042 of JP2011-090147A), a thioether compound, or the like can be used. Examples of a commercially available product thereof include ADEKA STAB series (AO-20, AO-30, AO-40, AO-50, AO-50F, AO-60, AO-60G, AO-80, AO-330, and the like) manufactured by ADEKA Corporation. Examples of the potential antioxidant include a compound in which a site functioning as an antioxidant is protected by a protecting group, and the protecting group is eliminated by heating the compound at 100° C. to 250° C. or heating the compound at 80° C. to 200° C. in the presence of an acid or basic catalyst and the compound functions as an antioxidant. Examples of the potential antioxidant include the compounds described in WO2014/021023A, WO2017/030005A, and JP2017-008219A. Examples of a commercially available product thereof include ADEKA ARKLS GPA-5001 (manufactured by ADEKA Corporation). Examples of the thermal polymerization initiator include a pinacol compound, an organic peroxide, and an azo compound, a pinacol compound is preferable. Examples of the pinacol compound include benzopinacol, 1,2-dimethoxy-1,1,2,2-tetraphenylethane, 1,2-diethoxy-1,1,2,2-tetraphenylethane, 1,2-diphenoxy-1,1,2,2-tetraphenylethane, 1,2-dimethoxy-1,1,2,2-tetra(4-methylphenyl)ethane, 1,2-diphenoxy-1,1,2,2-tetra(4-methoxyphenyl)ethane, 1,2-bis(trimethylsiloxy)-1,1,2,2-tetraphenylethane, 1,2-bis(triethylsiloxy)-1,1,2,2-tetraphenylethane, 1,2-bis(t-butyldimethyl siloxy)-1,1,2,2-tetraphenylethane, 1-hydroxy-2-trimethyl siloxy-1,1,2,2-tetraphenylethane, 1-hydroxy-2-triethyl siloxy-1,1,2,2-tetraphenylethane, and 1-hydroxy-2-t-butyldimethylsiloxy-1,1,2,2-tetraphenylethane. In addition, with regard to the pinacol compound, reference can be made to the description in JP2014-521772A, JP2014-523939A, and JP2014-521772A, and the contents of which are incorporated herein by reference.

The moisture content in the coloring composition of the embodiment of the present invention is preferably 3% by mass or less, more preferably 0.01% to 1.5% by mass, and still more preferably 0.1% to 1.0% by mass. The moisture content in the coloring composition can be measured by a Karl Fischer method.

The concentration of solid contents of the coloring composition of the embodiment of the present invention is preferably 5% to 40% by mass. The upper limit is preferably 35% by mass or less and more preferably 30% by mass or less. The lower limit is preferably 8% by mass or more and more preferably 10% by mass or more.

The coloring composition of the embodiment of the present invention can be used after viscosity is adjusted for the purposes of adjusting the state of a film surface (flatness or the like), adjusting a film thickness, or the like. The value of the viscosity can be appropriately selected as desired, and is, for example, preferably 0.3 to 50 mPa×s, and more preferably 0.5 to 20 mPa×s at 25° C. As for a method for measuring the viscosity, the viscosity can be measured, for example, with a temperature being adjusted to 25° C., using a viscometer RE85L (rotor: 1°34'×R24, measurement range of 0.6 to 1,200 mPa×s) manufactured by Toki Sangyo Co., Ltd.

A storage container for the coloring composition of the embodiment of the present invention is not particularly limited, and a known storage container can be used. Further, as the storage container, it is also preferable to use a multilayer bottle having an inner wall constituted with six layers from six kinds of resins or a bottle having a 7-layer structure from 6 kinds of resins for the purpose of suppressing incorporation of impurities into raw materials or compositions. Examples of such a container include the containers described in JP2015-123351A.

The coloring composition of the embodiment of the present invention can be preferably used as a coloring composition for a solid-state imaging element. More specifically, the coloring composition of the embodiment of the present invention can be preferably used as a coloring composition for forming pixels of a color filter used in a solid-state imaging element.

<Method for Preparing Coloring Composition>

The coloring composition of the embodiment of the present invention can be prepared by mixing the above-described components. In the preparation of the coloring composition, all the components may be dissolved and/or dispersed at the same time in a solvent to prepare the coloring composition, or the respective components may be appropriately left in two or more solutions or dispersion liquids and mixed to prepare the coloring composition upon use (during coating), as desired.

In addition, in the preparation of the coloring composition, a process for dispersing the pigment is preferably included. In the process for dispersing the pigment, examples of a mechanical force which is used for dispersing the pigment include compression, pressing, impact, shear, and cavitation. Specific examples of these processes include a beads mill, a sand mill, a roll mill, a ball mill, a paint shaker, a microfluidizer, a high-speed impeller, a sand grinder, a flow jet mixer, high-pressure wet atomization, and ultrasonic dispersion. Further, in the pulverization of the pigment in a sand mill (beads mill), it is preferable to perform a treatment under the condition for increasing a pulverization efficiency by using beads having small diameters; increasing the filling rate of the beads; or the like. Incidentally, it is preferable to remove coarse particles by filtration, centrifugation, or the like after the pulverization treatment. In addition, as the process and the dispersing machine for dispersing the pigment, the process and the dispersing machine described in "Dispersion Technology Comprehension, published by Johokiko Co., Ltd., Jul. 15, 2005", "Actual comprehensive data collection on dispersion technology and industrial application centered on suspension (solid/liquid dispersion system), published by Publication Department, Management Development Center, Oct. 10, 1978", and paragraph No. 0022 of JP2015-157893A can be suitably used. In addition, in the process for dispersing the pigment, a refining treatment of particles in a salt milling step may be performed. With regard to the materials, the equipment, the treatment conditions, and the like used in the salt milling step, reference can be made to, for example, the description in JP2015-194521A and JP2012-046629A.

It is preferable that in the preparation of the coloring composition, a composition formed by mixing the respective components is filtered through a filter for the purpose of removing foreign matters, reducing defects, or the like. As the filter, any filters that have been used in the related art for filtration use and the like may be used without particular limitation. Examples of the filter include filters formed of materials including, for example, a fluorine resin such as polytetrafluoroethylene (PTFE), a polyamide-based resin such as nylon (for example, nylon-6 and nylon-6,6), and a polyolefin resin (including a polyolefin resin having a high-density and/or an ultrahigh molecular weight) such as polyethylene and polypropylene (PP). Among these materials, polypropylene (including a high-density polypropylene) and nylon are preferable.

The pore size of the filter is suitably approximately 0.01 to 7.0 μm, preferably approximately 0.01 to 3.0 μm, and more preferably approximately 0.05 to 0.5 μm.

In addition, a fibrous filter material is also preferably used as the filter. Examples of the fibrous filter material include a polypropylene fiber, a nylon fiber, and a glass fiber. Examples of a filter using the fibrous filter material include filter cartridges of SBP type series (SBP008 and the like), TPR type series (TPR002, TPR005, and the like), or SHPX type series (SHPX003 and the like), all manufactured by Roki Techno Co., Ltd.

In a case of using a filter, different filters may be combined. Here, the filtration with each of the filters may be performed once or may be performed twice or more times.

For example, filters having different pore sizes within the above-described range may be combined. With regard to the pore size of the filter herein, reference can be made to nominal values of filter manufacturers. A commercially available filter can be selected from, for example, various filters provided by Nihon Pall Corporation (DFA4201NIEY and the like), Toyo Roshi Kaisha., Ltd., Nihon Entegris K. K. (formerly Nippon Microlith Co., Ltd.), Kitz Micro Filter Corporation, and the like.

In addition, the filtration through the first filter may be performed with only a dispersion liquid, the other components may be mixed therewith, and then the filtration through the second filter may be performed. As the second filter, a filter formed of the same material as that of the first filter, or the like can be used.

<Film>

The film of an embodiment of the present invention is a film obtained from the coloring composition of the embodiment of the present invention. The thickness of the film can be appropriately adjusted depending on purposes. For example, the film thickness is preferably 20 μm or less, more preferably 10 μm or less, and still more preferably 5 μm or less. The lower limit of the film thickness is preferably 0.1 μm or more, more preferably 0.2 μm or more, and still more preferably 0.3 μm or more.

In addition, the film of the embodiment of the present invention can be produced through a step of applying the coloring composition of the embodiment of the present invention on a support. The production method of the film of the embodiment of the present invention preferably further includes a step of forming a pattern. Examples of a forming method of the pattern include a photolithography method and a dry etching method.

Pattern formation by the photolithography method preferably includes a step of forming a coloring composition layer on a support with the coloring composition, a step of patternwise exposing the coloring composition layer, and a step of removing an unexposed area of the coloring composition layer by development to form a pattern. A step of baking the coloring composition layer (pre-baking step) and a step of baking the developed pattern (post-baking step) may be provided, as desired. In addition, pattern formation by the dry etching method preferably includes a step of forming a coloring composition layer on a support with the coloring composition, and curing the coloring composition layer to form a cured product layer, a step of forming a resist layer on the cured product layer, a step of obtaining a resist pattern by patterning the resist layer, and a step of subjecting the cured product layer to dry etching with the resist pattern as an etching mask to form a pattern. Hereinafter, the respective steps will be described.

<<Step of Forming Coloring Composition Layer>>

In the step of forming a coloring composition layer, the coloring composition layer is formed on a support, using the coloring composition. The support is not particularly limited, and can be appropriately selected depending on applications. Examples of the support include a glass substrate and a silicon substrate, and a silicon substrate is preferable. In addition, a charge coupled device (CCD), a complementary metal-oxide semiconductor (CMOS), a transparent conductive film, or the like may be formed on the silicon substrate. In some cases, a black matrix for isolating each pixel is formed on the silicon substrate. In addition, an undercoat layer may be provided on the silicon substrate so as to improve adhesiveness to an upper layer, prevent the diffusion of materials, or planarize the surface of the substrate.

As a method for applying the coloring composition, a known method can be used. Examples thereof include a dropping method (drop casting); a slit coating method; a spray method; a roll coating method; a spin coating method (spin coating); a cast coating method; a slit and spin method; a pre-wet method (for example, a method described in JP2009-145395A), various printing methods such as a discharge printing such as an ink jet (for example, on-demand type, piezo type, thermal type) and a nozzle jet, a flexo printing, a screen printing, a gravure printing, a reverse offset printing, and a metal mask printing; a transfer method using molds and the like; and a nanoimprint method. An application method of the ink jet is not particularly limited, and examples thereof include a method (particularly pp. 115 to 133) described in "Extension of Use of Ink Jet—Infinite Possibilities in Patent—" (February, 2005, S. B. Research Co., Ltd.) and methods described in JP2003-262716A, JP2003-185831A, JP2003-261827A, JP2012-126830A, and JP2006-169325A. In addition, with regard to the method for applying the coloring composition, reference can be made to the description in WO2017/030174A and WO2017/018419A, and the contents of which are incorporated herein by reference.

The coloring composition layer formed on the support may be dried (pre-baked). In a case of producing a film by a low-temperature process, pre-baking may not be performed. In a case of performing the pre-baking, the pre-baking temperature is preferably 150° C. or lower, more preferably 120° C. or lower, and still more preferably 110° C. or lower. The lower limit may be set to, for example, 50° C. or higher, or to 80° C. or higher. The pre-baking time is preferably 10 to 300 seconds, more preferably 40 to 250 seconds, and still more preferably 80 to 220 seconds. Pre-baking can be performed using a hot plate, an oven, or the like.

(Case of Forming Pattern by Photolithography Method)
<<Exposing Step>>

Next, the coloring composition layer formed on the support is patternwise exposed (exposing step). For example, the coloring composition layer can be subjected to patternwise exposure by performing exposure using a stepper exposure machine or a scanner exposure machine through a mask having a predetermined mask pattern. Thus, the exposed portion can be cured.

Examples of the radiation (light) which can be used during the exposure include g-rays and i-rays. In addition, light (preferably light with a wavelength of 180 to 300 nm) with a wavelength of 300 nm or less can be used. Examples of the light with a wavelength of 300 nm or less include KrF-rays (wavelength 248 nm) and ArF-rays (wavelength 193 nm), and KrF-rays (wavelength 248 nm) are preferable.

The irradiation dose (exposure dose) is, for example, preferably 0.03 to 2.5 J/cm$^2$ and more preferably 0.05 to 1.0 J/cm$^2$. The oxygen concentration during the exposure can be appropriately selected, and the exposure may also be performed, for example, in a low-oxygen atmosphere having an oxygen concentration of 19% by volume or less (for example, 15% by volume, 5% by volume, and substantially oxygen-free) or in a high-oxygen atmosphere having an oxygen concentration of more than 21% by volume (for example, 22% by volume, 30% by volume, and 50% by volume), in addition to an atmospheric air. Further, the exposure illuminance can be appropriately set, and can be usually selected from a range of 1,000 W/m$^2$ to 100,000 W/m$^2$ (for example, 5,000 W/m$^2$, 15,000 W/m$^2$, or 35,000 W/m$^2$). Appropriate conditions of each of the oxygen concentration and the exposure illuminance may be combined, and for example, a combination of the oxygen concentration of 10% by volume and the illuminance of 10,000 W/m$^2$, a combination of the oxygen concentration of 35% by volume and the illuminance of 20,000 W/m$^2$, or the like is available.

<<Developing Step>>

Next, the unexposed areas of the coloring composition layer are removed by development to form a pattern. The removal of the unexposed areas of the coloring composition layer by development can be carried out using a developer. Thus, the coloring composition layer of the unexposed areas in the exposing step is eluted into the developer, and as a result, only a photocured portion remains. As the developer, an organic alkali developer causing no damage on a base of element, circuit, or the like is desirable. The temperature of the developer is preferably, for example, 20° C. to 30° C. The development time is preferably 20 to 180 seconds. Further, in order to improve residue removing properties, a step of removing the developer by shaking per 60 seconds and supplying a fresh developer may be repeated multiple times.

As the developer, an aqueous alkaline solution obtained by diluting an alkali agent with pure water is preferably used. Examples of the alkali agent include organic alkaline compounds such as aqueous ammonia, ethylamine, diethylamine, dimethylethanolamine, diglycol amine, diethanolamine, hydroxyamine, ethylenediamine, tetramethylammonium hydroxide, tetraethylammonium hydroxide, tetrapropylammonium hydroxide, tetrabutylammonium hydroxide, benzyltrimethylammonium hydroxide, dimethylbis(2-hydroxyethyl)ammonium hydroxide, choline, pyrrole, piperidine, and 1,8-diazabicyclo[5.4.0]-7-undecene, and inorganic alkaline compounds such as sodium hydroxide, potassium hydroxide, sodium carbonate, sodium hydrogen carbonate, sodium silicate, and sodium metasilicate. The concentration of the alkali agent in the aqueous alkaline solution is preferably 0.001% to 10% by mass and more preferably 0.01% to 1% by mass. Moreover, the developer may further include a surfactant. Examples of the surfactant include the surfactants described above, and the surfactant is preferably a nonionic surfactant. From the viewpoints of transportation, storage, and the like, the developer may be first produced as a concentrated liquid and then diluted to a concentration required upon the use. The dilution ratio is not particularly limited, and can be set to, for example, a range of 1.5 to 100 times. In addition, in a case where a developer including such an aqueous alkaline solution is used, it is preferable to perform washing (rinsing) with pure water after development.

After the development, it is preferable that a heating treatment (post-baking) after carrying out drying. The post-baking is a heating treatment after development in order to complete curing, and the heating temperature is preferably, for example, 100° C. to 240° C. and more preferably 200° C. to 240° C. The post-baking can be performed continuously or batchwise by using a heating means such as a hot plate, a convection oven (hot-air circulating dryer), and a high-frequency heater so that the film after development satisfies the conditions. The Young's modulus of the film after post-baking is preferably 0.5 to 20 GPa and more preferably 2.5 to 15 GPa.

The film preferably has high flatness. Specifically, the surface roughness Ra is preferably 100 nm or less, more preferably 40 nm or less, and still more preferably 15 nm or less. The lower limit is not specified, but is preferably, for example, 0.1 nm or more. The surface roughness can be measured, for example, using an atomic force microscope (AFM) Dimension 3100 manufactured by Veeco Instruments, Inc.

In addition, the contact angle of water on the film can be appropriately set to a preferred value and is typically in the range of 50 to 1100. The contact angle can be measured, for example, using a contact angle meter CV-DT-A Model (manufactured by Kyowa Interface Science Co., Ltd.).

A higher volume resistivity value of each pattern (pixel) is desired. Specifically, the volume resistivity value of the pixel is preferably $10^9 \Omega \times cm$ or more and more preferably $10^{11} \Omega \times cm$ or more. The upper limit is not specified, but is, for example, preferably $10^{14} \Omega \times cm$ or less. The volume resistivity value of the pixel can be measured, for example, using an ultra-high resistance meter 5410 (manufactured by Advantest Corporation).

(Case of Forming Pattern by Dry Etching Method)

Pattern formation by the dry etching method can be performed by a method in which a coloring composition layer formed by applying a coloring composition onto a support is cured to form a cured product layer, a patterned resist layer is then formed on the cured product layer, and the cured product layer is then dry-etched with an etching gas using the patterned resist layer as a mask. It is preferable that a positive type or negative type photosensitive composition is applied onto a cured product layer, and dried to form a resist layer. As the composition used for formation of the resist layer, a positive type photosensitive composition is preferable. As the positive type photosensitive composition, a photosensitive composition which is sensitive to radiations such as ultraviolet rays (g-rays, h-rays, and i-rays), far ultraviolet rays including KrF-rays, ArF-rays, and the like, electron beams, ion beams, and X-rays is preferable. The above-described positive type photosensitive composition is preferably a photosensitive composition which is sensitive to KrF-rays, ArF-rays, i-rays, and X-rays, and from the viewpoint of micromachining, a photosensitive composition which is sensitive to KrF-rays is more preferable. As the positive type photosensitive composition, the positive type resist compositions described in JP2009-237173A or JP2010-134283A are suitably used.

<Color Filter>

The color filter of an embodiment of the present invention has the film of the embodiment of the present invention. The color filter of the embodiment of the present invention can be used for a solid-state imaging element such as a charge coupled device (CCD) and a complementary metal-oxide semiconductor (CMOS), an image display device, or the like.

<Solid-State Imaging Element>

The solid-state imaging element of an embodiment of the present invention has a film using the coloring composition of the embodiment of the present invention. The configuration of the solid-state imaging element is not particularly limited as long as the solid-state imaging element is configured so as to function as a solid-state imaging element. Examples of the configuration include the following configurations.

The solid-state imaging element is configured to have a plurality of photodiodes constituting a light receiving area of the solid-state imaging element (a charge coupled device (CCD) image sensor, a complementary metal-oxide semiconductor (CMOS) image sensor, or the like), and a transfer electrode formed of polysilicon or the like on a substrate; have a light-shielding film having openings only over the light receiving section of the photodiodes on the photodiodes and the transfer electrodes; have a device-protective film formed of silicon nitride or the like, which is formed to coat the entire surface of the light-shielding film and the light receiving section of the photodiodes, on the light-shielding film; and have a color filter on the device-protective film. In addition, the solid-state imaging element may also be configured, for example, such that it has a light collecting means (for example, a microlens, which is the same hereinafter) on a device-protective film under a color filter (a side closer to the substrate), or has a light collecting means on a color filter. Further, the color filter may have a structure in which a cured film forming each coloring pixel is embedded in a space partitioned in a lattice shape by a partition wall. The partition wall in this case preferably has a low refractive index for each coloring pixel. Examples of an imaging device having such a structure include the devices described in JP2012-227478A and JP2014-179577A. An imaging device comprising the solid-state imaging element can also be used as a vehicle camera or a monitoring camera, in addition to a digital camera or electronic equipment (mobile phones or the like) having an imaging function.

<Image Display Device>

The image display device of an embodiment of the present invention has a film using the coloring composition of the embodiment of the present invention. Examples of the image display device include a liquid crystal display device or an organic electroluminescence display device. The definitions of image display devices or the details of the respective image display devices are described in, for example, "Electronic Display Device (Akio Sasaki, Kogyo Chosakai Publishing Co., Ltd., published in 1990)", "Display Device (Sumiaki Ibuki, Sangyo Tosho Co., Ltd.)", and the like. In addition, the liquid crystal display device is described in, for example, "Liquid Crystal Display Technology for Next Generation (edited by Tatsuo Uchida, Kogyo Chosakai Publishing Co., Ltd., published in 1994)". The liquid crystal display device to which the present invention can be applied is not particularly limited, and can be applied to, for example, liquid crystal display devices employing various systems described in the "Liquid Crystal Display Technology for Next Generation".

EXAMPLES

Hereinafter, the present invention will be described in more detail using examples. However, the present invention is not limited to the following examples as long as it does not depart from the scope of the present invention. In addition, "parts" is on a mass basis unless otherwise specified.

<Measurement of Weight-Average Molecular Weight>

The weight-average molecular weight of a resin was measured by gel permeation chromatography (GPC) according to the following conditions.

Types of columns: columns formed by connection of TOSOH TSKgel Super HZM-H, TOSOH TSKgel Super HZ4000, and TOSOH TSKgel Super HZ2000

Developing solvent: tetrahydrofuran

Column temperature: 40° C.

Flow amount (amount of a sample to be injected): 1.0 μL (sample concentration: 0.1% by mass)

Device name: HLC-8220GPC manufactured by Tosoh Corporation

Detector: refractive index (RI) detector

Calibration curve base resin: polystyrene resin

<Production of Metal Azo Pigment>

(Production of Metal Azo Pigment 1)

46.2 g of diazobarbituric acid and 38.4 g of barbituric acid were added to 1,100 g of distilled water at 85° C. Next, an aqueous potassium hydroxide solution was added to the solution to adjust pH to approximately 5, and the solution was stirred for 90 minutes to produce an azobarbituric acid precursor.

Next, 1,500 g of distilled water at 82° C. was added to the azobarbituric acid precursor produced according to the above-described method. Next, 10 g of 30% hydrochloric acid was added dropwise. Next, 79.4 g of melamine was added. Next, a mixture of 0.282 mol of approximately 25% zinc chloride solution and 0.0015 mol of approximately 30% copper(II) chloride solution was added dropwise. Next, the solution to which these compounds were added was allowed to stand for 3 hours at a temperature of 82° C., and then KOH was added thereto to adjust pH to approximately 5.5. Next, the solution was heated to 90° C., and while maintaining the temperature at 90° C., 100 g of distilled water was added thereto to dilute the solution. Next, 21 g of 30% hydrochloric acid was added dropwise to the solution, and then the solution was subjected to a heating treatment at a temperature of 90° C. for 12 hours. Next, an aqueous potassium hydroxide solution was added to the solution after the heating treatment to adjust pH to approximately 5. Next, a pigment was isolated from the solution by a suction filter, washed, dried in a vacuum drying cabinet at 80° C., and then ground in a standard laboratory mill for about 2 minutes to produce a metal azo pigment 1.

(Production of Metal Azo Pigment 2)

154.1 g of diazobarbituric acid and 128.1 g of barbituric acid were added to 3,600 g of distilled water at 85° C. Next, an aqueous potassium hydroxide solution was added to the solution to adjust pH to approximately 5, and the solution was stirred for 90 minutes to produce an azobarbituric acid precursor.

Next, 5,000 g of distilled water at 82° C. was added to the azobarbituric acid precursor produced according to the above-described method. Next, 252.2 g of melamine was added. Next, a mixture of 0.68 mol of approximately 30% nickel(II) chloride solution, 0.02 mol of approximately 30% copper(II) chloride solution, and 0.200 mol of approximately 20% lanthanum(III) chloride solution was added dropwise. Next, the solution to which these compounds were added was allowed to stand for 3 hours at 82° C., and then KOH was added thereto to adjust pH to approximately 5.5. Next, the solution was heated to 90° C., and while maintaining the temperature at 90° C., 1,000 g of distilled water was added thereto to dilute the solution. Next, 113 g of 30% hydrochloric acid was added dropwise to the solution, and then the solution was subjected to a heating treatment at a temperature of 90° C. for 12 hours. Next, an aqueous potassium hydroxide solution was added to the solution after the heating treatment to adjust pH to approximately 5. Next, a pigment was isolated from the solution by a suction filter, washed, dried in a vacuum drying cabinet at 80° C., and then ground in a standard laboratory mill for about 2 minutes to produce a metal azo pigment 2.

(Production of Metal Azo Pigment 3)

154.1 g of diazobarbituric acid and 128.1 g of barbituric acid were added to 3,600 g of distilled water at 85° C. Next, an aqueous potassium hydroxide solution was added to the solution to adjust pH to approximately 5, and the solution was stirred for 90 minutes to produce an azobarbituric acid precursor.

Next, 5,000 g of distilled water at 82° C. was added to the azobarbituric acid precursor produced according to the above-described method. Next, 252.2 g of melamine was added. Next, a mixture of 0.70 mol of approximately 30% nickel(II) chloride solution, 0.05 mol of approximately 30% zinc(II) chloride solution, and 0.167 mol of approximately 20% lanthanum(III) chloride solution was added dropwise. Next, the solution to which these compounds were added was allowed to stand for 3 hours at 82° C., and then KOH was added thereto to adjust pH to approximately 5.5. Next, the solution was heated to 90° C., and while maintaining the temperature at 90° C., 1,000 g of distilled water was added thereto to dilute the solution. Next, 113 g of 30% hydrochloric acid was added dropwise to the solution, and then the solution was subjected to a heating treatment at a temperature of 90° C. for 12 hours. Next, an aqueous potassium hydroxide solution was added to the solution after the heating treatment to adjust pH to approximately 5. Next, a pigment was isolated from the solution by a suction filter, washed, dried in a vacuum drying cabinet at 80° C., and then ground in a standard laboratory mill for about 2 minutes to produce a metal azo pigment 3.

(Production of Metal Azo Pigment 4)

46.2 g of diazobarbituric acid and 38.4 g of barbituric acid were added to 1,100 g of distilled water at 85° C. Next, an aqueous potassium hydroxide solution was added to the solution to adjust pH to approximately 5, and the solution was stirred for 90 minutes to produce an azobarbituric acid precursor.

Next, 5,000 g of distilled water at 82° C. was added to the azobarbituric acid precursor produced according to the above-described method. Next, 252.2 g of melamine was added. Next, a mixture of 0.285 mol of approximately 25% nickel chloride solution and 0.010 mol of approximately 10% gadolinium(III) chloride solution was added dropwise. Next, the solution to which these compounds were added was allowed to stand for 3 hours at 82° C., and then KOH was added thereto to adjust pH to approximately 5.5. Next, the solution was heated to 90° C., and while maintaining the temperature at 90° C., 1,000 g of distilled water was added thereto to dilute the solution. Next, 113 g of 30% hydrochloric acid was added dropwise to the solution, and then the solution was subjected to a heating treatment at a temperature of 90° C. for 12 hours. Next, an aqueous potassium hydroxide solution was added to the solution after the heating treatment to adjust pH to approximately 5. Next, a pigment was isolated from the solution by a suction filter, washed, dried in a vacuum drying cabinet at 80° C., and then ground in a standard laboratory mill for about 2 minutes to produce a metal azo pigment 4.

<Production of Dispersion Liquid>

After mixing the following raw materials, the mixture was mixed and dispersed for 3 hours by a beads mill (zirconia beads: 0.3 mm diameter), and then subjected to a dispersion treatment under a pressure of 2,000 kg/cm$^3$ at a flow rate of 500 g/min using a high pressure disperser equipped with a pressure-reducing system NANO-3000-10 (manufactured by Nippon BEE Chemical Co., Ltd.). The dispersion treatment was repeated 10 times to obtain a dispersion liquid.

(Formulation of Dispersion Liquid)

Pigment described in the following table . . . 13.3 parts by mass

Pigment derivative described in the following table . . . 1.5 parts by mass

Dispersant described in the following table . . . 5.2 parts by mass

Propylene glycol monomethyl ether acetate (PGMEA) . . . 80 parts by mass

TABLE 1

| Dispersion liquid | Pigment | Dispersant | Pigment derivative |
|---|---|---|---|
| Y-1 | Metal azo pigment 1 | Dispersant 1 | Pigment derivative A |
| Y-2 | Metal azo pigment 2 | Dispersant 1 | Pigment derivative A |
| Y-3 | Metal azo pigment 3 | Dispersant 1 | Pigment derivative A |
| Y-4 | Metal azo pigment 4 | Dispersant 1 | Pigment derivative A |
| Y-5 | Metal azo pigment 1 | Dispersant 2 | Pigment derivative B |
| Y-6 | Metal azo pigment 1 | Dispersant 3 | Pigment derivative A |
| G-1 | PG36 | Dispersant 1 | Pigment derivative A |
| G-2 | PG58 | Dispersant 1 | Pigment derivative A |
| G-3 | PG36 | Dispersant 2 | Pigment derivative B |
| G-4 | PG58 | Dispersant 2 | Pigment derivative B |
| R-1 | PR254 | Dispersant 1 | Pigment derivative A |
| R-2 | PR264 | Dispersant 1 | Pigment derivative A |
| R-3 | PR177 | Dispersant 1 | Pigment derivative A |
| R-4 | PR254 | Dispersant 2 | Pigment derivative B |
| R-5 | PR264 | Dispersant 2 | Pigment derivative B |
| R-6 | PR177 | Dispersant 2 | Pigment derivative B |
| Or-1 | PO71 | Dispersant 1 | Pigment derivative A |
| Or-2 | PO71 | Dispersant 2 | Pigment derivative B |

The raw materials used for the dispersion liquid are as follows.

(Pigment)

Metal azo pigments 1 to 4: metal azo pigments 1 to 4 described above

PG36: C. I. Pigment Green 36

PG58: C. I. Pigment Green 58

PR254: C. I. Pigment Red 254

PR264: C. I. Pigment Red 264

PR177: C. I. Pigment Red 177

PO71: C. I. Pigment Orange 71

(Dispersant)

Dispersant 1: resin having the following structure (Mw=24,000; a numerical value added to the main chain represents the number of moles, and a numerical value added to the side chain represents the number of repeating units)

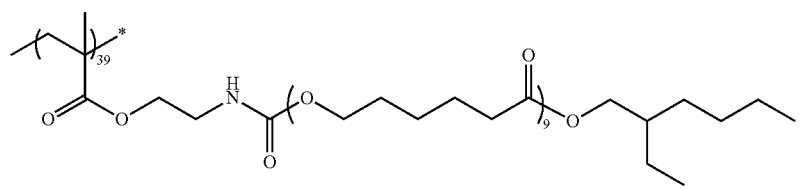

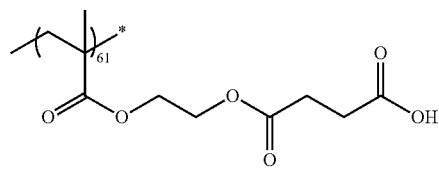

Dispersant 2: resin having the following structure (Mw=23,000; a numerical value added to the main chain represents the number of moles, and a numerical value added to the side chain represents the number of repeating units)

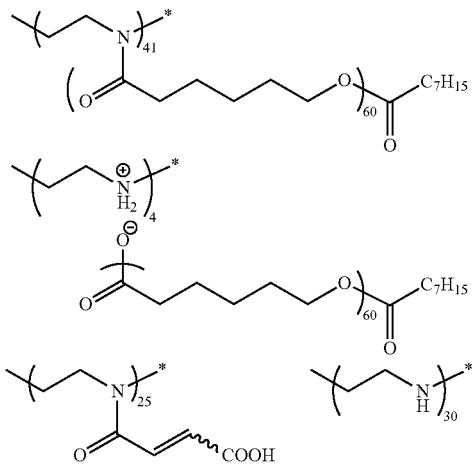

Dispersant 3: resin having the following structure (a compound having an ethylenically unsaturated bonding group; Mw=16,000; x=66 mol, y=14 mol, z=20 mol; a numerical value added to the side chain represents the number of repeating units; C=C equivalent=2500)

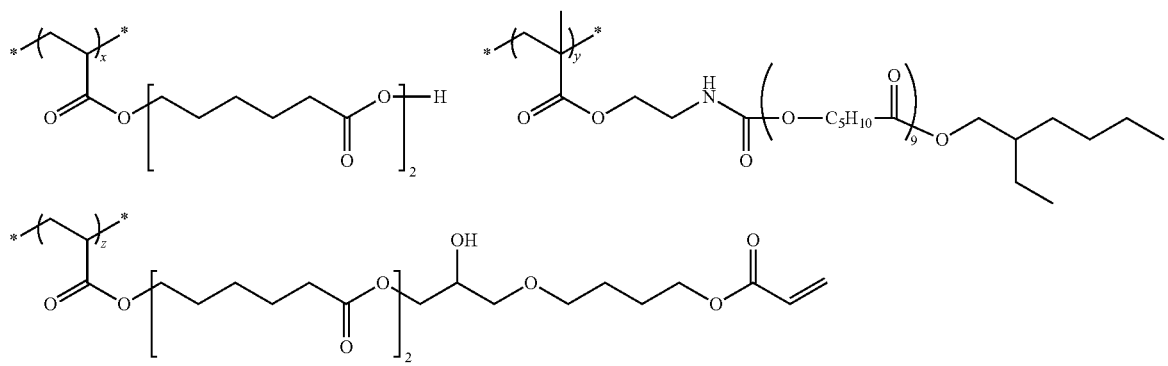

(Pigment Derivative)
Pigment derivative A: compound having the following structure (basic pigment derivative)

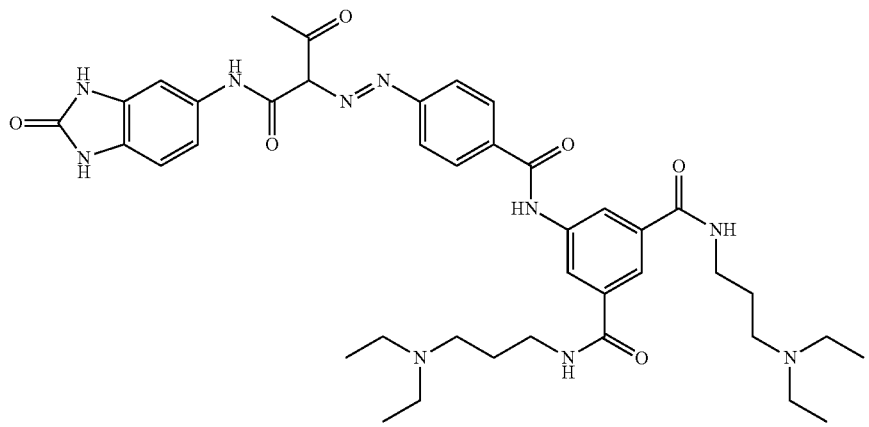 [SMILES: CCN(CC)CCCNC(=O)c1cc(NC(=O)c2ccc(/N=N/C(C(C)=O)C(=O)Nc3ccc4[nH]c(=O)[nH]c4c3)cc2)cc(C(=O)NCCCN(CC)CC)c1]

Pigment derivative B: compound having the following structure (acidic pigment derivative)

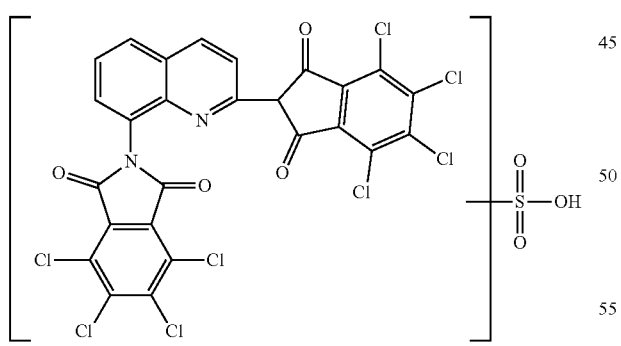

<Production of Coloring Composition>

Example 1

A coloring composition of Example 1 was produced by mixing the following raw materials and toluene. The toluene concentration of the coloring composition of Example 1 was 5 ppm by mass. The toluene concentration of the coloring composition was measured, according to a known method, by performing a gas chromatography measurement on the coloring composition after preparing a calibration curve from 0 ppm by mass to 20 ppm by mass by gas chromatography.

Dispersion liquid Y-1 . . . 75.0 parts by mass
Resin P-1 . . . 10.0 parts by mass
Polymerizable monomer M-1 . . . 2.0 parts by mass
Photopolymerization initiator In-1 . . . 1.0 parts by mass
Surfactant (the following compound, Mw=14,000) . . . 0.01 parts by mass

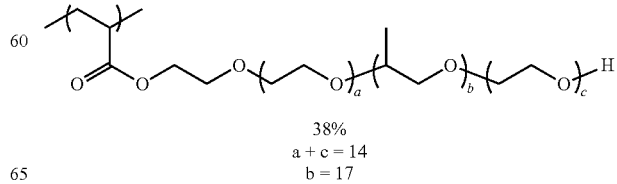

38%
a + c = 14
b = 17

Polymerization inhibitor (p-methoxyphenol) . . . 0.002 parts by mass

Solvent (propylene glycol monomethyl ether acetate (PG-MEA)) . . . 12.0 parts by mass Examples 2 to 32 and Comparative Examples 1 to 4

Coloring compositions of Examples 2 to 32 and Comparative Examples 1 to 4 were produced in the same manner as in Example 1 except that the types and amounts of the dispersion liquid, the polymerizable monomer, the resin, the photopolymerization initiator, and the solvent were respectively changed as shown in the following table. The toluene concentration shown in the following table is a toluene concentration of the coloring composition.

Example 33

A coloring composition of Example 33 was produced in the same manner as in Example 1 except that the polymerization inhibitor was changed to 2,2,6,6-tetramethylpiperidine 1-oxyl (TEMPO).

Example 34

A coloring composition of Example 34 was produced in the same manner as in Example 1 except that the polymerization inhibitor was not blended.

TABLE 2

|  | Dispersion liquid | | Polymerizable monomer | | Resin | | Photopolymerization initiator | | Solvent | | Toluene concentration |
|---|---|---|---|---|---|---|---|---|---|---|---|
|  | Kind | Parts by mass | Kind | Parts by mass | Kind | Parts by mass | Kind | Parts by mass | Kind | Parts by mass |  |
| Example 1 | Y-1 | 75 | M-1 | 2 | P-1 | 10 | In-1 | 1 | S-1 | 12 | 5 ppm by mass |
| Example 2 | Y-2 | 75 | M-1 | 2 | P-1 | 10 | In-1 | 1 | S-1 | 12 | 5 ppm by mass |
| Example 3 | Y-3 | 75 | M-1 | 2 | P-1 | 10 | In-1 | 1 | S-1 | 12 | 5 ppm by mass |
| Example 4 | Y-4 | 75 | M-1 | 2 | P-1 | 10 | In-1 | 1 | S-1 | 12 | 5 ppm by mass |
| Example 5 | Y-5 | 75 | M-1 | 2 | P-1 | 10 | In-1 | 1 | S-1 | 12 | 5 ppm by mass |
| Example 6 | Y-1<br>G-1 | 29.3<br>41 | M-1 | 2 | P-1 | 10 | In-1 | 1 | S-1 | 12 | 5 ppm by mass |
| Example 7 | Y-1<br>G-2 | 29.3<br>41 | M-1 | 2 | P-1 | 10 | In-1 | 1 | S-1 | 12 | 5 ppm by mass |
| Example 8 | Y-5<br>G-3 | 29.3<br>41 | M-1 | 2 | P-1 | 10 | In-1 | 1 | S-1 | 12 | 5 ppm by mass |
| Example 9 | Y-5<br>G-4 | 29.3<br>41 | M-1 | 2 | P-1 | 10 | In-1 | 1 | S-1 | 12 | 5 ppm by mass |
| Example 10 | Y-1<br>R-1 | 22.5<br>52.5 | M-1 | 2 | P-1 | 10 | In-1 | 1 | S-1 | 12 | 5 ppm by mass |
| Example 11 | Y-1<br>R-2 | 22.5<br>52.5 | M-1 | 2 | P-1 | 10 | In-1 | 1 | S-1 | 12 | 5 ppm by mass |
| Example 12 | Y-1<br>R-3 | 22.5<br>52.5 | M-1 | 2 | P-1 | 10 | In-1 | 1 | S-1 | 12 | 5 ppm by mass |
| Example 13 | Y-5<br>R-4 | 22.5<br>52.5 | M-1 | 2 | P-1 | 10 | In-1 | 1 | S-1 | 12 | 5 ppm by mass |
| Example 14 | Y-5<br>R-5 | 22.5<br>52.5 | M-1 | 2 | P-1 | 10 | In-1 | 1 | S-1 | 12 | 5 ppm by mass |
| Example 15 | Y-5<br>R-6 | 22.5<br>52.5 | M-1 | 2 | P-1 | 10 | In-1 | 1 | S-1 | 12 | 5 ppm by mass |
| Example 16 | Y-1<br>Or-1 | 22.5<br>52.5 | M-1 | 2 | P-1 | 10 | In-1 | 1 | S-1 | 12 | 5 ppm by mass |
| Example 17 | Y-5<br>Or-2 | 22.5<br>52.5 | M-1 | 2 | P-1 | 10 | In-1 | 1 | S-1 | 12 | 5 ppm by mass |
| Example 18 | Y-1 | 75 | M-2 | 2 | P-1 | 10 | In-1 | 1 | S-1 | 12 | 5 ppm by mass |
| Example 19 | Y-1 | 75 | M-3 | 2 | P-1 | 10 | In-1 | 1 | S-1 | 12 | 5 ppm by mass |
| Example 20 | Y-1 | 75 | M-4 | 2 | P-1 | 10 | In-1 | 1 | S-1 | 12 | 5 ppm by mass |
| Example 21 | Y-1 | 75 | M-5 | 2 | P-1 | 10 | In-1 | 1 | S-1 | 12 | 5 ppm by mass |
| Example 22 | Y-1 | 75 | M-1 | 2 | P-1 | 10 | In-1<br>In-2 | 0.5<br>0.5 | S-1 | 12 | 5 ppm by mass |
| Example 23 | Y-1 | 75 | M-1<br>M-2 | 1<br>1 | P-1 | 10 | In-1 | 1 | S-1 | 12 | 5 ppm by mass |
| Example 24 | Y-1 | 75 | M-1 | 2 | P-1<br>P-2 | 5<br>5 | In-1 | 1 | S-1 | 12 | 5 ppm by mass |
| Example 25 | Y-1 | 75 | M-1 | 2 | P-1 | 10 | In-1 | 1 | S-1<br>S-2 | 6<br>6 | 5 ppm by mass |
| Example 26 | Y-6 | 75 | M-1 | 2 | P-1 | 10 | In-1 | 1 | S-1 | 12 | 5 ppm by mass |
| Example 27 | Y-1 | 75 | M-1 | 2 | P-1 | 10 | In-2 | 1 | S-1 | 12 | 5 ppm by mass |
| Example 28 | Y-1 | 75 | M-1 | 2 | P-1 | 10 | In-3 | 1 | S-1 | 12 | 5 ppm by mass |
| Example 29 | Y-1 | 75 | M-1 | 2 | P-1 | 10 | In-4 | 1 | S-1 | 12 | 5 ppm by mass |
| Example 30 | Y-1 | 75 | M-1 | 2 | P-1 | 10 | In-5 | 1 | S-1 | 12 | 5 ppm by mass |
| Example 31 | Y-1 | 75 | M-1 | 1 | P-2 | 12.5 | In-1 | 1 | S-1 | 12 | 5 ppm by mass |
| Example 32 | Y-1 | 75 | M-1 | 0 | P-1<br>P-2 | 2.5<br>12.5 | In-1 | 1 | S-1 | 12 | 5 ppm by mass |
| Example 33 | Y-1 | 75 | M-1 | 2 | P-1 | 10 | In-2 | 1 | S-1 | 12 | 5 ppm by mass |
| Example 34 | Y-1 | 75 | M-1 | 2 | P-1 | 10 | In-2 | 1 | S-1 | 12 | 5 ppm by mass |
| Comparative Example 1 | Y-1 | 75 | — | 0 | P-2 | 12 | In-1 | 1 | S-1 | 12 | 5 ppm by mass |

TABLE 2-continued

| | Dispersion liquid | | Polymerizable monomer | | Resin | | Photopolymerization initiator | | Solvent | | Toluene concentration |
|---|---|---|---|---|---|---|---|---|---|---|---|
| | Kind | Parts by mass | Kind | Parts by mass | Kind | Parts by mass | Kind | Parts by mass | Kind | Parts by mass | |
| Comparative Example 2 | Y-1 G-1 | 29.3 41 | — | 0 | P-2 | 12 | In-1 | 1 | S-1 | 12 | 5 ppm by mass |
| Comparative Example 3 | Y-1 R-1 | 22.5 52.5 | — | 0 | P-2 | 12 | In-1 | 1 | S-1 | 12 | |
| Comparative Example 4 | Y-1 Or-1 | 22.5 52.5 | — | 0 | P-2 | 12 | In-1 | 1 | S-1 | 12 | 5 ppm by mass |

The raw materials used for producing the coloring compositions are as follows.

(Dispersion Liquid)
Dispersion liquid described above
(Polymerizable Monomer)
M-1: KAYARAD DPHA (manufactured by Nippon Kayaku Co., Ltd., dipentaerythritol hexaacrylate, C=C equivalent=96)
M-2: NK ESTER A-TMMT (manufactured by Shin-Nakamura Chemical Co., Ltd., pentaerythritol tetraacrylate, C=C equivalent=88)
M-3: NK ESTER A-DPH-12E (manufactured by Shin-Nakamura Chemical Co., Ltd., C=C equivalent=182)
M-4: KAYARAD DPCA-20 (manufactured by Nippon Kayaku Co., Ltd., C=C equivalent=134)
M-5: ARONIX M-350 (manufactured by TOAGOSEI CO., LTD., C=C equivalent=143)
(Resin)
P-1: resin having the following structure (a compound having an ethylenically unsaturated bonding group; Mw=11,000; a numerical value added to the main chain represents the number of moles; PGMEA solution having a solid content of 40% by mass; C=C equivalent=705)
P-2: resin having the following structure (Mw=14,000; a numerical value added to the main chain represents the number of moles; PGMEA solution having a solid content of 40% by mass; C=C equivalent=0)

(P-1)

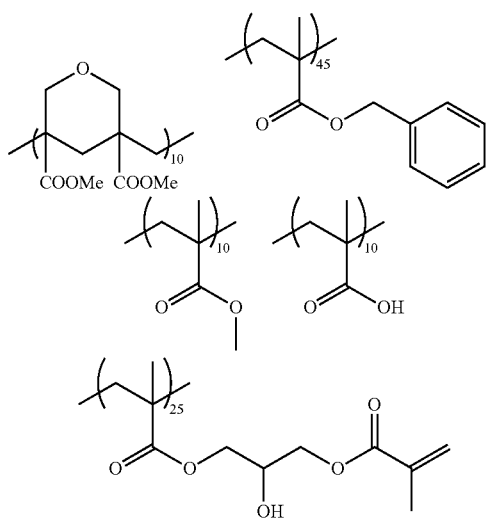

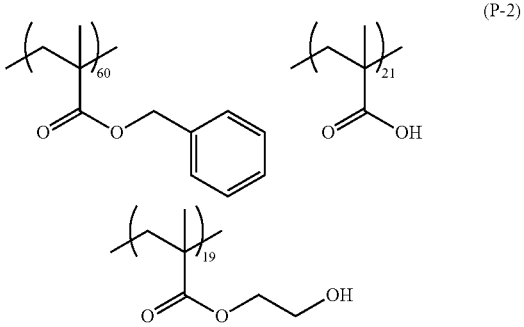
(P-2)

(Photopolymerization Initiator)
In-1: IRGACURE-OXE01 (manufactured by BASF, oxime compound)
In-2: IRGACURE-OXE02 (manufactured by BASF, oxime compound)
In-3: compound having the following structure (oxime compound)

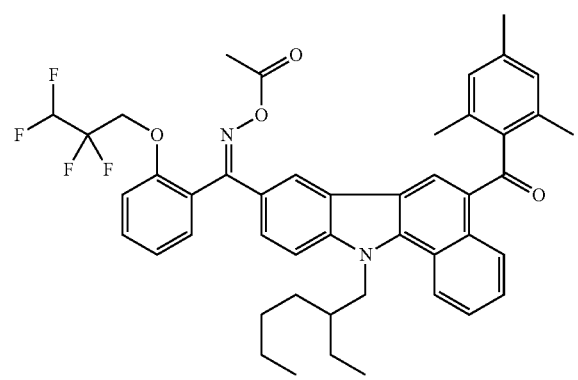

In-4: IRGACURE-369 (manufactured by BASF, α-aminoketone compound)
In-5: IRGACURE-184 (manufactured by BASF, α-hydroxyketone compound)
(Solvent)
S-1: propylene glycol monomethyl ether acetate
S-2: 3-methoxy-N,N-dimethylpropanamide
<Evaluation 1>

Each coloring composition was stored at −20° C. for 180 days. The coloring composition after storing was applied to a glass substrate with an undercoat layer using a spin coater such that the film thickness after pre-baking was 1.0 m, and pre-baking was performed for 120 seconds using a hot plate at 100° C. to form a film.

A 1 cm square portion of the obtained film was observed with an optical microscope, and evaluation was performed by counting the number of crystalline defects having a size of 0.5 µm or more.
- 5: number of defects was 0
- 4: number of defects was 1 to 3
- 3: number of defects was 4 to 6
- 2: number of defects was 7 to 9
- 1: number of defects was 10 or more <Evaluation 2>

Each coloring composition within 1 hour after production was applied to a glass substrate with an undercoat layer using a spin coater such that the film thickness after pre-baking was 1.0 µm, and pre-baking was performed for 120 seconds using a hot plate at 100° C. to form a film. The film was stored at a temperature of 135° C. and a humidity of 85% for 300 hours to perform a high-temperature and high-humidity test. A 1 cm square portion of the film after the high-temperature and high-humidity test was observed with an optical microscope, and evaluation was performed by counting the number of crystalline defects having a size of 0.5 µm or more.
- 5: number of defects was 0
- 4: number of defects was 1 to 4
- 3: number of defects was 5 to 9
- 2: number of defects was 10 to 15
- 1: number of defects was 16 or more <Evaluation 3>

Each coloring composition within 1 hour after production was applied to a glass substrate with an undercoat layer using a spin coater such that the film thickness after pre-baking was 1.0 am, and pre-baking was performed for 120 seconds using a hot plate at 100° C. to form a film.

A temperature cycle test was performed by repeating a cycle in which the obtained film was allowed to stand for 1 hour at 150° C. and then for 1 hour at −15° C. 500 times.

The transmittance was measured for each of the films before and after the temperature cycle test to obtain a change amount (ΔT %) in the transmittance before and after the temperature cycle test, and the change amount was evaluated based on the following criteria.

The compared change amount (ΔT %) in the transmittance is a change amount (|transmittance (%) before the temperature cycle test—transmittance (%) after the temperature cycle test|) of a wavelength having the largest change amount in the transmittance in the wavelength range of 400 to 700 nm.
- 5: ΔT %<1
- 4: 1<ΔT %<2
- 3: 2<ΔT %<3
- 2: 3<ΔT %<4
- 1: 4<ΔT %

TABLE 3

|  | Evaluation 1 | Evaluation 2 | Evaluation 3 |
|---|---|---|---|
| Example 1 | 4 | 5 | 5 |
| Example 2 | 4 | 5 | 5 |
| Example 3 | 4 | 5 | 5 |
| Example 4 | 4 | 5 | 5 |
| Example 5 | 4 | 5 | 4 |
| Example 6 | 4 | 5 | 5 |
| Example 7 | 4 | 5 | 5 |
| Example 8 | 4 | 5 | 4 |
| Example 9 | 4 | 5 | 4 |
| Example 10 | 4 | 5 | 5 |
| Example 11 | 4 | 5 | 5 |
| Example 12 | 4 | 5 | 5 |
| Example 13 | 4 | 5 | 4 |
| Example 14 | 4 | 5 | 4 |
| Example 15 | 4 | 5 | 4 |
| Example 16 | 4 | 5 | 5 |
| Example 17 | 4 | 5 | 4 |
| Example 18 | 5 | 5 | 5 |
| Example 19 | 4 | 4 | 4 |
| Example 20 | 4 | 4 | 5 |
| Example 21 | 4 | 4 | 4 |
| Example 22 | 4 | 5 | 5 |
| Example 23 | 5 | 5 | 5 |
| Example 24 | 5 | 5 | 5 |
| Example 25 | 4 | 5 | 5 |
| Example 26 | 5 | 5 | 5 |
| Example 27 | 4 | 5 | 5 |
| Example 28 | 4 | 5 | 5 |
| Example 29 | 3 | 4 | 4 |
| Example 30 | 3 | 3 | 4 |
| Example 31 | 4 | 5 | 4 |
| Example 32 | 4 | 5 | 4 |
| Example 33 | 4 | 5 | 5 |
| Example 34 | 3 | 4 | 4 |
| Comparative Example 1 | 1 | 1 | 1 |
| Comparative Example 2 | 1 | 1 | 1 |
| Comparative Example 3 | 1 | 1 | 1 |
| Comparative Example 4 | 1 | 1 | 1 |

As shown in the above table, the coloring compositions of Examples were capable of producing a film which is suppressed in an occurrence of defects even in a case where the coloring composition is stored for a long time under a low-temperature environment (evaluation 1).

In addition, in the coloring compositions of Examples 6 to 17 in which the metal azo pigment of the present invention was used in combination with another pigment, growth of a foreign matter of the metal azo pigment under a high-temperature and high-humidity environment could be more suppressed comparing to a case where no other pigment was used in combination.

<Production of Color Filter>

The coloring composition of Example 6 was applied to a 6 inch (15.24 cm) silicon substrate with an undercoat layer using a spin coater such that the film thickness after pre-baking was 0.5 µm, and pre-baking was performed for 120 seconds using a hot plate at 100° C. to form a coloring composition layer. Using an i-ray stepper exposure device FPA-3000i5+ (manufactured by Canon Inc.), the coloring composition layer was irradiated with light with a wavelength of 365 nm through a 1.2 m square Bayer pattern mask to perform exposure thereon with an exposure dose of 500 mJ/cm². Next, the silicon substrate on which the coloring composition layer after the exposure was formed was placed on a horizontal rotary table of a spin-shower developing machine (DW-30 Type, manufactured by Chemitronics Co., Ltd.), subjected to a puddle development at 23° C. for 60 seconds using a developer (CD-2000, manufactured by Fujifilm Electronics Materials), and rinsed with water, thereby forming a pattern and producing a color filter.

The obtained color filter was incorporated into a solid-state imaging element according to a known method. It was confirmed that the solid-state imaging element had high resolution and excellent color separation.

What is claimed is:

1. A coloring composition comprising:
   a metal azo pigment which includes at least one kind of an anion selected from an azo compound represented by Formula (I) or an azo compound having a tautomeric structure of the azo compound represented by Formula (I), two or more kinds of metal ions, and a melamine compound;
   a compound which has an ethylenically unsaturated bonding group;
   a photopolymerization initiator;
   a polymerization inhibitor; and
   a solvent,
   wherein the compound which has an ethylenically unsaturated bonding group includes a monomer having an ethylenically unsaturated bonding group with a C=C equivalent of 50 to 140,
   the photopolymerization initiator is an oxime compound,
   the solvent includes toluene and a solvent other than the toluene, and
   a content of the toluene in the coloring composition is 0.1 to 10 ppm by mass,

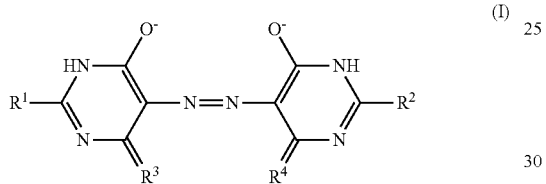
(I)

in the formula, $R^1$ and $R^2$ each independently represent OH or $NR^5R^6$, $R^3$ and $R^4$ each independently represent =O or =$NR^7$, and $R^5$ to $R^7$ each independently represent a hydrogen atom or an alkyl group.

2. The coloring composition according to claim 1, wherein the metal azo pigment includes the anion, the metal ions including at least $Zn^{2+}$ and $Cu^{2+}$, and the melamine compound.

3. The coloring composition according to claim 2, Wherein the at least $Zn^{2+}$ and $Cu^{2+}$ are contained in a total amount of 95% to 100% by mole based on 1 mol of all the metal ions in the metal azo pigment.

4. The coloring composition according to claim 2, wherein a molar ratio of the at least $Zn^{2+}$ to $Cu^{2+}$ in the metal azo pigment is $Zn^{2+}:Cu^{2+}$=199:1 to 1:15.

5. The coloring composition according to claim 1, wherein the melamine compound in the metal azo pigment is a compound represented by Formula (II),

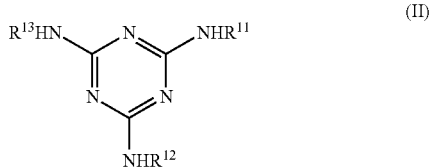
(II)

in the formula, $R^{11}$ to $R^{13}$ each independently represent a hydrogen atom or an alkyl group.

6. The coloring composition according to claim 1, wherein the compound which has an ethylenically unsaturated bonding group is contained 10 parts by mass or more with respect to 100 parts by mass of the metal azo pigment.

7. The coloring composition according to claim 1, further comprising:
   a pigment derivative.

8. The coloring composition according to claim 7, wherein the pigment derivative is a basic pigment derivative.

9. The coloring composition according to claim 1, wherein the coloring composition is used for a solid-state imaging element.

10. A film obtained from the coloring composition according to claim 1.

11. A color filter comprising the film according to claim 10.

12. A solid-state imaging element comprising the film according to claim 10.

13. An image display device comprising the film according to claim 10.

14. The coloring composition according to claim 1, further comprising:
    a basic pigment derivative represented by Formula (syn2),
    wherein a content of the compound which has an ethylenically unsaturated bonding group is 10 parts by mass or more with respect to 100 parts by mass of the metal azo pigment,

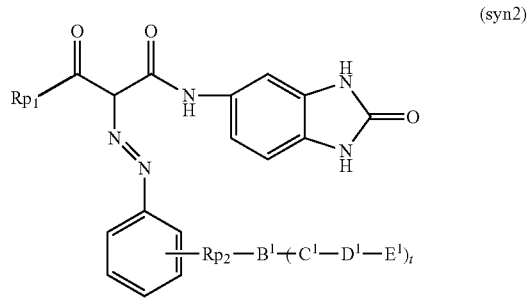
(syn2)

in the Formula (syn2), Rp1 represents an alkyl group or an aryl group,
    Rp2 represents a single bond, —NR—, —CO—, —$CO_2$—, —$SO_2$—, —O—, —S—, or a group formed by a combination of these groups, R represents a hydrogen atom, an alkyl group, or an aryl group,
    $B^1$ represents a single bond or a (t+1)-valent linking group,
    $C^1$ represents a single bond, —NR—, —CO—, —$CO_2$—, —$SO_2$—, —O—, —S—, or a group formed by a combination of these groups, R represents a hydrogen atom, an alkyl group, or an aryl group,
    $D^1$ represents a single bond, an alkylene group, or an arylene group,
    $E^1$ represents an acid group, a basic group, or a phthalimide group, and
    t represents an integer of 1 to 5.

15. The coloring composition according to claim 14, wherein the compound which has an ethylenically unsaturated bonding group further includes a polymer having an ethylenically unsaturated bonding group with a C=C equivalent of 100 to 5,000,
    the polymer having an ethylenically unsaturated bonding group with a C=C equivalent of 100 to 5,000 includes a repeating unit represented by Formula (A-1-1) and a repeating unit having a graft chain represented by Formula (G-1a), Formula (G-2a), Formula (G-3a), Formula (G-4a), or Formula (G-5a), and the content of the compound which has an ethylenically unsaturated bonding group is 10 parts by mass to 100 parts by mass with respect to 100 parts by mass of the metal azo pigment,

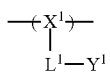
(A-1-1)

in Formula (A-1-1),
$X^1$ represents a main chain of a repeating unit,
$L^1$ represents a single bond or a divalent linking group, and
$Y^1$ represents an ethylenically unsaturated bonding group, and

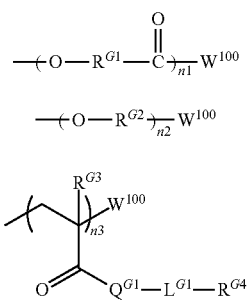
(G-1a)
(G-2a)
(G-3a)

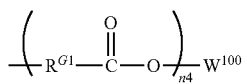
(G-4a)

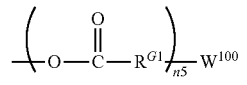
(G-5a)

in Formulae (G-1a) to Formula (G-5a),
$R^{G1}$ and $R^{G2}$ each independently represents an alkylene group,
$R^{G3}$ represents a hydrogen atom or a methyl group,
$Q^{G1}$ represents —O— or —NH—,
$L^{G1}$ represents a single bond or a divalent linking group,
$R^{G4}$ represents a hydrogen atom or a substituent,
$W^{100}$ represents a hydrogen atom or a substituent, and
n1 to n5 each independently represents an integer of 2 or more.

16. The coloring composition according to claim 15, wherein a molecular weight of the monomer having an ethylenically unsaturated bonding group with a C=C equivalent of 50 to 140 is less than 3,000, and a molecular weight of the polymer having an ethylenically unsaturated bonding group with a C=C equivalent of 100 to 5,000 is 3,000 or more.

* * * * *